(12) United States Patent
Kimura et al.

(10) Patent No.: US 8,326,481 B2
(45) Date of Patent: Dec. 4, 2012

(54) VEHICLE DRIVING ASSIST SYSTEM

(75) Inventors: Takeshi Kimura, Yokohama (JP);
Yosuke Kobayashi, Yokohama (JP);
Yukinori Nishida, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 13/350,434

(22) Filed: Jan. 13, 2012

(65) Prior Publication Data

US 2012/0116643 A1 May 10, 2012

Related U.S. Application Data

(62) Division of application No. 12/063,849, filed as application No. PCT/IB2006/002867 on Oct. 12, 2006, now Pat. No. 8,126,609.

(30) Foreign Application Priority Data

Oct. 13, 2005 (JP) .................................. 2005-299217
Aug. 28, 2006 (JP) .................................. 2006-230328

(51) Int. Cl.
*G06F 7/00* (2006.01)
*G07C 5/00* (2006.01)

(52) U.S. Cl. .......... 701/29.2; 701/29.8; 701/36; 701/48; 701/54; 701/70; 701/79; 701/84; 701/96; 701/110; 701/301; 701/302

(58) Field of Classification Search .................... 701/31, 701/36, 48, 54, 70, 79, 84, 96, 301, 302; 701/29.2, 29.8, 110; 180/169, 197; 340/435
See application file for complete search history.

(56) References Cited

U.S. PATENT DOCUMENTS

| 4,964,318 | A | * | 10/1990 | Ganoung | ...................... | 477/110 |
| 5,088,043 | A | * | 2/1992 | Akishino et al. | ................. | 701/93 |
| 5,096,015 | A | * | 3/1992 | Akishino et al. | ............. | 180/179 |
| 5,128,869 | A | * | 7/1992 | Akishino et al. | ................ | 701/97 |

(Continued)

FOREIGN PATENT DOCUMENTS

EP 1375232 1/2004

(Continued)

OTHER PUBLICATIONS

The extended European Search Report of corresponding European Application No. 06809018.2-1264, dated Feb. 4, 2011.

(Continued)

*Primary Examiner* — Khoi Tran
*Assistant Examiner* — Jorge Peche
(74) *Attorney, Agent, or Firm* — Global IP Counselors, LLP

(57) ABSTRACT

A vehicle driving assist system calculates a risk potential indicative of a degree of convergence between a host vehicle and a preceding obstacle. Then, the system performs a driver notification operation that produces a driver notification stimulus based on the risk potential such as decreasing the driving force exerted against the vehicle as the risk potential increases and increasing an actuation reaction force exerted on the accelerator pedal during its operation as the risk potential increases. If a failure is detected in a reaction force generating device serving to add a reaction force to the accelerator pedal in accordance with the risk potential, then the system corrects an engine torque characteristic such that the engine torque does not increase even if the accelerator pedal is depressed to suppress an odd feeling in the vehicle performance by the driver when a failure occurs in the reaction force generating device.

10 Claims, 51 Drawing Sheets

U.S. PATENT DOCUMENTS

| | | |
|---|---|---|
| 5,244,257 A | 9/1993 | Muller et al. |
| 6,799,110 B2 * | 9/2004 | Hashimoto et al. ............ 701/62 |
| 2003/0062025 A1 * | 4/2003 | Samoto et al. ................ 123/396 |
| 2003/0100975 A1 * | 5/2003 | Hashimoto et al. ............ 701/1 |
| 2003/0176960 A1 * | 9/2003 | Yamamura ..................... 701/36 |
| 2003/0236608 A1 * | 12/2003 | Egami ........................... 701/70 |
| 2004/0002808 A1 * | 1/2004 | Hashimoto et al. ........... 701/107 |
| 2004/0090320 A1 * | 5/2004 | Suzuki et al. ................. 340/435 |
| 2004/0259687 A1 | 12/2004 | Ritter et al. |
| 2007/0198136 A1 * | 8/2007 | Kobayashi et al. .............. 701/1 |

FOREIGN PATENT DOCUMENTS

| | | |
|---|---|---|
| EP | 1550573 | 7/2005 |
| JP | H02-246838 | 10/1990 |
| JP | H05-500485 | 2/1993 |
| JP | H08-230499 | 9/1996 |
| JP | H10-073161 | 3/1998 |
| JP | H11-165567 | 6/1999 |
| JP | 2000-177429 | 6/2000 |
| JP | 2003-267201 | 9/2003 |
| JP | 2004-017935 | 1/2004 |
| JP | 2004-050925 | 2/2004 |
| JP | 2004-504216 | 2/2004 |
| JP | 2004-220422 | 8/2004 |
| JP | 2005-153736 | 6/2005 |
| JP | 2005-254857 | 9/2005 |
| JP | 2005-255166 | 9/2005 |
| WO | WO-2005/063524 | 7/2005 |

OTHER PUBLICATIONS

The Japanese Office Action of corresponding Japanese Application No. JP2006-230328, dated Jan. 31, 2011, mailed Feb. 8, 2011.

* cited by examiner

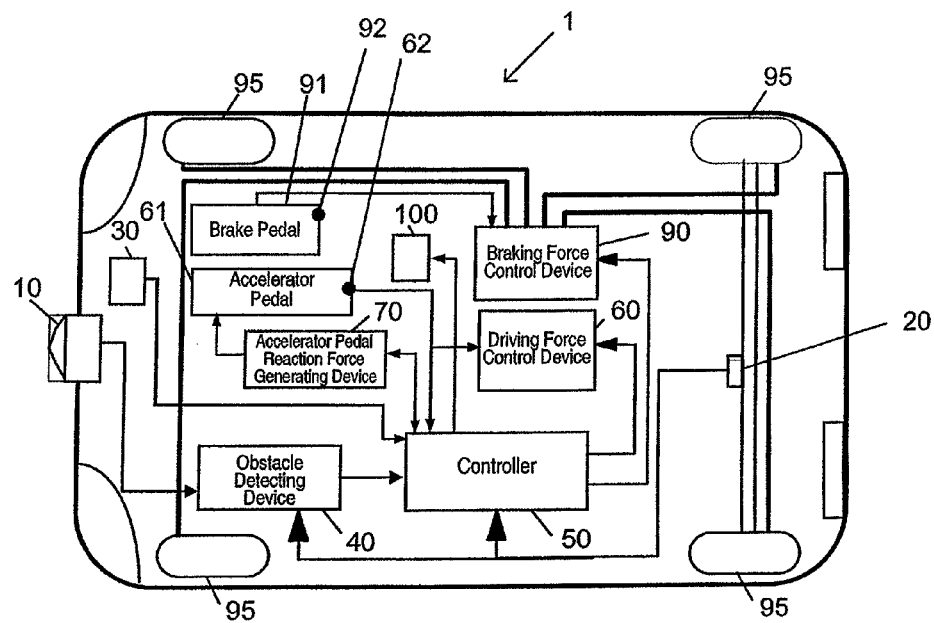
Fig. 1
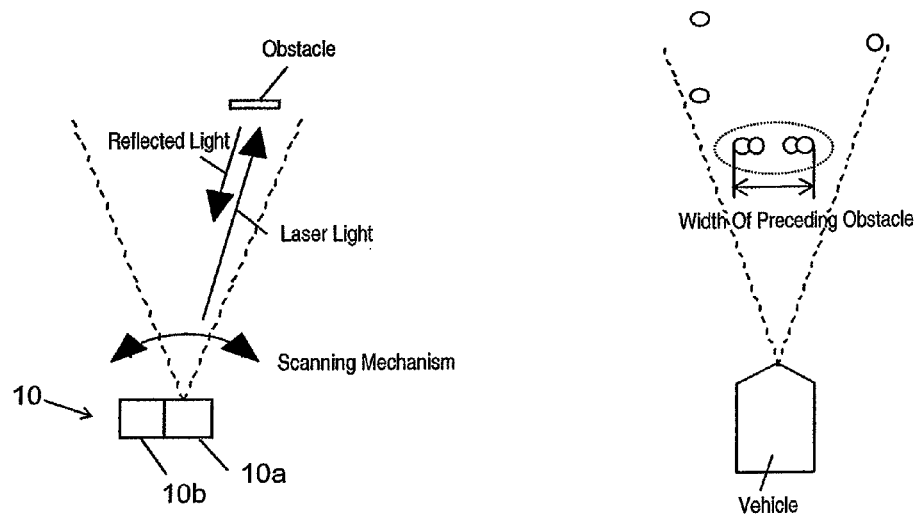
Fig. 2
Fig. 3

Distance Between Vehicle And Preceding Vehicle Is Long

Distance Between Vehicle And Preceding Vehicle Is Short

VEHICLE DRIVING ASSIST SYSTEM

CROSS-REFERENCE TO RELATED APPLICATIONS

This application is a divisional application of U.S. patent application Ser. No. 12/063,849 filed on Feb. 14, 2008. The entire disclosure of U.S. patent application Ser. No. 12/063,849 is hereby incorporated herein by reference.

This application also claims priority to Japanese Patent Application No. 2005-299217 filed on Oct. 13, 2005 and Japanese Patent Application No. 2006-228872 filed on Aug. 25, 2006. The entire disclosures of Japanese Patent Application No. 2005-299217 and Japanese Patent Application No. 2006-228872 are hereby incorporated herein by reference.

BACKGROUND OF THE INVENTION

1. Field of the Invention

The present invention relates to a vehicle driving assist system configured to assist a driver with respect to the operation of a vehicle. More specifically, the present invention relates to a vehicle driving assist system that calculates a risk potential indicative of a degree of convergence between a host vehicle and a preceding obstacle, and that produces a driver notification stimulus based on the risk potential.

2. Background Information

Several conventional vehicle driving assist systems have been proposed for detecting a degree of convergence between a host vehicle and a preceding obstacle based on the distance and relative velocity between the host vehicle and the preceding obstacle. One example of such a system is disclosed in Japanese Laid-Open Patent Publication No. 2003-267201. In the system of this publication, if the host vehicle is determined to be converging on a preceding obstacle, then the system executes a control to decelerate the vehicle so as to alleviate the convergence and a control to increase an actuation reaction force exerted by the accelerator pedal. One known method of controlling the actuation reaction force exerted by the accelerator pedal is to use a reaction force control system that employs a servomotor (e.g., Japanese Laid-Open Patent Publication No. 2004-017935). In this type of system 2, the reaction force exerted by the accelerator pedal is controlled by varying a current delivered to the reaction force control system. The system is configured such that when the reaction force control system has failed, a signal line of the servomotor is grounded by using a switch lever. As a result, an induced electromotive force causes the accelerator pedal to exert a reaction force.

SUMMARY OF THE INVENTION

With the systems mentioned above, the reaction force generated by the reaction force control system will disappear if the reaction force control system fails while generating a reaction force against the accelerator pedal to oppose depression of the accelerator pedal by the driver. With the system described in Japanese Laid-Open Patent Publication No. 2003-267201, a reaction force is generated by the induced electromotive force, which is smaller than the normal reaction force.

In accordance with one aspect of the present invention, a vehicle driving assist system is provided that basically comprises a traveling situation detecting section, a risk potential calculating section, a driving assist control section, a failure detecting section and a failsafe control. The traveling situation detecting section is configured to output a traveling situation detection result based on at least a following distance between a host vehicle and a preceding obstacle and a host vehicle speed of the host vehicle. The risk potential calculating section is configured to calculate a risk potential indicative of a degree of convergence between the host vehicle and the preceding obstacle based on the traveling situation detection result of the traveling situation detecting section. The driving assist control section is configured to control at least one of an actuation reaction force exerted by a driver-operated driving device and a braking/driving force exerted against the host vehicle based on the risk potential calculated by the risk potential calculating section. The failure detecting section is configured to detect a failure of the vehicle driving assist system. The failsafe control section is configured to perform a failsafe control operation to suppress changes in a vehicle behavior caused by the failure when the failure has been detected in the vehicle driving assist system.

BRIEF DESCRIPTION OF THE DRAWINGS

Referring now to the attached drawings which form a part of this original disclosure:

FIG. 1 is a system diagram of a vehicle driving assist system in accordance with a first embodiment of the present invention;

FIG. 2 is a diagram for explaining the distance measuring concept of the radar device;

FIG. 3 is an example of a detection result obtained with the radar device;

DETAILED DESCRIPTION OF THE PREFERRED EMBODIMENTS

Figure 4:
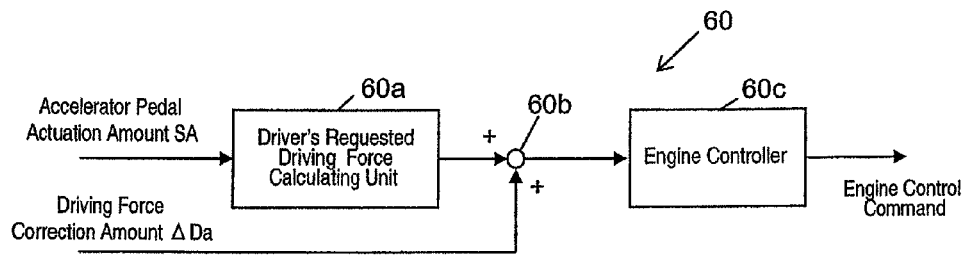
FIG. 4 is a diagram showing the constituent features of the driving force control device.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Referring initially to FIG. 1, a host vehicle is illustrated that is equipped with a driving assist system in accordance with a first embodiment of the present invention. The main features of the vehicle driving assist system 1 will now be explained. The vehicle driving assist system 1 is equipped with a radar device 10, a vehicle speed sensor 20, a steering angle sensor 30, an obstacle detecting device 40, a controller 50, a driving force control device 60, an accelerator pedal reaction force generating device 70, a braking force control device 90 and an alarm device 100.

The radar device 10 is a laser radar mounted to a front grill portion, a bumper portion, or the like of the host vehicle and serves to horizontally scan a region in front of the host vehicle with infrared laser light in order to detect obstacles in front of the vehicle. FIG. 2 is a diagram for explaining the principles by which the radar device 10 detects an obstacle. As shown in FIG. 2, the radar device 10 has a light emitting part 10a configured to emit laser light and a light receiving part 10b configured to detect reflected light that has been reflected from an object in front of the host vehicle (i.e., typically a rear end of a preceding vehicle). The light emitting part 10a is combined with a scanning mechanism that enables the light emitting part 10a to pivot left and right as indicated by the arrows in FIG. 2. The light emitting part 10a makes successive emissions of laser light while changing its angle within a prescribed angular range. The radar device 10 measures the distance from the host vehicle to a detected obstacle based on the time difference between when the laser light is emitted from the light emitting part 10a and when the reflected light is received by the light receiving part 10b.

While the radar device 10 scans the region in front of the vehicle by using the scanning mechanism, the radar device 10 calculates the distance to any obstacle from which reflected light is received at each scanning position or scanning angle. Additionally, at each scanning angle at which an obstacle is detected, the radar device 10 calculates the lateral position of the obstacle with respect to the vehicle based on the value of the scanning angle and the calculated distance to the obstacle at that particular scanning angle. In other words, the radar device 10 detects both the existence of the obstacle and the relative position of the obstacle.

FIG. 3 is a diagram illustrating an example of the results obtained when the laser radar 10 detects an obstacle. By determining the relative position of the obstacle with respect to the vehicle at each scanning angle, a planar diagram can be obtained which indicates the existence and position of a plurality of objects that can be detected within the prescribed angular scanning range.

The vehicle speed sensor 20 detects the speed of the vehicle in which the system 1 is installed by measuring the rotational speed of the wheels and/or the rotational speed of the output side of the transmission.

The obstacle detecting device 40 acquires information regarding an obstacle in front of the vehicle based on the detection results obtained with the radar device 10 and the vehicle speed sensor 20. More specifically, the obstacle detecting device 40 identifies a movement state of each detected object based on the detection results outputted from the radar device 10 at each scanning cycle time or each scanning angle and determines if the detected objects are the same object or different objects based on such factors as convergence between objects (drawing toward each other) and similarity of movement between objects.

Then, based on signals from the radar device 10 and the vehicle speed sensor 20, the obstacle detecting device 40 acquires obstacle information regarding the surroundings of the vehicle, i.e., the obstacle detecting device 40 recognizes the following (longitudinal) distance and relative velocity between the vehicle and the preceding obstacle as well as the lateral distance of the obstacle with respect to the vehicle and width of the obstacle. When two or more preceding obstacles are detected, the obstacle detecting device 40 acquires information regarding each individual obstacle. The obstacle detecting device 40 sends the acquired obstacle information to the controller 50.

The steering angle sensor 30 is an angle sensor installed in the vicinity of the steering column or the steering wheel (not shown in figures) and is configured to detect the steering angle in terms of the rotation of the steering shaft and send the detected steering angle to the controller 50.

An accelerator pedal stroke sensor 62 is provided on the accelerator pedal 61 to detect the depression amount (actuation amount) of the accelerator pedal 61. The accelerator pedal actuation amount detected by the accelerator pedal stroke sensor 62 is sent to the controller 50 and the driving force control device 60. A brake pedal stroke sensor 92 is provided on the brake pedal 91 to detect the depression amount (actuation amount) of the brake pedal 92. The brake pedal actuation amount detected by the brake pedal stroke sensor 92 is sent to the controller 90 and the braking force control device 90.

The controller 50 comprises a CPU and a ROM, a RAM, and other components peripheral to the CPU and serves to control the entire vehicle driving assist system 1. The controller 50 is configured to recognize the traveling situation of the host vehicle based on the vehicle speed obtained from the vehicle speed sensor 20 and the obstacle information obtained from the obstacle detecting device 40. Based on the traveling circumstances, the controller 50 calculates a risk potential that is a physical quantity indicating the degree of convergence between the vehicle and the preceding obstacle (or "risk potentials" when there are two or more obstacles).

Based on the risk potential(s) with respect to the obstacle(s), the controller 50 controls the braking/driving force exerted against the vehicle and controls the actuation reaction force exerted by a driving operation device operated by the driver in order to drive the vehicle. The driver-operated driving device is, for example, the accelerator pedal 61 that the driver operates in order to accelerate and decelerate the vehicle. The controller 50 also determines whether or not the accelerator pedal reaction force generating device 70 has failed and corrects an engine torque characteristic if it determines that the accelerator pedal reaction force generating device 70 has failed. The control operations executed by the controller 50 will be discussed in more detail later.

Figure 5:
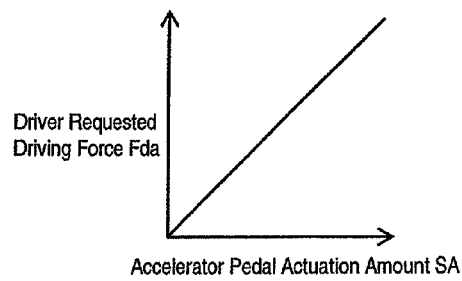
FIG. 5 is a plot of the requested driving force versus the accelerator pedal actuation amount.

The driving force control device 60 serves to control the engine (not shown in figures) such that a driving force corresponding to the actuation state of the accelerator pedal 61 is generated and is configured such that it can change the generated driving force based on a command from an external source. FIG. 4 is a block diagram showing the constituent features of the driving force control device 60. FIG. 5 is a characteristic map plotting the driver's requested driving force Fda versus the accelerator pedal actuation amount SA. As shown in FIG. 4, the driving force control device 60 comprises a driver's requested driving force calculating unit 60a, an adder 60b, and an engine controller 60c.

The driver's requested driving force calculating unit 60a is configured to use a map like that shown in FIG. 5 to calculate the driving force (driver's requested driving force) Fda requested by the driver based on the amount (accelerator pedal actuation amount) SA by which the accelerator pedal 61 is depressed. The adder 60b adds a driving force correction amount ΔDa (explained later) to the calculated driver's requested driving force Fda so as to calculate a target driving force and feeds the target driving force to the engine controller 60c. The engine controller 60c calculates a control command value for the engine based on the target driving force.

Figure 6:
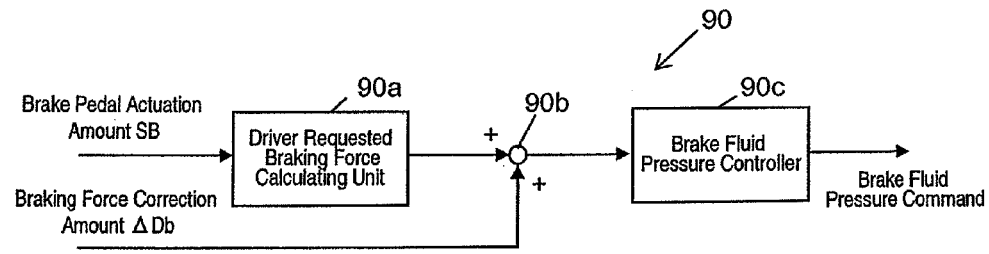
FIG. 6 is a diagram showing the constituent features of the braking force control device.
Figure 7:
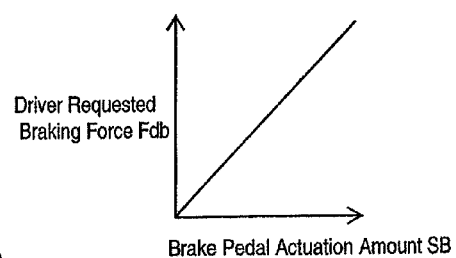
FIG. 7 is a plot of the requested braking force versus the brake pedal actuation amount.

The braking force control device 90 serves to control the brake fluid pressure such that a braking force corresponding to the actuation state of the brake pedal 91 is generated and is configured such that it can change the generated brake fluid pressure based on a command from an external source. FIG. 6 is a block diagram showing the constituent features of the braking force control device 90. FIG. 7 is a characteristic map plotting the driver's requested braking force Fdb versus the brake pedal actuation amount SB. As shown in FIG. 6, the braking force control device 90 comprises a driver's requested braking force calculating unit 90a, an adder 90b, and brake fluid pressure controller 90c.

The driver's requested braking force calculating unit 90a uses a map like that shown in FIG. 7 to calculate the braking force (driver's requested braking force) Fdb requested by the driver based on the amount (brake pedal actuation amount) SB by which the brake pedal 91 is depressed. The adder 90b adds a braking force correction amount ΔDb (explained later) to the calculated driver's requested braking force Fdb so as to calculate a target braking force and feeds the target braking force to the brake fluid pressure controller 90c. The brake fluid pressure controller 90c is configured to calculate a brake fluid pressure command value based on the target braking force. Brake devices 95 provided on the wheels of the vehicle operate in accordance with commands issued from the brake fluid pressure controller 90c.

Figure 8:
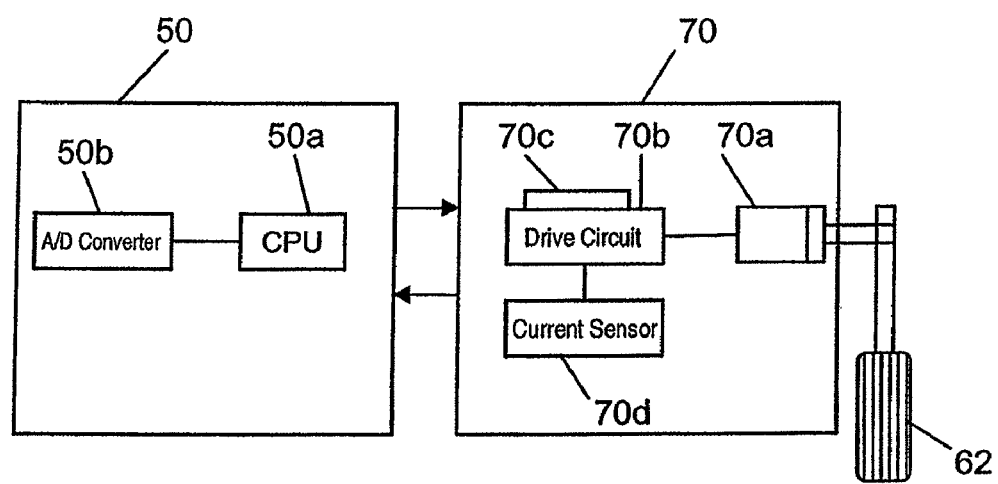
FIG. 8 is a diagram for explaining the general concept of detecting a failure of the accelerator pedal reaction force generating device.

As shown in FIG. 8, the accelerator pedal reaction force generating device 70 comprises a servomotor 70a that serves as an reaction force generating actuator built into the linkage mechanism of the accelerator pedal 61, a servomotor drive circuit 70b, a temperature sensor 70c serving to detect the temperature of the drive circuit 70b, and a current sensor 70d serving to detect a current flowing to the accelerator pedal reaction force generating device 70. The accelerator pedal reaction force generating device 70 is configured such that the drive circuit 70b outputs an electric current corresponding to a command from the controller 50 and the servomotor 70a generates a torque controlled by the electric current. As a result, the reaction force generated when the driver operates the accelerator pedal 61 can be controlled freely to substantially any desired value.

When the accelerator pedal reaction force generating device 70 is not executing reaction force control, a reaction force is exerted by, for example, a tensile spring (not shown in figures) in accordance with the accelerator pedal actuation amount SA. Moreover, when the accelerator pedal reaction force generating device 70 is not executing reaction force control, the signal line of the servomotor 70a is connected to ground such that an induced electromotive force is generated in the servomotor 70a. The induced electromotive force acts as a viscous force that inhibits operation of the pedal. As a result, a reaction force equal to the sum of the spring reaction force and the viscous force acts on the accelerator pedal 61. The reaction force characteristic resulting from the spring reaction force and the viscous force has a hysteresis aspect and is treated as the normal reaction force characteristic when reaction force control is not being executed.

The alarm device 100 comprises, for example, an alarm lamp and an alarm sound emitter installed in the instrument panel and is configured to issue an alarm in accordance with a command from the controller 50 when a failure is detected in the accelerator pedal reaction force generating device 70.

The operation of a vehicle driving assist system 1 in accordance with the first embodiment of the present invention will now be explained. First, an overview of the operation will be provided.

The controller 50 of the vehicle driving assist system 1 calculates a risk potential of the vehicle with respect to each obstacle based on the obstacle information detected by the obstacle detecting device 40. The term "risk potential" refers to the degree of risk or possibility of danger. In this embodiment, the risk potential is contrived to increase as the vehicle and an obstacle existing in the vicinity of the vehicle draw closer together. Thus, it can be the that the risk potential is a physical quantity that expresses how close the vehicle and the obstacle are to each other, i.e., the degree to which the vehicle and the obstacle have drawn near to each other (degree of convergence).

The controller 50 conveys the calculated risk potential to the driver by controlling the braking/driving force exerted against the vehicle and the actuation reaction force exerted by a driving operation device used by the driver to drive the vehicle, more specifically, the accelerator pedal 61.

If the accelerator pedal reaction force generating device 70, which serves to add a reaction force corresponding to the risk potential to the accelerator pedal 61, fails, it will not be able to add an actuation reaction force to the accelerator pedal 61. If the failure occurs while a risk potential exists, the additional reaction force will cease to be imposed on the accelerator pedal 61 and there is the possibility that the driver will detect an odd change in the actuation reaction force.

In the first embodiment, as described previously, the accelerator pedal reaction force generating device 70 uses a servomotor 70a. When a failure occurs, the signal line of the servomotor 70a is connected to ground such that a reaction force is obtained by using an induced electromotive force in the servomotor 70a in accordance with operation of the accelerator pedal 61. Thus, even though an actuation reaction force corresponding to the risk potential cannot be added when the accelerator pedal reaction force generating device 70 has failed, the driver can perform such driving operations as accelerating and decelerating the vehicle by operating the accelerator pedal 61. When the additional reaction force stops due to a failure, there is the possibility that fluctuations in the reaction force of the accelerator pedal 61 will cause the engine torque to fluctuate, thereby causing the driver to experience a feeling that something is odd.

Therefore, in the first embodiment, the engine torque characteristic is corrected when the accelerator pedal reaction force generating device 70 fails in order to prevent the driver from experiencing an odd feeling due to engine torque fluctuation.

Figure 9:
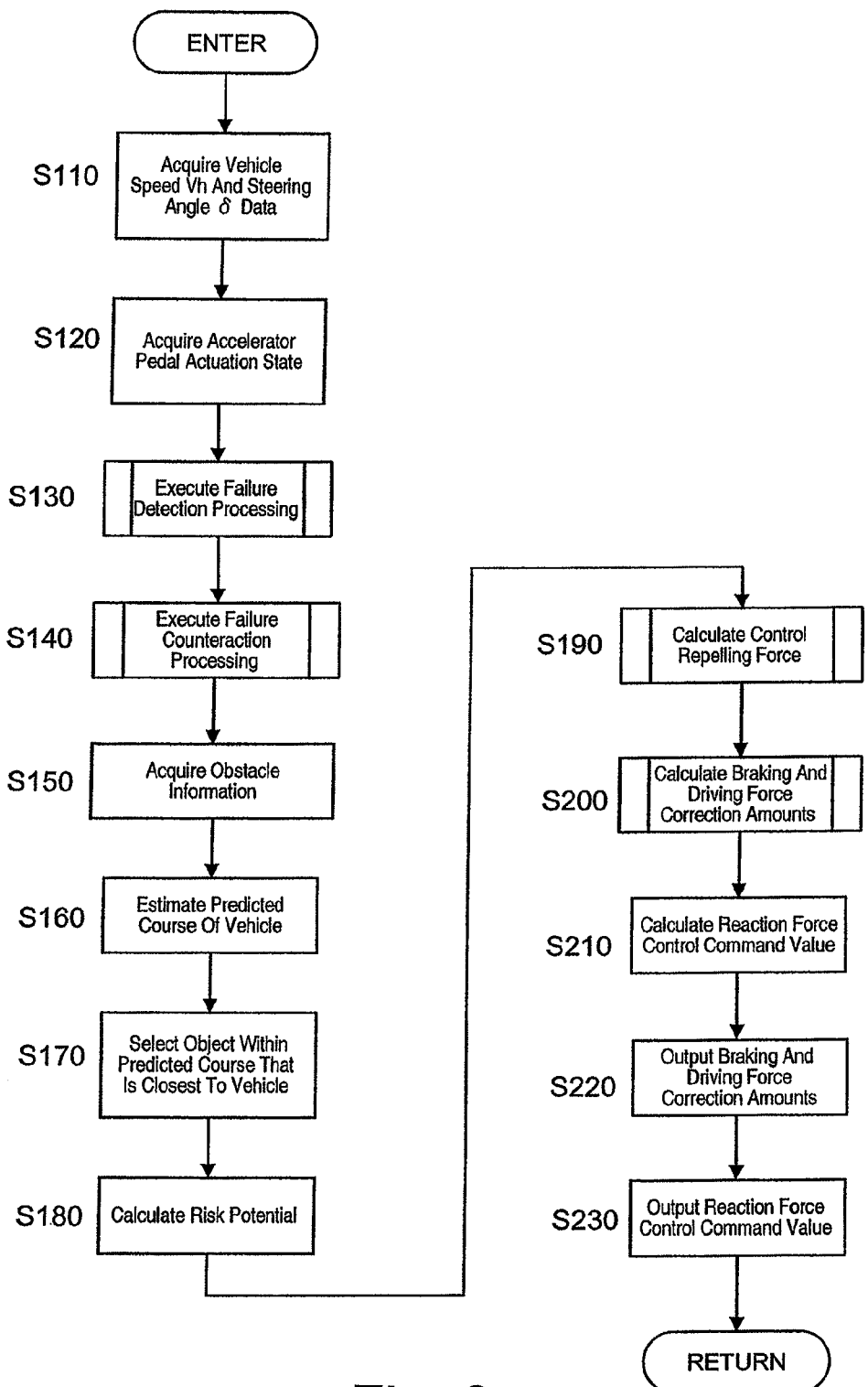
FIG. 9 is a flowchart showing the processing steps of a driving assistance control program in accordance with the first embodiment.

The operation of a vehicle driving assist system 1 in accordance with the first embodiment will now be explained in detail with reference to FIG. 9. FIG. 9 is a flowchart showing the processing steps of the driving assistance control executed by the controller 50 in the first embodiment. This control loop is executed continuously once per prescribed time period, e.g., every 50 msec.

In step S110, the controller 50 reads in the vehicle speed Vh detected by the vehicle speed sensor 20 and the steering angle S of the vehicle detected by the steering angle sensor 30. In step S120, the controller 50 reads in the accelerator pedal actuation amount SA detected by the accelerator pedal stroke sensor 62.

In step S130, the controller 50 determines if the accelerator pedal reaction force generating device 70 has failed. As shown in FIG. 8, the controller 50 detects the operating state of the accelerator pedal reaction force generating device 70 by A/D converting the detection values obtained from the temperature sensor 70c and the current sensor 70d with an A/D converter 50b. The controller 50 determines if the accelerator pedal reaction force generating device 70 has failed based on the detection values from the temperature sensor 70c and current sensor 70d and a reaction force command value sent from the CPU 50a to the accelerator pedal reaction force generating device 70.

Figure 10:
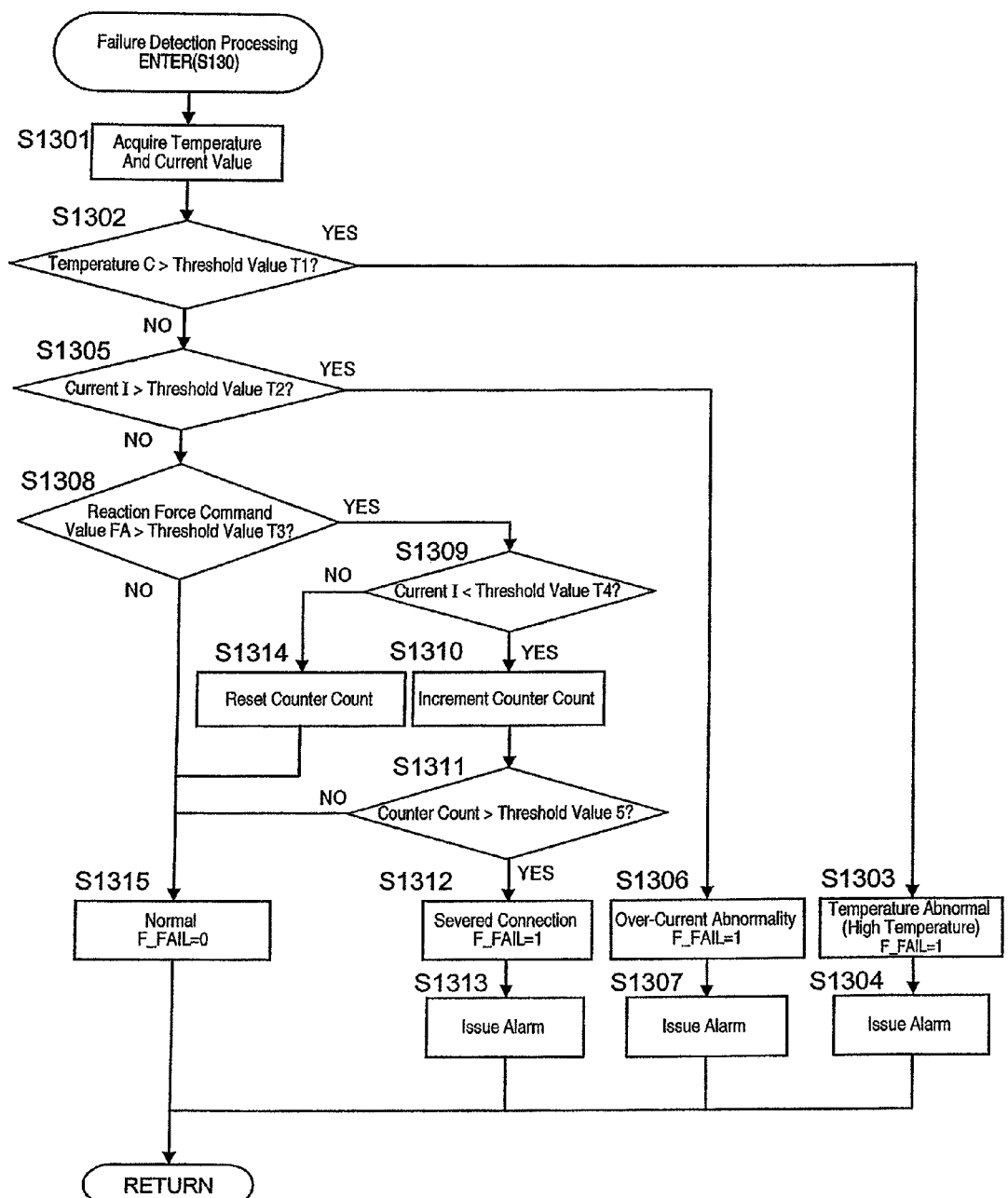
FIG. 10 is a flowchart for explaining the processing steps executed in order to detect a failure.

The control processing executed in order to accomplish the failure determination of step S130 will now be explained with reference to the flowchart of FIG. 10. In step S1301, the controller 50 acquires the detection value from the temperature sensor 70c and the detection value from the current sensor 70d of the accelerator pedal reaction force generating device 70. The controller 50 applies an appropriate A/D conversion to these detection values with the A/D converter 50b.

In step S1302, the controller 50 compares the temperature C of the drive circuit 70b acquired in step S1301 to a threshold value T1. The threshold value T1 is set in advance to a temperature value above which normal operation cannot be ensured in view of the circuit design. If the temperature C is larger than the threshold value T1, then the controller 50 proceeds to step S1303 where it determines that the temperature of the drive circuit is abnormally high and sets the value of a failure flag F_FAIL to 1. In step S1304, the controller 50 instructs the alarm device 100 to emit the alarm sound and illuminate the alarm lamp.

Meanwhile, if the temperature C is equal to or smaller than the threshold value T1, then the controller 50 proceeds to step S1305 and compares the current value I acquired in step S1301 to a threshold value T2. The threshold value T2 is set in advance to the largest current value that can occur during normal operation of the actuator, i.e., the servomotor 70a, in view of the circuit design. If the current value I is larger than the threshold value T2, then the controller 50 proceeds to step S1306 where it determines that the current is excessively high and sets the value of a failure flag F_FAIL to 1. In step S1307, the controller 50 instructs the alarm device 100 to emit the alarm sound and illuminate the alarm lamp.

Meanwhile, if the current value I is equal to or smaller than the threshold value T2, then the controller 50 proceeds to step S1308 and compares the reaction force command value FA outputted from the controller 50 in the previous control cycle to a threshold value T3. The threshold value T3 is set in advance to the smallest reaction force command value for which a drive current large enough to be distinguished from noise is required. If the reaction force command value FA is larger than the threshold value T3, then the controller 50 proceeds to step S1309 and compares the current value I to a threshold value T4. The threshold value T4 is set in advance to a value for determining if the current is substantially zero while taking the noise component into account. If the current value I is smaller than the threshold value T4, then the controller 50 proceeds to step S1310 and increments a counter Count. In step S1311, the controller compares the value of the counter Count to a threshold value T5. The threshold value T5 is set to a value, e.g., 0.5 seconds, which is sufficiently longer than the response time of the drive circuit 70b.

If the value of the counter Count is larger than the threshold value T5, i.e., if an appropriate current value I has not been detected after a prescribed amount of time has elapsed since a current command corresponding to the reaction force command value FA was issued, then the controller 50 proceeds to step S1312 where it determines that a severed connection exists in the servomotor 70a or the drive circuit 70b and sets the failure flag F_FAIL to 1. In step S1313, the controller 50 instructs the alarm device 100 to emit the alarm sound and illuminate the alarm lamp.

If it determines in step S1309 that the current value I is equal to or larger than the threshold value T4, then the controller 50 proceeds to step S1314 and resets the counter Count before proceeding to step S1315. Meanwhile, the controller 50 proceeds to step S1315 if it determines in step S1311 that the value of the counter Count is equal to or smaller than the threshold value T5 or if it determines in step S1308 that the reaction force command value FA is equal to or smaller than the threshold value T3. In step S1315, the controller 50 determines that an abnormality does not exist and sets the failure flag F_FAIL to 0.

Figure 11:
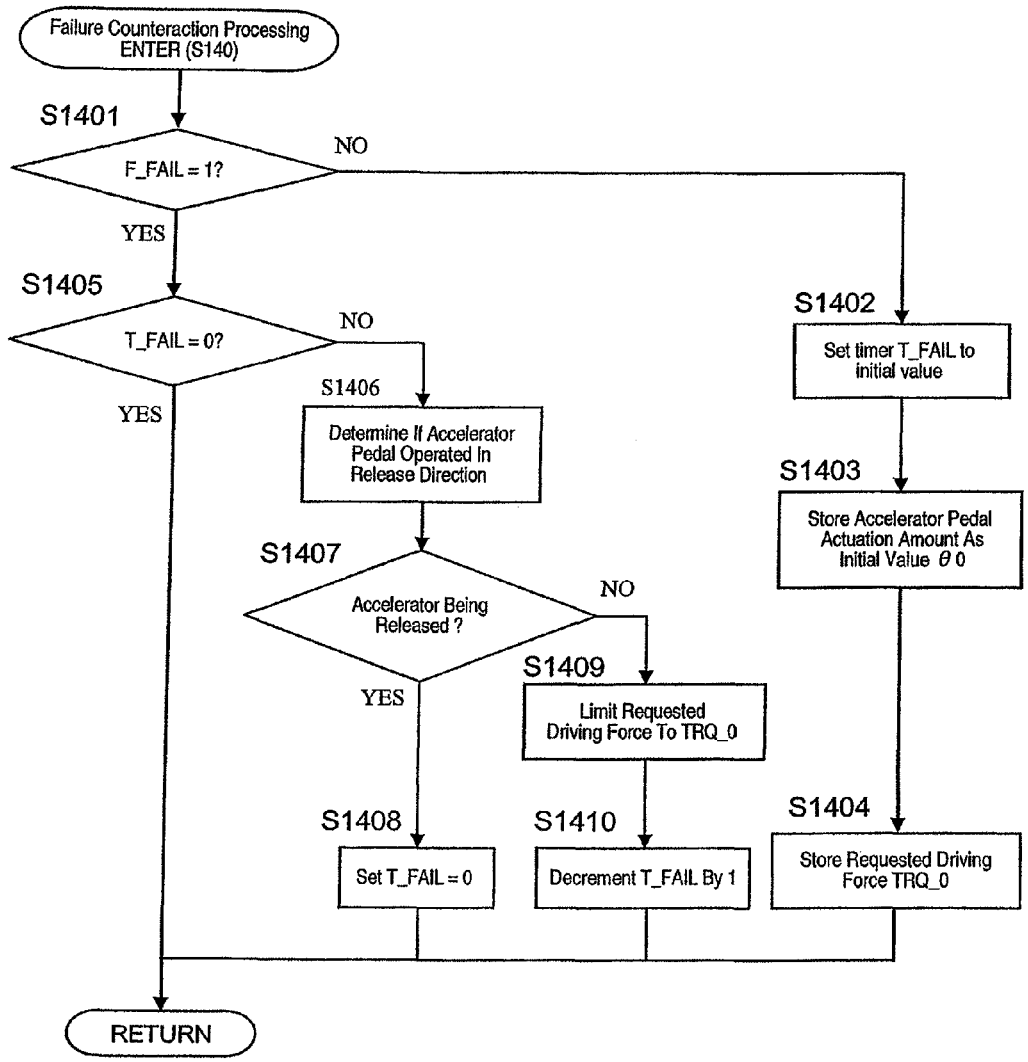
FIG. 11 is a flowchart for explaining the processing steps executed in order to counteract a failure.

After the controller 50 executes failure detection processing with respect to the accelerator pedal reaction force generating device 70 in step S130, the controller 50 proceeds to step S140. In step S140, the controller executes failure countermeasure processing depending on whether or not a failure exists. More specifically, the controller 50 corrects the engine torque characteristic such that the engine torque is limited to an upper limit value when a failure occurs. The control processing executed in order to accomplish step S140 will now be explained with reference to the flowchart of FIG. 11.

In step S1401, the controller 50 determines if a failure has occurred by checking if the value of the failure flag F_FAIL set in step S130 is 1. If the value of the flag F_FAIL is 0, then an abnormality does not exist and the controller 50 proceeds to step S1402, where it sets a timer T_FAIL to an initial value. The initial value is set to a maximum amount of time, e.g., 1 second, expected to elapse before the driver exhibits a reflexive response in his or her operation of the accelerator pedal after a failure occurs in the accelerator pedal reaction force generating device 70.

In step S1403, the controller stores the current accelerator pedal actuation amount SA detected by the accelerator pedal stroke sensor 62 as an initial value θ0. In step S1404, the controller 50 stores a driver's requested driving force TRQ_0 corresponding to the current accelerator pedal actuation amount SA. The controller 50 is provided with a map like the map shown in FIG. 5.

Figure 12:
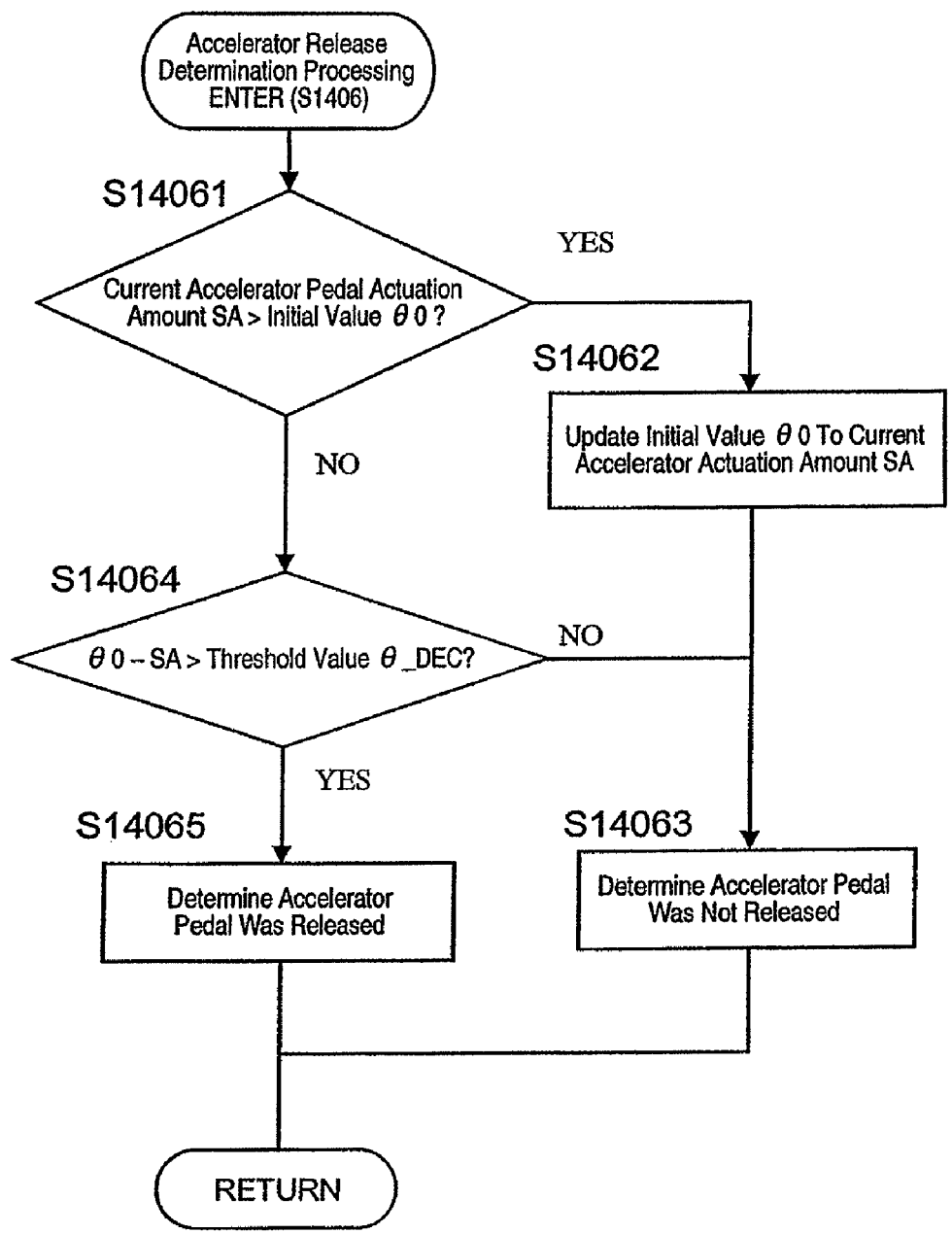
FIG. 12 is a flowchart for explaining the processing steps executed in order to determine if the accelerator pedal is being operated in the release direction.

If it determines in step S1401 that a failure exists, i.e., that the value of F_FAIL is 1, then the controller 50 proceeds to step S1405 and determines if the value of the timer T_FAIL is 0. If the value of the timer T_FAIL is 0, the processing of step S140 ends. If the value of the timer T_FAIL is not 0, then the controller 50 proceeds to step S1406 and determines if the accelerator pedal 61 is being operated in the release direction. The control processing executed in order to determine if the accelerator pedal 61 is being operated in the release direction will now be explained with reference to the flowchart of FIG. 12.

In step S14061, the controller 50 determines if the current accelerator pedal actuation amount SA detected by the accelerator pedal stroke sensor 62 is larger than the initial value θ0. If the actuation amount SA is larger than θ0, then the controller 50 proceeds to step S14062 and sets the current accelerator pedal actuation amount SA as the initial value θ0. In other words, if the accelerator pedal 61 is being depressed more than the initial value θ0, the controller updates the initial value θ0 to the current actuation amount SA. In step S14063, the controller determines that the accelerator pedal 61 is not being operated in the release direction.

If the actuation amount SA is equal to or smaller than θ0, then the controller 50 proceeds to step S14064 and determines if the difference between the initial value θ0 and SA (θ0−SA) is larger than a threshold value θ_DEC. The threshold value θ_DEC is set to an appropriate value for determining if the accelerator pedal 61 has been operated in the release direction. If the difference (θ0−SA) is larger than θ_DEC, then the controller 50 proceeds to step S14065 and determines that the accelerator pedal 61 has been operated in the release direction. If the difference (θ0−SA) is equal to or smaller than θ_DEC, then the controller 50 proceeds to step S14063 and determines that the accelerator pedal 61 has not been operated in the release direction.

After the controller 50 determines if the accelerator pedal 61 has been operated in the release direction in step S1406, the controller 50 proceeds to step S1407. In step S1407, the controller 50 checks the result of the determination made in step S1406. If the accelerator pedal 61 has been operated in the return direction, then the controller 50 proceeds to step S1408 and resets the timer T_FAIL to 0. Meanwhile, if the accelerator pedal 61 has not been operated in the return direction, then the controller 50 proceeds to step S1409 and sets the value TRQ_0 stored in step S1404 as the upper limit value of the driver's requested driving force. The requested driving force upper limit value TRQ_0 is used in a driving force control sequence described later. In step S1410, the controller 50 reduces the value of the timer T_FAIL by 1.

After the controller 50 completes the failure countermeasure processing in step S140, the controller 50 proceeds to step S150. In step S150, the controller 50 reads in the information regarding the plurality of preceding obstacles calculated by the obstacle detecting device 40 based on the detection results from the radar device 10 and the vehicle speed sensor 20. The information related to the preceding obstacles comprises, for example, the longitudinal distance (following distance) D from the vehicle to each obstacle, the lateral position x of each obstacle with respect to the vehicle, and the longitudinal position y of each obstacle with respect to the vehicle.

In step S160, the controller 50 estimates the path of the vehicle based on the vehicle speed Vh and the steering angle δ read in step S110. The method of estimating a predicted course of the vehicle will now be explained with reference to FIGS. 13 and 14. In order to estimate a predicted course of the vehicle, the controller 50 calculates the radius of curvature R of the path the vehicle will follow if it continues in the direction of the arrow as shown in FIG. 14. First, the rate of curvature ρ (units: 1/m) at which the vehicle is turning is calculated. The rate of curvature can be calculated as shown in the Equation 1 below based on the vehicle speed Vh and the steering angle θ.

$$\rho = 1/\{L(1 + A \times Vh^2)\} \times \delta/N \qquad \text{(Equation 1)}$$

In the Equation 1, the term L is the wheel base of the vehicle, the term A is a stability factor (positive constant) determined based on the vehicle, and the term N is the steering gear ratio.

The radius of curvature R is expressed according to the Equation 2 below based on the rate of curvature ρ.

$$R = 1/\rho \qquad \text{(Equation 2)}$$

Figure 13:
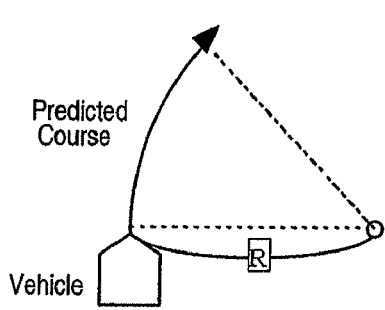
FIG. 13 is a diagram for explaining the method of calculating a predicted course of the vehicle.
Figure 14:
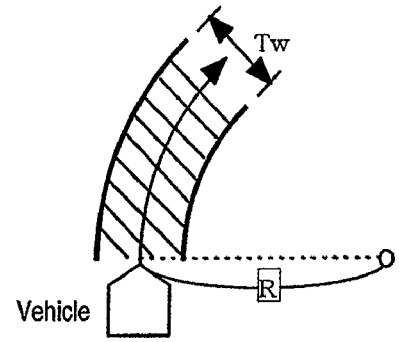
FIG. 14 is a diagram for explaining the method of calculating a predicted course of the vehicle.

The path that the vehicle will follow can then be estimated as an arc having the radius of curvature R calculated using Equation 2, as shown in FIG. 13. A region having a width Tw and a centerline corresponding to the arc having the radius of curvature R, as shown in FIG. 14, can then be set as a predicted course the vehicle can be expected to follow. The width Tw is set to an appropriate value in advance based on the width of the vehicle.

In step S170, the controller 50 determines which of the objects detected by the obstacle detecting device 40 are located within the predicted course of the vehicle and, from among those objects located within the predicted course, selects the object that is closest to the vehicle as a "preceding obstacle." The selected preceding obstacle is the obstacle targeted in the calculation of the risk potential RP executed in the next step.

In step S180, the controller calculates the risk potential RP of the vehicle with respect to the preceding obstacle selected in step S170. In this embodiment, the time to headway THW and the time to collision TTC of the vehicle with respect to the preceding obstacle, e.g., a preceding vehicle, are calculated as the risk potential RP. The time to headway THW is a physical quantity expressing the amount of time required for the vehicle to reach the current position of the preceding vehicle and is calculated using the Equation 3 shown below.

$$THW = D/Vh \qquad \text{(Equation 3)}$$

The time to collision ITC is a physical quantity indicating the current degree of convergence of the vehicle with respect to the preceding vehicle. More specifically, the time to collision TTC is a value indicating the number of seconds until the following distance D becomes zero and the vehicle contacts the preceding vehicle if the current traveling state continues, i.e., if the vehicle speed Vh and the relative velocity Vr remain constant. The relative velocity Vr is calculated as the difference between the speed of the vehicle and the speed of the preceding vehicle (Vr=vehicle speed−speed of preceding vehicle) and is set to 0 (Vr=0) when the vehicle speed is smaller than the speed of the preceding vehicle. The time to collision TTC with respect to the preceding obstacle is found using the Equation 4 shown below.

$$TTC = D/Vr \qquad \text{(Equation 4)}$$

The smaller the time to collision TTC is, the more eminent the contact with the preceding vehicle is and the larger the degree of convergence with respect to the preceding vehicle is. For example, it is known that when approaching a preceding vehicle, most drivers start taking action to decelerate before the time to collision TTC reaches 4 seconds or less. Thus, since the time to head way THW and the time to collision TTC are contrived such that the values thereof become smaller as the vehicle and the preceding vehicle become closer to each other, both the time to head way THW and the time to collision TTC can be considered to be risk potentials RP indicating the degree of convergence between the vehicle and the preceding vehicle.

In step S190, the controller 50 calculates a control repelling force Fc that will serve as a reference for calculating the accelerator pedal actuation reaction force and the braking and driving force correction amounts. The method of calculating the control repelling force Fc will now be described.

Figure 15:
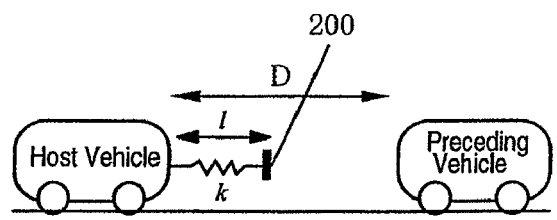
FIGS. 15 (a) and 15 (b) illustrate the concept of braking/driving force control.
Figure 15:

For the purpose of calculating the control repelling force Fc, consider a model in which it is assumed that an imaginary elastic body 200 of length l is provided on the front of the vehicle in which the assistance system 1 is installed, as shown in FIG. 15 (a). The imaginary elastic body 200 touches against the preceding vehicle and is compressed, thereby generating an pseudo traveling resistance against the movement of the vehicle in which the assistance system 1 is installed. The control repelling force Fc is defined to be the repelling force that results when, as shown in FIG. 15 (b), the imaginary elastic body 200 contacts the preceding vehicle and is compressed.

Figure 16:
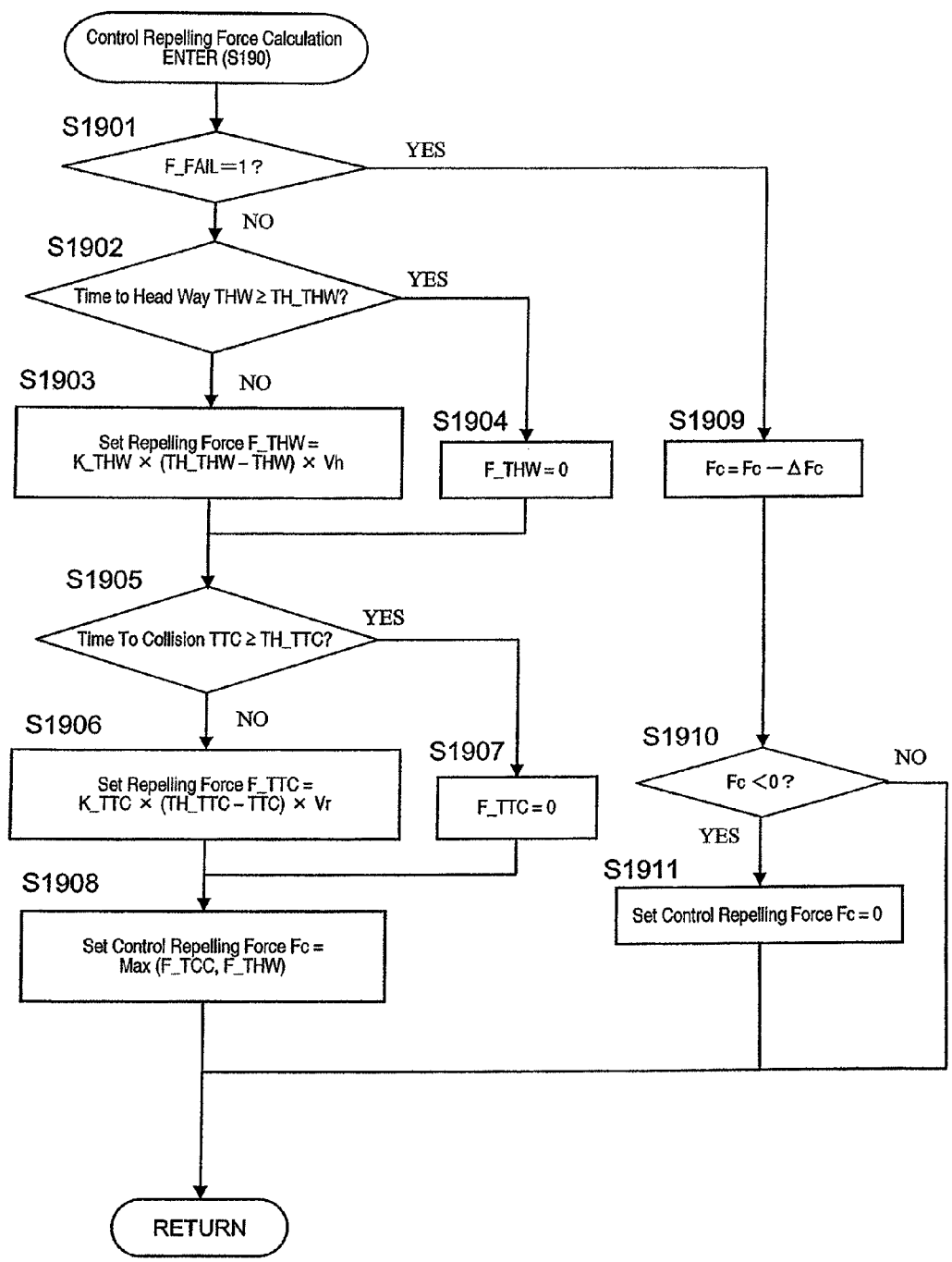
FIG. 16 is a flowchart for explaining the processing steps executed in order to calculate the control repelling force.

In this embodiment, a repelling force F_THW based on the time to head way THW is calculated using a model in which an imaginary elastic body correlated to the time to head way THW is assumed to exist between the vehicle and the preceding obstacle, and a repelling force F_TTC based on the time to collision TTC is calculated using a model in which an imaginary elastic body correlated to the time to collision TTC is assumed to exist between the vehicle and the preceding obstacle. The reaction forces F_THW and F_TTC are the reaction forces exerted by the imaginary elastic bodies of the respective models. The processing executed in order to calculate the control repelling force Fc will now be explained with reference to the flowchart of FIG. 16.

In step S1901, the controller 50 determines if the value of the failure flag F_FAIL is 1. If the value of the failure flag F_FAIL is 0, i.e., if an abnormality does not exist in the accelerator pedal reaction force generating device 70, then the controller 50 proceeds to step S1902 and compares the time to head way THW to a threshold value TH_THW The threshold value TH_THW is set to an appropriate time to head way value (e.g., 1 second) for determining that it is time for reaction force control and braking/driving force control to be started. If the time to head way THW is smaller than the threshold value TH_THW (THW<TH_THW), then the controller 50 proceeds to step S1903. In step S1903, then controller 50 calculates the repelling force F_THW based on the time to head way THW by using the vehicle speed Vh and the time to head way THW in the Equation 5 shown below.

$$F\_THW = K\_THW \times (TH\_THW - THW) \times Vh \quad \text{(Equation 5)}$$

In Equation 5, the term K_THW is the spring constant of the imaginary elastic body correlated to the time to head way THW and the value of TH_TWH×Vh corresponds to the length of the imaginary elastic body.

If the time to head way THW is found to be equal to or larger than the threshold value TH_THW in step S1902, then the controller 50 proceeds to step S1904 and sets the repelling force F_THW to 0.

In step S1905, the controller 50 compares the time to collision TTC to the threshold value TH_TCC. The threshold value TH_TTC is set to an appropriate time-to-contact value (e.g., 10 seconds) for determining that it is time for reaction force control and braking/driving force control to be started. If the time to collision TTC is smaller than the threshold value TII_TTC (TTC<TH_TTC) then the controller 50 proceeds to step S1906. In step S1906, the controller 50 calculates the repelling force F_TTC based on the time to collision TTC by using the relative velocity Vr and the time to collision ITC in the Equation 6 shown below.

$$F\_TTC = K\_TTC \times (TH\_TTC - TTC) \times Vr \quad \text{(Equation 6)}$$

In Equation 6, the term K_TTC is the spring constant of the imaginary elastic body correlated to the time to collision TTC and the value of TH_TTC×Vr corresponds to the length of the imaginary elastic body.

If time to collision TTC is found to be equal to or larger than the threshold value TH_TTC in step S1905, then the controller 50 proceeds to step S1907 and sets the repelling force F_TTC to 0.

In step S1908, the controller 50 compares the repelling force F_THW based on the time to head way THW calculated in step S1903 or S1904 to the repelling force F_TTC based on the time to collision TTC calculated in step S1906 or 1907 and selects the larger value as the repelling force Fc to be used for actuation reaction force control and braking/driving force control.

Meanwhile, if the value of the failure flag F_FAIL is found to be 1 in step S1901, i.e., if an abnormality does exist in the accelerator pedal reaction force generating device 70, then the controller 50 proceeds to step S1909 and subtracts a prescribed change amount ΔFc from the control repelling force Fc set in the previous control cycle. The change amount ΔFc is set in advance to such a value that the driver will not experience an odd feeling when it is subtracted from the control repelling force Fc. In step S1910, the controller 50 determines if the control repelling force Fc calculated in step S1909 is smaller than 0. If the control repelling force Fc is smaller than 0, then the controller 50 proceeds to step S1911 and sets the control repelling force Fc to 0. If the control repelling force Fc is equal to or larger than 0, then the controller 50 uses the control repelling force Fc calculated in step S1909 as is.

After the controller 50 calculates the control repelling force Fc in step S190, the controller 50 proceeds to step S200.

Figure 17:
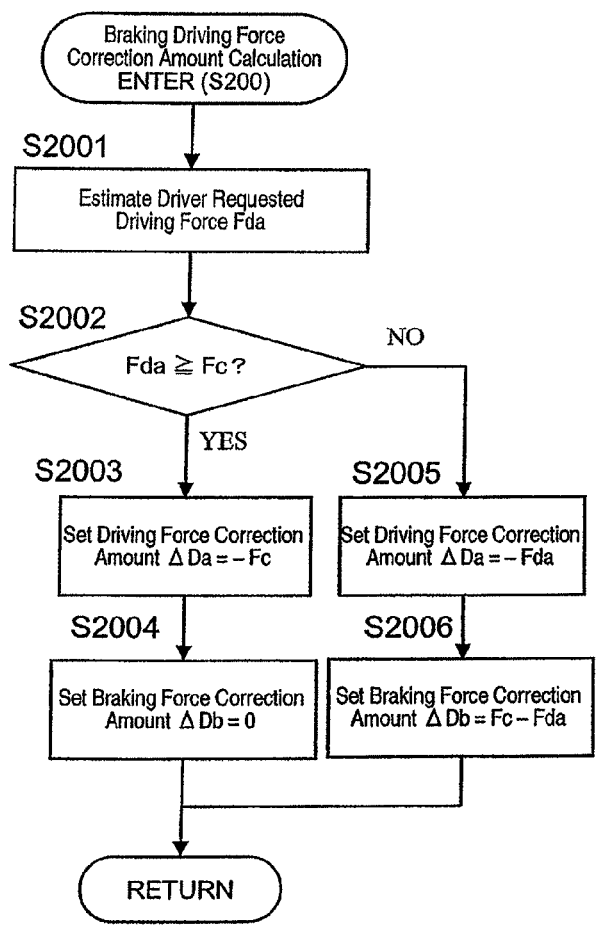
FIG. 17 is a flowchart for explaining the processing steps executed in order to calculate the braking and driving force correction amounts.

In step S200, the controller 50 uses the control repelling force Fc calculated in step S190 to calculate the driving force correction amount ΔDa and the braking force correction amount ΔDb to be used for braking/driving force control. The control processing executed in order calculate the braking and driving force correction amounts will now be explained with reference to the flowchart of FIG. 17.

In step S2001, the controller 50 estimates the driver's requested driving force Fda. The controller 50 contains a driver's requested driving force calculation map identical to that stored inside the driving force control device 60 (see FIG. 5) and estimates the driver's requested driving force Fda based on the accelerator pedal actuation amount SA. At the same time, the controller 50 also limits the driver's requested driving force Fda using the driver's requested driving force upper limit value TRQ_0 set in step S140. As a result, if the accelerator pedal 61 is not operated in the release direction during the period from when the failure occurs in the accelerator pedal reaction force generating device 70 until a prescribed amount of time elapses, the driver's requested driving force Fda is limited to a value TRQ_0 corresponding to the accelerator pedal actuation amount SA detected before the failure occurred. Otherwise, the controller 50 sets the driver's requested driving force Fda to a value corresponding to the current accelerator pedal actuation amount SA.

In step S2002, the controller 50 compares the driver's requested driving force Fda estimated in step S2001 to the control repelling force Fc. If the driver's requested driving force Fda is equal to or larger than control repelling force Fc (Fda≧Fc), then the controller 50 proceeds to step S2003. In step S2003, the controller 50 sets the driving force correction amount ΔDa to the value −Fc. The controller 50 then sets the braking force correction amount ΔDb to 0 in step S2004. In other words, since the difference Fda−Fc is equal to or larger than 0 (Fda−Fc>0), a positive driving force will remain even after the driving force Fda is corrected based on the control repelling force Fc. Thus, the required amount of correction can be accomplished with only the driving force control device 60 outputting a correction amount. When this control is executed, the vehicle will behave in such a fashion that the full driving force expected by the driver will not be delivered even though the driver is depressing the accelerator pedal 61. If the corrected driving force is larger than the traveling resistance, the driver will feel the vehicle exhibit more sluggish acceleration behavior. If the corrected driving force is smaller than the traveling resistance, the driver will feel the vehicle decelerate.

Meanwhile, if the result of step S2002 is negative, i.e., if the driver's requested driving force Fda is smaller than the control repelling force Fc (Fda<Fc), the targeted correction amount cannot be obtained with a correction amount output from the driving force control device 60 alone. Therefore, the controller 50 proceeds to step S2005 and sets the driving force correction amount ΔDa to −Fda. Then, in step S2006, the controller 50 sets the braking force correction amount ΔDb to the amount by which the correction amount ΔDa is insufficient (Fc−Fda). The driver perceives this control as deceleration behavior of the vehicle.

Figure 18:
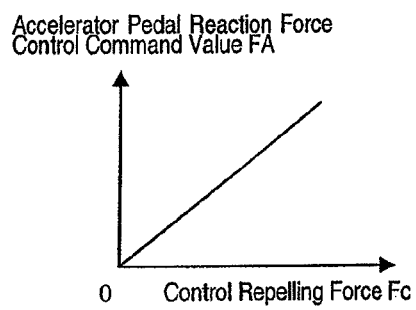
FIG. 18 is a plot of the accelerator pedal reaction force control command value versus the control repelling force.

After the controller 50 calculates the driving force correction amount ΔDa and the braking force correction amount ΔDb in step S200, the controller 50 proceeds to step S210. In step S210, the controller 50 calculates a control amount for the actuation reaction force to be exerted by (generated in) the accelerator pedal 61, i.e., a reaction force control command value FA, based on the control repelling force Fc calculated in step S190. FIG. 18 is a plot of the accelerator pedal reaction force control command value FA versus the control repelling force Fc. As shown in FIG. 18, the accelerator pedal reaction force control command value FA increases as the control repelling force Fc increases.

In step S220, the controller 50 sends the driving force correction amount ΔDa and braking force correction amount ΔDb calculated in step S200 to the driving force control device 60 and the braking force control device 90, respectively. The driving force control device 60 calculates a target driving force based on the driving force correction amount ΔDa and the requested driving force Fda and sends a command to the engine controller 60*c* instructing it to generate the calculated target driving force. The braking force control device 90 calculates a target braking force based on the braking force correction amount ΔDb and the requested braking force Fdb and sends a command to the brake fluid pressure controller 90*c* instructing it to generate the target braking force.

In step S230, the controller 50 sends the accelerator pedal reaction force control command value FA calculated in step S210 to the accelerator pedal reaction force control device 70. The accelerator pedal reaction force generating device 70 controls the accelerator pedal reaction force such that a reaction force corresponding to the command value from the controller 50 is added to the normal reaction force corresponding to the accelerator pedal actuation amount SA. After the command value is sent, the current cycle of the control loop ends.

Figure 19:
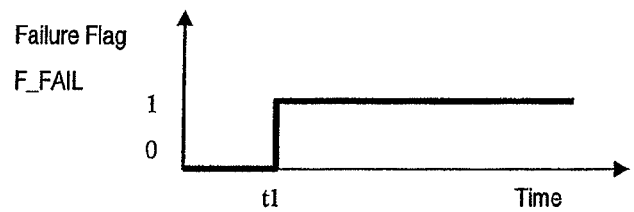
FIGS. 19 (a) to 19 (c) show examples of how the failure flag, the accelerator pedal actuation amount, and the engine torque change with time.
Figure 19:
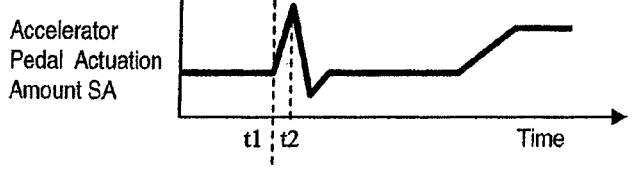
Figure 19:
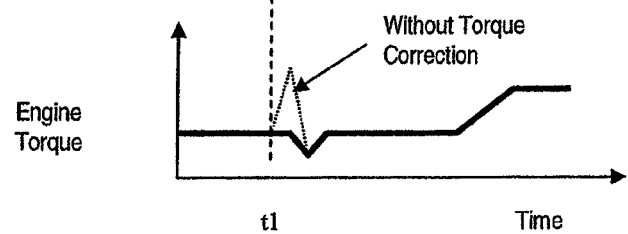

The operational effects achieved with a vehicle driving assist system 1 in accordance with the first embodiment of the present invention will now be explained. FIGS. 19 (*a*) to 19 (*c*) show examples of how the failure flag F_FAIL, the accelerator pedal actuation amount SA, and the engine torque change with time. At a time t1, a failure is detected in the accelerator pedal reaction force generating device 70 and the value of the failure flag F_FAIL goes to 1. As a result, the additional reaction force exerted by the accelerator pedal 61 in accordance with the risk potential RP, i.e., the control repelling force Fc, decreases. Meanwhile, the accelerator pedal actuation amount SA increases, as shown in FIG. 19 (*b*). However, as indicated with a broken line in FIG. 20, the value of the driver's requested driving force Fda with respect to the accelerator pedal actuation amount SA is limited to the upper limit torque TRQ_0 starting from the failure detection time t1. As a result, even though the accelerator pedal actuation amount increases, the engine torque exerted against the vehicle does not increase, as indicated with the solid line in FIG. 19 (*c*).

Figure 20:
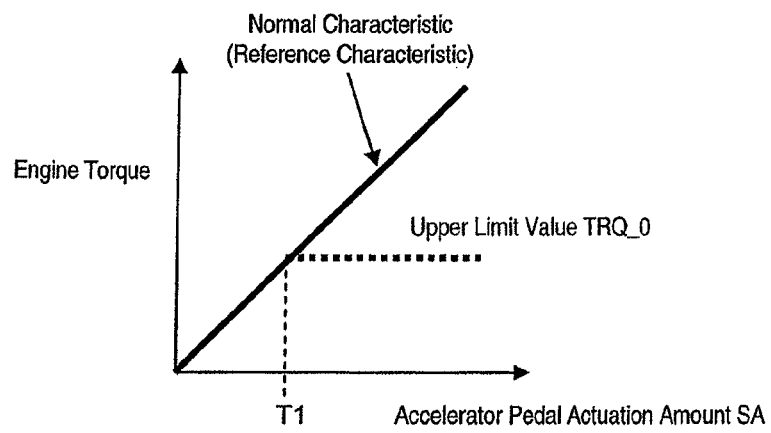
FIG. 20 is a plot illustrating the operational action of the first embodiment.

At a time t2, the accelerator pedal is operated in the release direction and the driver requested driving force Fda begins being calculated according to the normal characteristic indicated with the solid-line curve in FIG. 20. As a result, the engine torque changes in accordance with the accelerator pedal actuation amount SA.

The first embodiment described heretofore can thus provide the following operational effects.

The vehicle driving assist system 1 is configured to detect at least the host vehicle speed Vh and the following distance D of the host vehicle with respect to an obstacle existing in front of the host vehicle, and, based on these detected quantities, the system 1 calculates a risk potential RP indicating the degree of convergence of the vehicle with respect to the obstacle. Additionally, the system 1 calculates an actuation reaction force to be exerted by the accelerator pedal 61, i.e., an accelerator pedal reaction force control command value FA, based on the risk potential RP and instructs the accelerator pedal reaction force generating device 70 to cause the accelerator pedal 61 to exert the calculated actuation reaction force. The vehicle driving assist system 1 also detects if the accelerator pedal reaction force 70 has failed and corrects an engine torque characteristic (hereinafter called "reference characteristic") expressing the engine torque versus the accelerator pedal actuation amount SA based on the result of the failure detection. As a result, when the accelerator pedal reaction force generating device 70 fails, the engine torque characteristic with respect to the accelerator pedal actuation amount is corrected such that the engine torque can be controlled in such a fashion that the driver does not experience a feeling that something is odd about the vehicle.

The vehicle driving assist system 1 is configured to correct the reference characteristic such that the amount by which the engine torque increases with respect to an increase in the accelerator pedal actuation amount SA is suppressed for a prescribed amount of time, i.e., until the time T_FAIL elapses, after a failure of the accelerator pedal reaction force generating section 70 is detected. After the prescribed amount of time has elapsed or when the system 1 detects that the accelerator pedal 61 has been operated in the release direction, the system 1 returns from the corrected engine torque characteristic to the reference characteristic indicated with the solid-line curve in FIG. 20. More specifically, the system 1 limits the engine requested driving force Fda to the upper limit value TRQ_0 corresponding to the accelerator pedal actuation amount SA that existed immediately before the failure was detected. As a result, even if the accelerator pedal actuation amount SA increases after the accelerator pedal reaction force generating device 70 fails, the engine torque can be limited such that it does not increase.

The accelerator pedal reaction force generating device 70 has the actuator 70a and the actuator drive circuit 70b for adding an actuation reaction force to the accelerator pedal 61. The controller 50 is configured to detect abnormalities in the actuator 70a and the actuator drive circuit 70b. As a result, when it detects an abnormality in the actuator 70a or the drive circuit 70b, the controller 50 can determine that the accelerator pedal reaction force generating device 70 has failed and correct the engine torque characteristic.

The controller 50 is configured to detect such abnormalities in the actuator 70a and the actuator drive circuit 70b as severed connections, short circuits, and overheating. When it detects a severed connection, a short circuit, or overheating, the controller 50 can determine that the accelerator pedal reaction force generating device 70 has failed and correct the engine torque characteristic.

The controller 50 is configured to detect that the accelerator pedal 61 has been operated in the release direction when the accelerator pedal actuation amount SA decreases by a prescribed amount θ_DEC or more. As a result, operation of the accelerator pedal 61 in the release direction can be determined accurately.

The vehicle driving assist system 1 is provided with the driving force control device 60 and the braking force control device 90 for controlling the driving force and the braking force exerted against the host vehicle based on the risk potential. If a failure of the accelerator pedal reaction force generating device 70 is detected, the control amounts for the braking force and the driving force controlled in accordance with the risk potential RP are gradually decreased. More specifically, when a failure is detected, the change amount ΔFc of the control repelling force Fc is gradually reduced, thereby causing the driving force correction amount ΔDa and the braking force correction amount ΔDb to gradually decrease. As a result, the when the accelerator pedal reaction force generating device 70 fails, the control executed by the entire vehicle driving assist system 1 is ended in a gradual manner.

Second Embodiment

A vehicle driving assist system in accordance with a second embodiment of the present invention will now be explained. The basic constituent features of a vehicle driving assist system in accordance with the second embodiment are the same as those of the first embodiment shown in FIG. 1. The second embodiment will be explained mainly by describing its differences with respect to the first embodiment.

In the second embodiment, when a failure of the accelerator pedal reaction force generating device 70 is detected, the engine torque characteristic is corrected such that the engine torque does not readily increase when the accelerator pedal 61 is depressed. More specifically, the amount by which the driver's requested driving force Fda increases with respect to an increase in accelerator pedal actuation amount SA is reduced.

Figure 21:
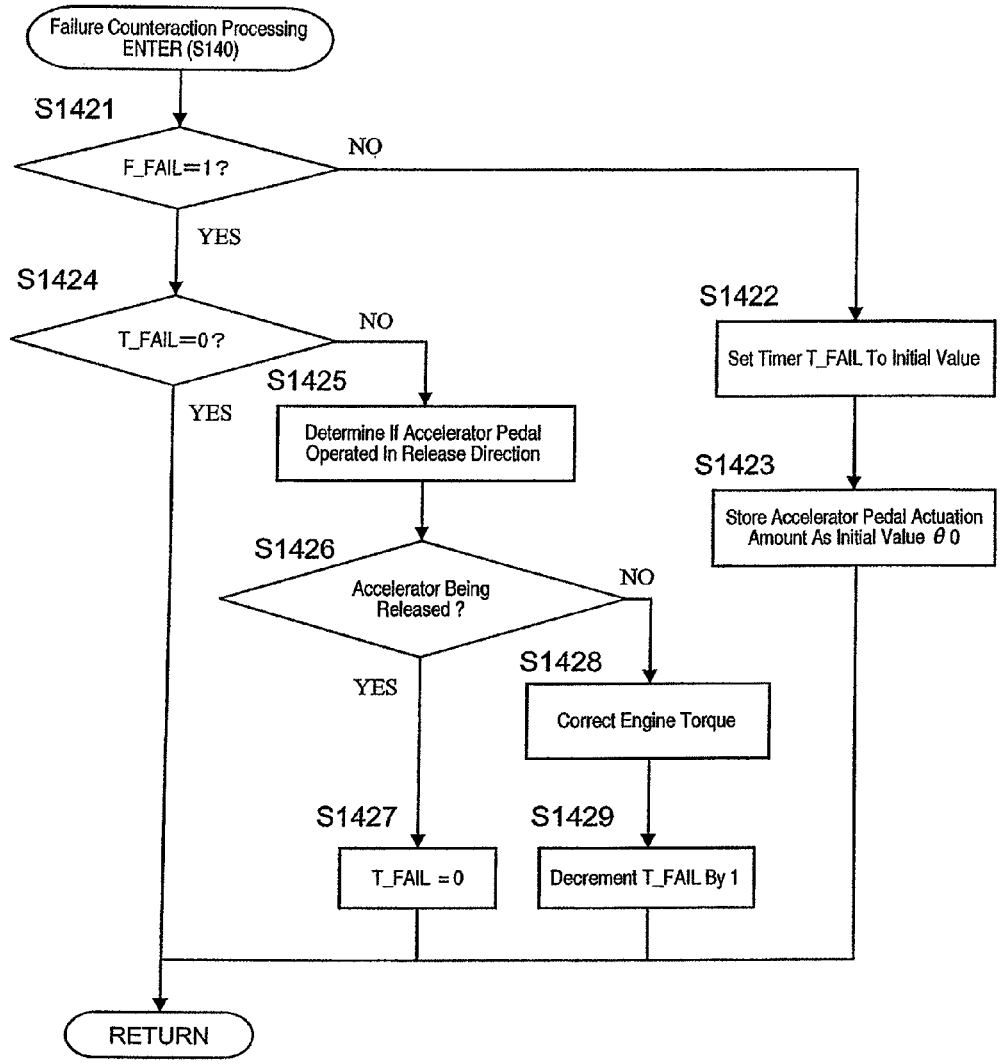
FIG. 21 is a flowchart showing the processing steps executed in a second embodiment in order to counteract a failure.

The failure countermeasure processing executed in the second embodiment will now be explained with reference to the flowchart of FIG. 21. This processing is executed at step S140 of the flowchart shown in FIG. 9.

In step S1421, the controller 50 determines if a failure has occurred by checking if the value of the failure flag F_FAIL set in step S130 is 1. If the value of the flag F_FAIL is 0, then an abnormality does not exist and the controller 50 proceeds to step S1422, where it sets a timer T_FAIL to an initial value. In step S1423, the controller 50 stores the current accelerator pedal actuation amount SA detected by the accelerator pedal stroke sensor 62 as an initial value θ0.

If it determines in step S1421 that a failure exists, i.e., that the value of F_FAIL is 1, then the controller 50 proceeds to step S1424 and determines if the value of the timer T_FAIL is 0. If the value of the timer T_FAIL is 0, the processing of step S140 ends. If the value of the timer T_FAIL is not 0, then the controller 50 proceeds to step S1425 and determines if the accelerator pedal 61 is being operated in the release direction. In step S1426, the controller 50 checks the result of the determination made in step S1425. If the accelerator pedal 61 has been operated in the return direction, then the controller 50 proceeds to step S1427 and resets the timer T_FAIL to 0. Meanwhile, if the accelerator pedal 61 has not been operated in the release direction, then the controller 50 proceeds to step S1428 and executes engine torque correction processing such that an increase in engine torque will be suppressed.

Figure 22:
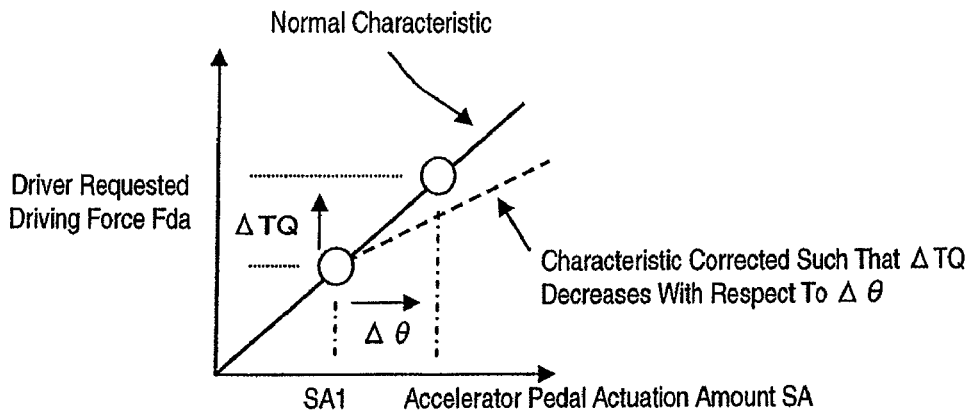
FIG. 22 is a diagram illustrating the control executed in order to suppress the requested driving force with respect to depression of the accelerator pedal.

FIG. 22 shows a plot of the driver's requested driving force Fda versus the accelerator pedal actuation amount SA. When the accelerator pedal reaction force generating device 70 is operating normally, i.e., is not failing, the driver's requested driving force Fda increases proportionally with respect to the accelerator pedal actuation amount SA as indicated with the solid-line curve. If a failure of the accelerator pedal reaction force generating device 70 is detected when, for example, the accelerator pedal actuation amount SA equals a value SA1, the relationship between the driver's requested driving force Fda and the accelerator pedal actuation amount SA is corrected such that the amount by which the driver's requested driving force Fda increases in response to any further depression of the accelerator pedal 61 is smaller than normal. In other words, the amount ΔTQ by which the driver's requested driving force Fda changes with respect to an increase Δθ in the accelerator pedal actuation amount SA is decreased in comparison to the amount by which the driver's requested driving force Fda would change if the accelerator pedal reaction force generating device 70 were operating normally.

Figure 23:
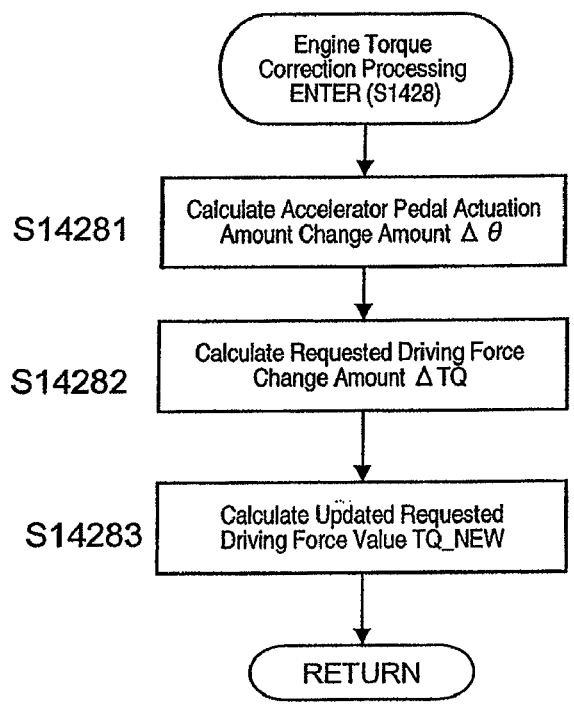
FIG. 23 is a flowchart for explaining the processing steps executed in order to correct the engine torque.

The control processing executed in order to correct the engine torque will now be explained with reference to the flowchart of FIG. 23. In step S1428, the controller 50 calculates the change amount Δθ of the accelerator pedal actuation amount SA, i.e., the amount by which the accelerator pedal has been depressed further since the previous control cycle. The change amount Δθ is given by (current accelerator pedal actuation amount SA=θ_NEW)−(accelerator pedal actuation amount SA detected in previous) cycle=θ_OLD). In step S14282, the controller 50 calculates the change amount ΔTQ of the driver's requested driving force Fda corresponding to the change amount Δθ of the accelerator pedal actuation amount. The change amount ΔTQ is calculated according to the normal characteristic indicated with the solid-line curve in FIG. 22.

In step S14283, the controller 50 uses the Equation 7 shown below to calculate an updated driver's requested driving force value TQ_NEW, which is a corrected value of the driver's requested driving force Fda for use when a failure has occurred.

$$TQ\_NEW = TQ\_OLD + K\_TQ \times \Delta TQ \quad \text{(Equation 7)}$$

In Equation 7, the term TQ_OLD is the driver's requested driving force Fda or the updated driver's requested driving force value set in the previous control cycle. The term K_TQ is a correction coefficient for the driver's requested driving force Fda and is set to, for example, 0.5 (0<K_TQ<1).

By calculating the updated requested driving force value TQ_NEW using Equation 7, the engine torque characteristic is corrected to the broken-line curve shown in FIG. 22 such that the amount ΔTQ by which the requested driving force increases with respect to a change Δθ in the accelerator pedal actuation amount SA is reduced.

After the controller 50 completes the calculation of the updated driver's requested driving force value TQ_NEW so as to correct the engine torque characteristic in step S1428, the controller 50 proceeds to step S1429. In step S1429, the controller 50 reduces the value of the timer T_FAIL by 1. The updated driver's requested driving force value TQ_NEW calculated in step S1428 is used to calculate the driving force correction amount ΔDa and the braking force correction amount ΔDb in step S200.

The second embodiment just described can provide the following operational effects in addition to the effects provided by the first embodiment.

(1) The vehicle driving assist system 1 is configured to correct the reference characteristic such that the amount by which the engine torque increases with respect to an increase in the accelerator pedal actuation amount SA is suppressed for a prescribed amount of time, i.e., until the time T_FAIL elapses, after a failure of the accelerator pedal reaction force generating section 70 is detected. After the prescribed amount of time has elapsed or when the system 1 detects that the accelerator pedal 61 has been operated in the release direction, the system 1 returns from the corrected engine torque characteristic to the reference characteristic. More specifically, the amount ΔTQ by which the requested driving force Fda increases with respect to an increase Δθ in the depression amount of the accelerator pedal is corrected after a failure is detected such that the amount by which the engine torque increases with respect to depression of the accelerator pedal 61 is suppressed. As a result, even if the accelerator pedal actuation amount SA increases after the accelerator pedal reaction force generating device 70 fails, the resulting increase in engine torque can be suppressed.

(2) The controller 50 is configured to suppress the amount by which the engine torque increases in response to depression of the accelerator pedal 61 by multiplying a correction coefficient K_TQ times the engine torque increase amount ΔTQ calculated based on the increase amount Δθ of the accelerator pedal actuation amount SA using the reference characteristic. The amount by which the engine torque increases in response to depression of the accelerator pedal 61 can be suppressed by setting the correction coefficient K_TQ to a prescribed value smaller than 1, e.g., 0.5. The value of the correction coefficient K_TQ is not limited to 0.5 and can be set to any appropriate value that is larger than 0 and smaller than 1 (0<K_TQ<1).

Third Embodiment

A vehicle driving assist system in accordance with a third embodiment will now be explained. The basic constituent features of a vehicle driving assist system in accordance with the third embodiment are the same as those of the first embodiment shown in FIG. 1. The third embodiment will be explained mainly by describing its differences with respect to the first embodiment.

Figure 24:
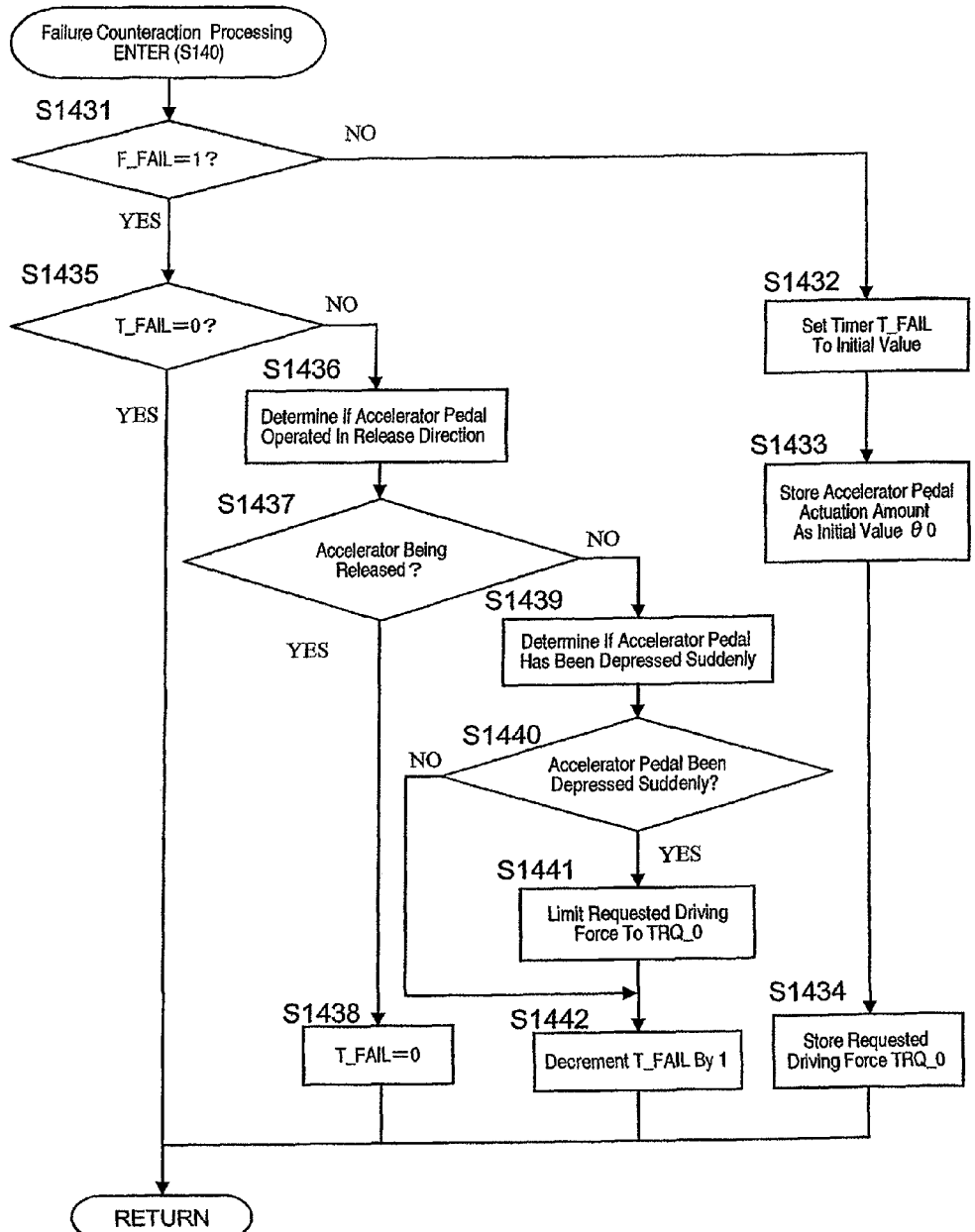
FIG. 24 is a flowchart showing the processing steps executed in a third embodiment in order to counteract a failure.

In the third embodiment, when the system detects that the accelerator pedal has been suddenly depressed after a failure of the accelerator pedal reaction force generating device 70 has been detected, the engine torque characteristic is corrected such that the engine torque is limited to an upper limit value. The failure countermeasure processing executed in the third embodiment will now be explained with reference to the flowchart of FIG. 24. This processing is executed at step S140 of the flowchart shown in FIG. 9.

In step S1431, the controller 50 determines if a failure has occurred by checking if the value of the failure flag F_FAIL set in step S130 is 1. If the value of the flag F_FAIL is 0, then an abnormality does not exist and the controller 50 proceeds to step S1432, where it sets a timer T_FAIL to an initial value. In step S1433, the controller 50 stores the current accelerator pedal actuation amount SA detected by the accelerator pedal stroke sensor 62 as an initial value θ0. In step S1434, the controller 50 stores a driver's requested driving force TRQ_0 corresponding to the current accelerator pedal actuation amount SA.

Figure 25:
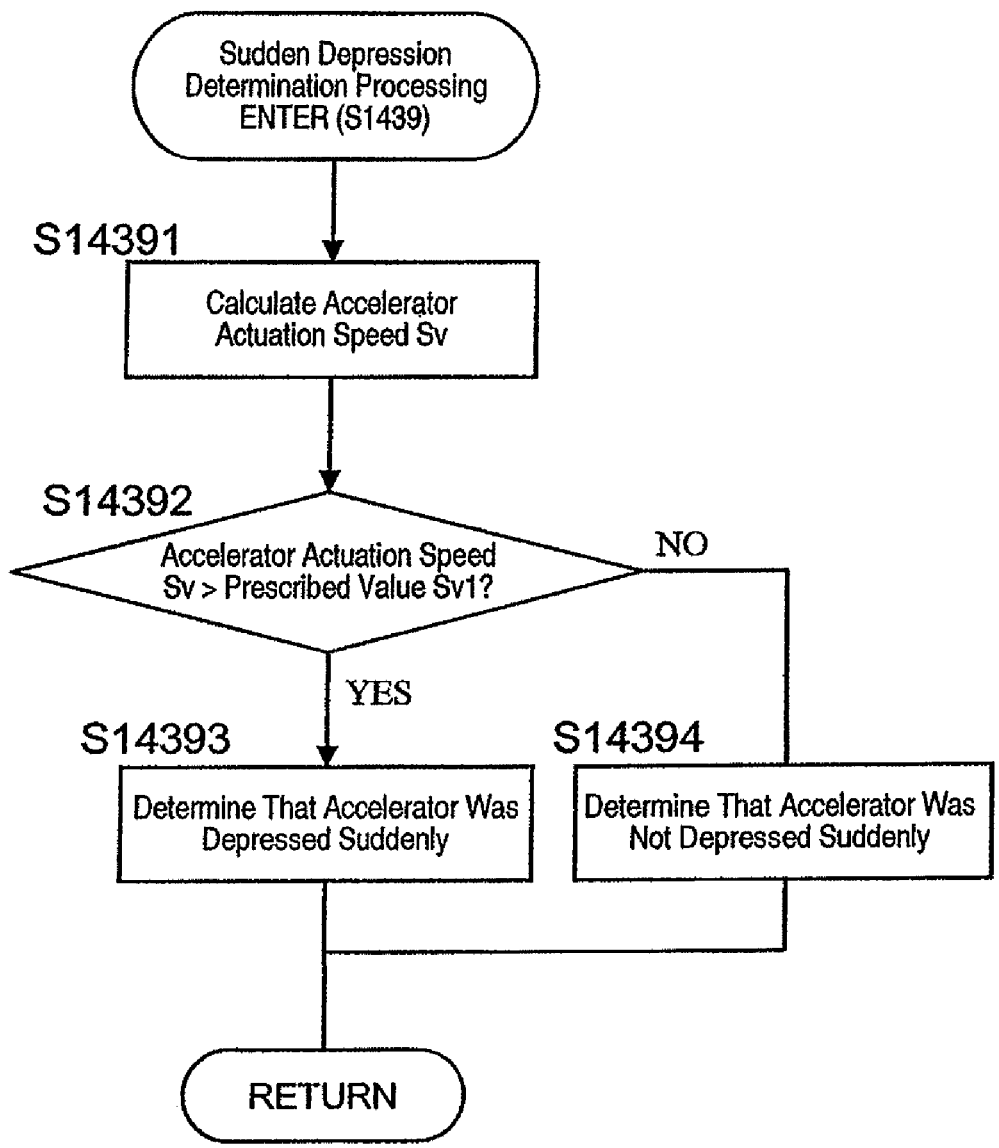
FIG. 25 is a flowchart showing the processing steps executed in order to determine if the accelerator pedal is being depressed in a sudden manner.

If it determines in step S1431 that a failure exists, i.e., that the value of F_FAIL is 1, then the controller 50 proceeds to step S1435 and determines if the value of the timer T_FAIL is 0. If the value of the timer T_FAIL is 0, the processing of step S140 ends. If the value of the timer T_FAIL is not 0, then the controller 50 proceeds to step S1436 and determines if the accelerator pedal 61 is being operated in the release direction. In step S1437, then the controller 50 checks the result of the determination made in step S1436. If the accelerator pedal 61 has been operated in the return direction, then the controller 50 proceeds to step S1438 and resets the timer T_FAIL to 0. Meanwhile, if the accelerator pedal 61 has not been operated in the return direction, then the controller 50 proceeds to step S1439 and determines if the accelerator pedal 61 has been suddenly depressed. The control processing executed in order to determine if the accelerator pedal 61 has been suddenly depressed will now be explained with reference to the flowchart of FIG. 25.

In step S14391, the controller 50 calculates the accelerator pedal actuation speed Sv. The actuation speed Sv is calculated, for example, by differentiating the accelerator pedal actuation amount SA with respect to time. In step S14392, the controller 50 compares the accelerator pedal actuation speed Sv to a prescribed value Sv1. The prescribed value Sv1 is set in advance to an appropriate value (threshold value) (Sv1>0) for determining if the actuation speed of the accelerator pedal 61 corresponds to a sudden depression of the accelerator pedal 61. If the actuation speed Sv is larger than the value Sv1, then the controller 50 proceeds to step S14393 and determines that the accelerator pedal 61 has been depressed suddenly. If the actuation speed Sv is equal to or smaller than Sv1, then the controller 50 proceeds to step S14394 and determines that a sudden depression of the accelerator pedal 61 has not occurred.

After the processing of step S1439 for determining if the accelerator pedal 61 has been depressed suddenly has been completed, the controller 50 proceeds to step S1440 and checks the result of the determination as to whether or not the accelerator pedal 61 has been depressed suddenly. If the accelerator pedal 61 has been depressed suddenly, then the controller 50 proceeds to step S1441 and sets the upper limit value of the driver's requested driving force to the value TRQ_0 stored in step S1434. If the accelerator pedal 61 has not been depressed suddenly, then the controller 50 skips step S1441 and proceeds to step S1442. In step S1442, the controller 50 reduces the value of the timer T_FAIL by 1.

The requested driving force upper limit TRQ_0 is calculated as described previously and is used in step S200 to calculate the driving force correction amount ΔDa and the braking force correction amount ΔDb. Thus, when a sudden depression of the accelerator pedal 61 is detected within a prescribed amount of time after a failure of the accelerator pedal reaction force generating device 70 is detected, the engine torque is corrected such that it does not increase in response to the depression of the accelerator pedal 61.

The third embodiment just described can provide the following operational effects in addition to the effects provided by the first and second embodiments.

(1) The vehicle driving assist system 1 is configured to correct the reference characteristic such that the amount by which the engine torque increases with respect to an increase in the accelerator pedal actuation amount SA is suppressed when a sudden depression of the accelerator pedal 61 is detected within a prescribed amount of time, i.e., before the time T_FAIL elapses, after a failure of the accelerator pedal reaction force generating device 70 is detected. After the prescribed amount of time has elapsed or when the system 1 detects that the accelerator pedal 61 has been operated in the release direction, the system 1 returns from the corrected engine torque characteristic to the reference characteristic. More specifically, the system 1 limits the engine requested driving force Fda to the upper limit value TRQ_0 corresponding to the accelerator pedal actuation amount SA that existed immediately before the failure was detected. As a result, even if the accelerator pedal actuation amount SA increases due to a sudden depression of the accelerator pedal 61 after the accelerator pedal reaction force generating device 70 fails, the engine torque can be limited such that it does not increase.

Additionally, it is also possible to configure the system 1 such that when a sudden depression of the accelerator pedal 61 is detected within a prescribed amount of time after a failure of the accelerator pedal reaction force generating device 70 is detected, the engine torque characteristic is corrected such that the engine torque does not readily increase when the accelerator pedal 61 is depressed. More specifically, in this alternative configuration, the amount ΔTQ by which the driver's requested driving force Fda increases with respect to an increase in accelerator pedal actuation amount SA is reduced using the correction coefficient K_TQ.

Fourth Embodiment

A vehicle driving assist system in accordance with a fourth embodiment will now be explained. The basic constituent features of a vehicle driving assist system in accordance with the fourth embodiment are the same as those of the first embodiment shown in FIG. 1. The fourth embodiment will be explained mainly by describing its differences with respect to the first embodiment.

In the fourth embodiment, when a failure of the accelerator pedal reaction force generating device 70 is detected, the amount by which the driver's requested driving force Fda increases with respect to an increase in the accelerator pedal actuation amount SA is reduced and the amount by which the requested driving force increase amount is suppressed is varied in accordance with the actuation reaction force that was being added to the accelerator pedal 61 before the failure occurred.

Figure 26:
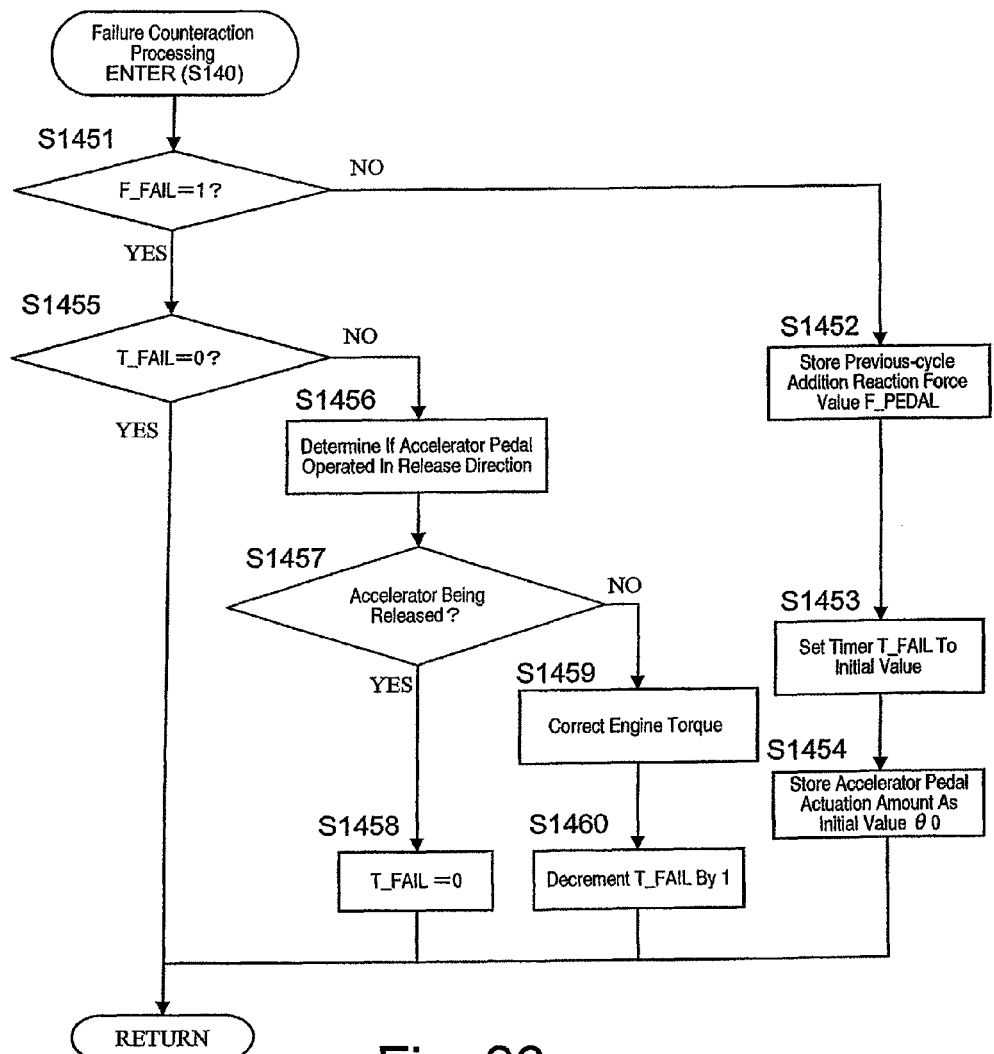
FIG. 26 is a flowchart showing the processing steps executed in a fourth embodiment in order to counteract a failure.

The failure countermeasure processing executed in the fourth embodiment will now be explained with reference to the flowchart of FIG. 26. This processing is executed at step S140 of the flowchart shown in FIG. 9.

In step S1451, the controller 50 determines if a failure has occurred by checking if the value of the failure flag F_FAIL set in step S130 is 1. If the value of the flag F_FAIL is 0, then the controller 50 proceeds to step S1452 where it acquires the accelerator pedal reaction force control command value FA calculated based on the risk potential RP, i.e., the control repelling force Fc, in the previous control cycle and stores that value as a previous-cycle additional reaction force value F_PEDAL. In step S1453, the controller 50 sets the timer T_FAIL to an initial value. In step S1454, the controller 50 stores the current accelerator pedal actuation amount SA detected by the accelerator pedal stroke sensor 62 as an initial value θ0.

Figure 27:
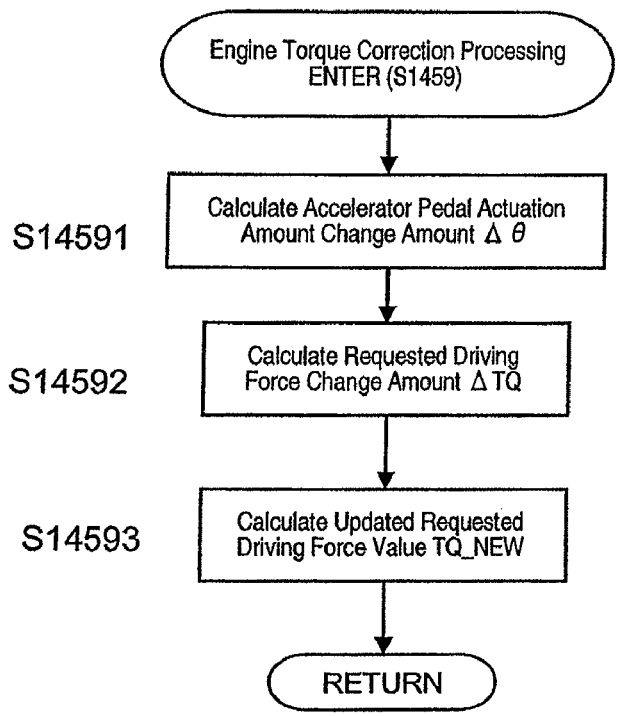
FIG. 27 is a flowchart for explaining the processing steps executed in order to correct the engine torque.

If it determines in step S1451 that a failure exists, i.e., that the value of F_FAIL is 1, then the controller 50 proceeds to step S1455 and determines if the value of the timer T_FAIL is 0. If the value of the timer T_FAIL is 0, the processing of step S140 ends. If the value of the timer T_FAIL is not 0, then the controller 50 proceeds to step S1456 and determines if the accelerator pedal 61 is being operated in the release direction. In step S1457, the controller 50 checks the result of the determination made in step S1456. If the accelerator pedal 61 has been operated in the return direction, then the controller 50 proceeds to step S1458 and resets the timer T_FAIL to 0. Meanwhile, if the accelerator pedal 61 has not been operated in the release direction, then the controller 50 proceeds to step S1459 and executes engine torque correction processing such that an increase in engine torque will be suppressed. The control processing executed in order to correct the engine torque will now be explained with reference to the flowchart of FIG. 27.

In step S14591, the controller 50 calculates the change amount Δθ of the accelerator pedal actuation amount SA (Δθ=θ_NEW−θ_OLD). In step S14592, the controller 50 calculates the change amount ΔTQ of the driver's requested driving force Fda corresponding to the change amount Δθ of the accelerator pedal actuation amount SA based on the normal characteristic. In step S14593, the controller 50 uses the Equation 8 shown below to calculate an updated driver's requested driving force value TQ_NEW, which is a corrected value of the driver's requested driving force Fda for use when a failure has occurred.

$$TQ\_NEW = TQ\_OLD + K\_TQ\_F \times \Delta TQ \quad \text{(Equation 8)}$$

In Equation 8, the term K_TQ_F is a coefficient for correcting the driver's requested driving force Fda, and is set in accordance with the previous-cycle additional reaction force value F_PEDAL.

Figure 28:
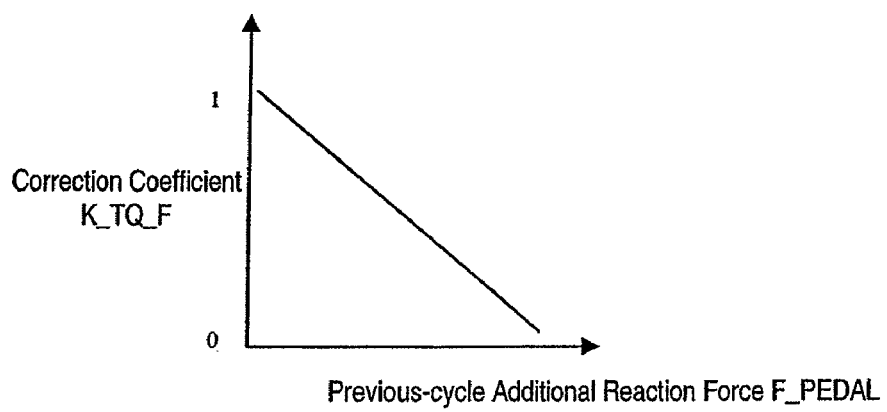
FIG. 28 is a plot of the correction coefficient versus the added reaction force before the occurrence of a failure.

FIG. 28 is a plot of the correction coefficient K_TQ_F versus the previous-cycle accelerator pedal additional reaction force value F_PEDAL (0<K_TQ_F<1). The correction coefficient K_TQ_F decreases as the previous-cycle additional reaction force value F_PEDAL increases. As a result, the larger the additional reaction force that was exerted against the accelerator pedal 61 before the failure occurred, the larger the amount by which the increase in engine torque is suppressed when the driver depresses the accelerator pedal 61 more deeply due to the occurrence of the failure. Conversely, the smaller the additional reaction force is before the failure occurs, the smaller effect of accelerator pedal operation is when the additional reaction force ceases to be exerted due to the failure and, therefore, the correction coefficient K_TQ_F is increased to a value closer to 1.

After the controller 50 completes the calculation of the updated driver's requested driving force value TQ_NEW so as to correct the engine torque characteristic in step S1459, the controller 50 proceeds to step S1460 In step S1460, the controller 50 reduces the value of the timer T_FAIL by 1. The updated driver's requested driving force value TQ_NEW calculated in step S1459 is used to calculate the driving force correction amount ΔDa and the braking force correction amount ΔDb in step S200.

The fourth embodiment just described can provide the following operational effects in addition to the effects provided by the first to third embodiments.

The controller 50 is configured to set the amount by which the increase in engine torque is suppressed based on the actuation reaction force calculated immediately before the failure of the accelerator pedal reaction force generating device 70 is detected such that the amount of suppression increases as the same actuation reaction force increases. More specifically, the correction coefficient K_TQ_F is calculated based on the reaction force control command value FA that was calculated based on the risk potential RP immediately before the failure was detected, and the correction coefficient K_TQ_F is multiplied by the requested driving force increase amount ΔTQ corresponding to the amount Δθ by which the depression amount of accelerator pedal 61 has increased since the previous cycle. As a result, the amount by which any increase in engine torque is suppressed can be increased in accordance with the size of the additional reaction force that was being added to (exerted by) the accelerator pedal 61 immediately before the failure.

Additionally, similarly to the third embodiment, it is also possible to configure the system 1 such that when a sudden depression of the accelerator pedal 61 is detected after a failure of the accelerator pedal reaction force generating device 70 has been detected, the amount by which the increase in engine torque is suppressed is adjusted based on the additional reaction force that was exerted immediately before the failure.

Fifth Embodiment

A vehicle driving assist system in accordance with a fifth embodiment will now be explained. The basic constituent features of a vehicle driving assist system in accordance with the fifth embodiment are the same as those of the first embodiment shown in FIG. 1. In the fifth embodiment, it is assumed that the vehicle in which the vehicle driving assist system is installed is provided with an automatic transmission. The fifth embodiment will be explained mainly by describing its differences with respect to the first embodiment.

Figure 29:
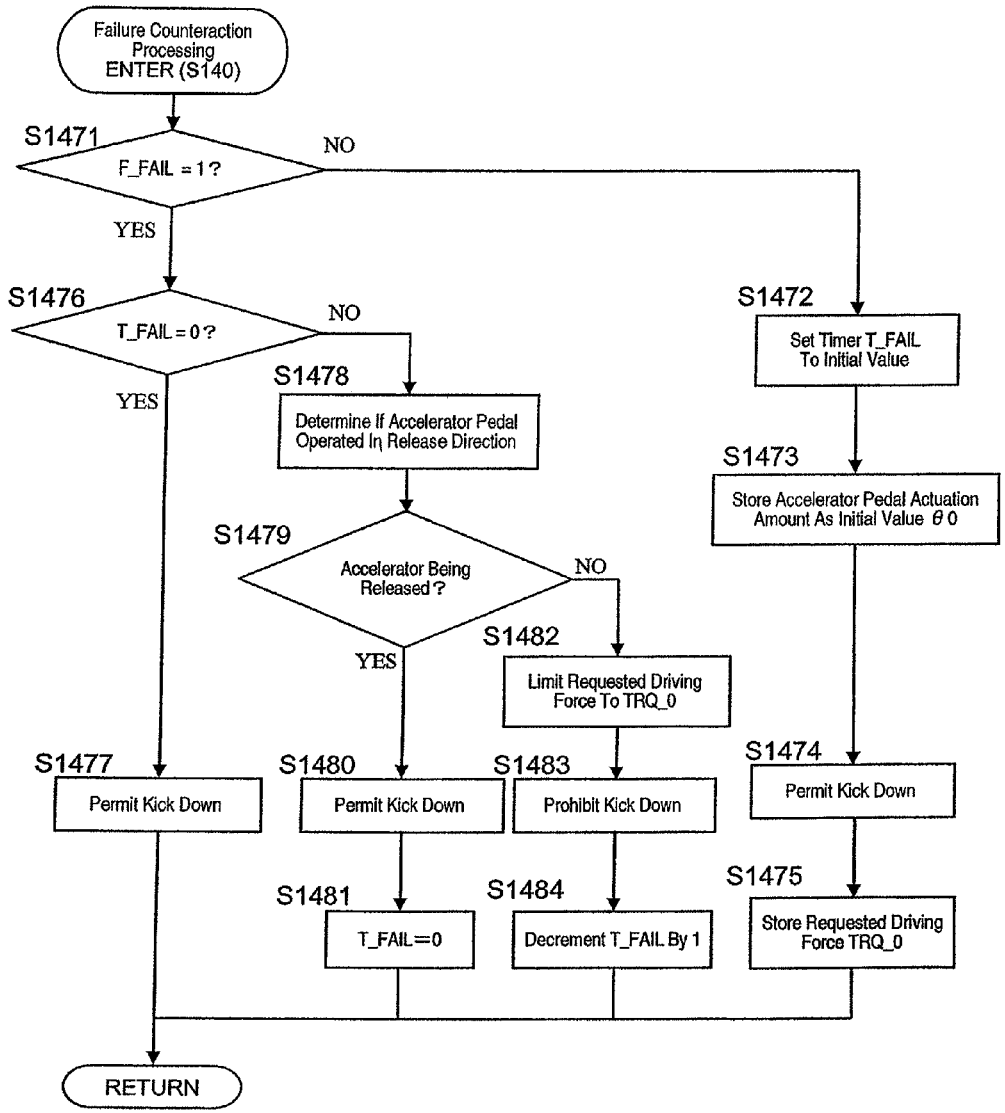
FIG. 29 is a flowchart showing the processing steps executed in a fifth embodiment in order to counteract a failure.

In the fifth embodiment, when a failure of the accelerator pedal reaction force generating device 70 occurs, the engine torque characteristic is corrected such that an upper limit value of the engine torque is limited and the shift control that normally accompanies accelerator pedal operation is prohibited. The failure countermeasure processing executed in the fifth embodiment will now be explained with reference to the flowchart of FIG. 29. This processing is executed at step S140 of the flowchart shown in FIG. 9.

In step S1471, the controller 50 determines if a failure has occurred by checking if the value of the failure flag F_FAIL set in step S130 is 1. If the value of the flag F_FAIL is 0, then an abnormality does not exist and the controller 50 proceeds to step S1472, where it sets a timer T_FAIL to an initial value. In step S1473, the controller 50 stores the current accelerator pedal actuation amount SA detected by the accelerator pedal stroke sensor 62 as an initial value θ0. In step S1474, the controller 50 sends a signal permitting a kick down (hereinafter called a "kick down permission signal") to the automatic transmission (not shown in figures), i.e., a signal giving permission for the automatic permission to downshift automatically when the accelerator pedal 61 is depressed fully and the engine load becomes large. In step S1475, the controller 50 stores a driver's requested driving force TRQ_0 corresponding to the current accelerator pedal actuation amount SA.

If it determines in step S1471 that a failure exists, i.e., that the value of F_FAIL is 1, then the controller 50 proceeds to step S1476 and determines if the value of the timer T_FAIL is 0. If the value of the timer T_FAIL is 0, then the controller 50 proceeds to step S1477 and sends a kick down permission signal to the automatic transmission before ending the control loop of step S140. If the value of the timer T_FAIL is not 0, then the controller 50 proceeds to step S1478 and determines if the accelerator pedal 61 is being operated in the release direction. In step S1479, the controller 50 checks the result of the determination made in step S1478. If the accelerator pedal 61 has been operated in the return direction, then the controller 50 proceeds to step S1480 sends a kick down permission signal to the automatic transmission. In step S1481, the controller 50 resets the timer T_FAIL to 0.

Meanwhile, if it determines in step S1479 that the accelerator pedal 61 has not been operated in the return direction, then the controller 50 proceeds to step S1482 and sets an upper limit value of the driver's requested driving force to the value TRQ_0 stored in step S1475. In step S1483, the controller 50 sends a signal prohibiting kick down (hereinafter called "a kick down prohibition signal") to the automatic transmission. In step S1484, the controller 50 reduces the value of the timer T_FAIL by 1. The requested driving force upper limit TRQ_0 is used in step S200 to calculate the driving force correction amount ΔDa and the braking force correction amount ΔDb.

Thus, when a failure of the accelerator pedal reaction force generating device 70 is detected, the engine torque is corrected such that the engine torque does not increase in response to depression of the accelerator pedal 61. Additionally, the automatic transmission is prohibited from kicking down when the accelerator pedal 61 is depressed fully. It is also acceptable to configure the system such that when a failure of the accelerator pedal reaction force generating device 70 occurs, the controller 50 changes the shift to make it more difficult for the automatic transmission to downshift instead of simply prohibiting the automatic transmission from kicking down.

The fifth embodiment just described can provide the following operational effects in addition to the effects provided by the first to fourth embodiments.

The controller 50 is configured such that when a failure is detected, the controller 50 prohibits the automatic transmission from kicking down in response to depression of the accelerator pedal 61 until a prescribed amount of time elapses, i.e., until the time T_FAIL elapses, or until an operation of the accelerator pedal 61 in the release direction is detected. As a result, the automatic transmission can be prevented from downshifting when the accelerator pedal reaction force generating device 70 has failed.

The constituent features of the fifth embodiment can also be combined with the second to fourth embodiments instead of the first embodiment.

Sixth Embodiment

A vehicle driving assist system in accordance with a sixth embodiment will now be explained. The basic constituent features of a vehicle driving assist system in accordance with the sixth embodiment are the same as those of the first embodiment shown in FIG. 1. The sixth embodiment will be explained mainly by describing its differences with respect to the first embodiment.

A vehicle driving assist system in accordance with the sixth embodiment is configured to determine if the driver has an intent to pass a preceding obstacle based on the driver's operation of the accelerator pedal. When a failure of the accelerator pedal reaction force generating device 70 is detected, the system corrects the engine torque characteristic such that an upper limit value of the engine torque is limited and prohibits itself from determining that the driver has an intent to pass.

Figure 30:
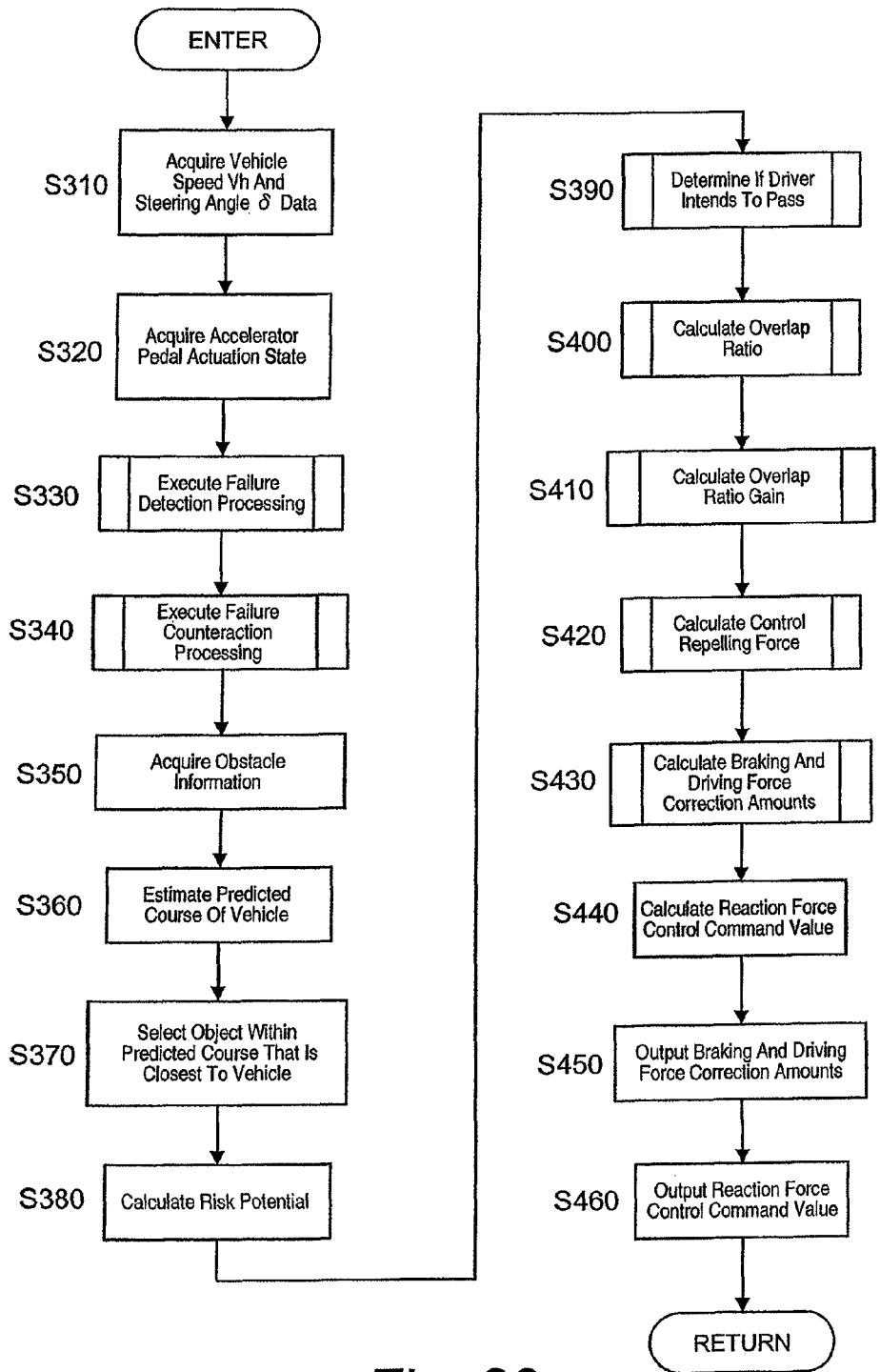
FIG. 30 is a flowchart showing the processing steps of a driving assistance control program in accordance with a sixth embodiment.

The operation of a vehicle driving assist system in accordance with the sixth embodiment will now be explained with reference to the flowchart of FIG. 30. The processing of the steps S310 to S380 is the same as in steps S110 to S180 of the flowchart shown in FIG. 9.

Figure 31:
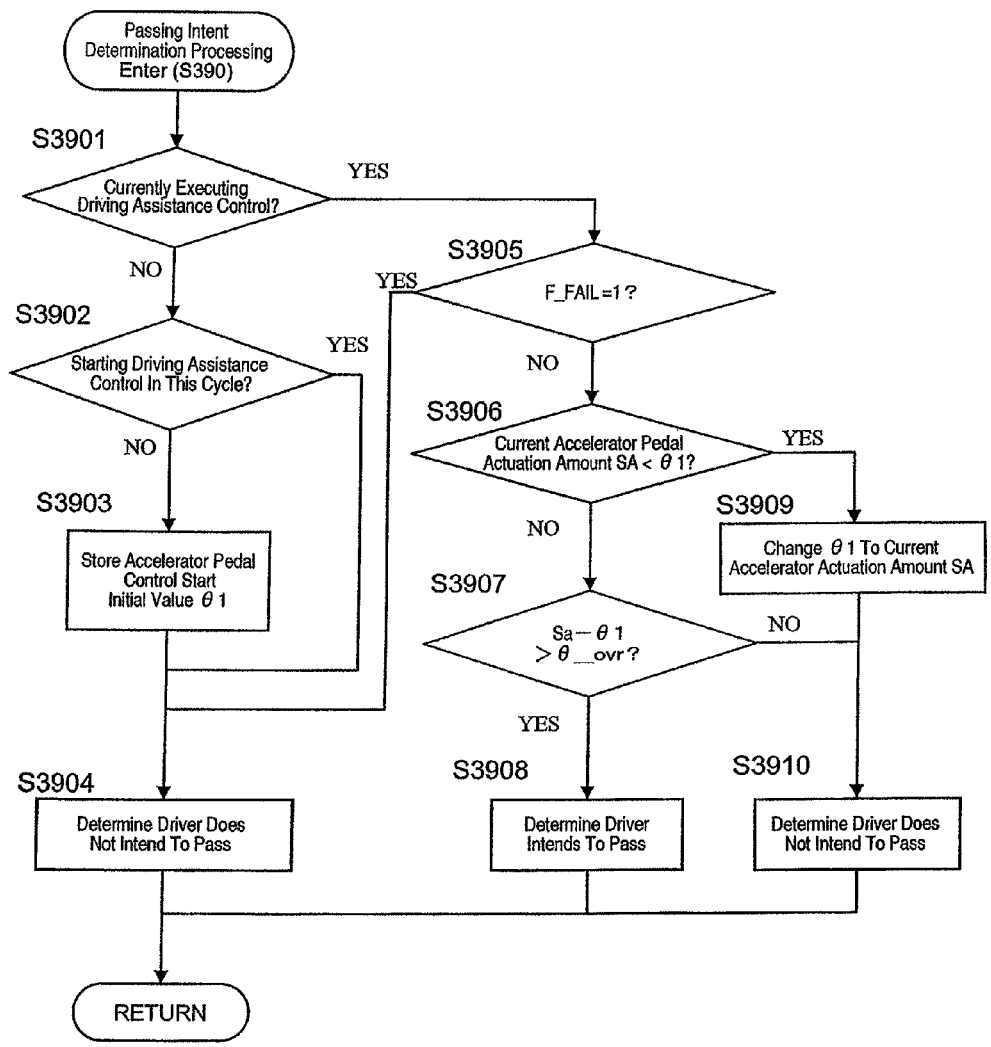
FIG. 31 is a flowchart for explaining the processing steps executed in order to determine if the driver intends to pass.

In step S390, the controller 50 determines if the driver has the intent to pass the preceding obstacle. The control processing executed in order to accomplish step S390 will now be explained with reference to the flowchart of FIG. 31. In step S3901, the controller 50 determines if braking/driving force control and actuation reaction force control are currently being executed based on the risk potential RP. More specifically, the controller 50 determines if a control repelling force Fc calculated based on the time to head way THW or the time to collision TTC of the previous control cycle has a value larger than 0.

If the result of step S3901 is negative, then the controller 50 proceeds to step S3902 and determines if braking/driving force control and actuation reaction force control will be started in this control cycle. More specifically, the controller 50 determines if these controls will be started by checking if a following distance THW calculated as the risk potential in step S380 is smaller than a threshold value TH_THW or if a time to collision TTC calculated as the risk potential RP in step S380 is smaller than a threshold value TH_TTC. If the following distance THW is equal to or larger than the threshold value TH_THW (THW≧TH_THW) or the time to collision TTC is larger than or equal to the threshold value TH_TTC (TTC≧TH_TTC), then the control repelling force Fc is equal to 0 and the controller 50 determines that it will not start the braking/driving force control and the actuation reaction force control. The controller 50 then proceeds to step S3903.

In step S3903, the controller stores the current accelerator pedal actuation amount SA read in step S320 as a control start initial value θ1. The controller 50 then proceeds to step S3904. If it determines in step S3902 that the braking/driving force control and actuation reaction force control will be started in the current control cycle, the controller 50 skips step S3903 and proceeds to step S3904. In step S3904, the controller 50 determines if the driver does not have the intent to pass the preceding obstacle.

If the result of step S3251 is negative, i.e., if the preceding vehicle is moving at a constant speed or accelerating, then the controller 50 proceeds to step S3255. In step S3905, the controller 50 determines if a failure has occurred by checking if the value of the failure flag F_FAIL set in step S330 is 1. If the value of F_FAIL is 1, then the controller 50 proceeds to step S3904 and determines that the driver does not have the intent to pass. That is, since the accelerator pedal reaction force generating device 70 has failed, the controller 50 prohibits determining that the driver has the intent to pass. Meanwhile, if the value F_FAIL is 0, the controller determines that there is nothing abnormal about the accelerator pedal reaction force generating device 70 and proceeds to step S3906.

In step S3906, the controller 50 determines if the current accelerator pedal actuation amount SA stored in step S3903 is smaller than the control start initial value θ1. If the result of step S3906 is negative, the accelerator pedal 61 is being depressed further than it was immediately before the control started and the controller 50 proceeds to step S3907. In step S3907, the controller 50 determines if the difference between the current accelerator pedal actuation amount SA and the control start initial value θ1 (SA−θ1) is larger than a threshold value θ_OVR. The threshold value θ_OVR is used to determine if the driver has the intent to pass the preceding obstacle. The threshold value θ_OVR is set in advance to an appropriate value for determining if the accelerator pedal actuation amount is large enough to obtain the drive torque required for the vehicle to pass the preceding obstacle. If the result of step S3907 is positive, then the controller 50 proceeds to step S3908 and determines that the driver intends to pass the preceding obstacle.

If the result of step S3906 is negative, the accelerator pedal 61 has been operated in the release direction compared to where it was immediately before the control started and the controller 50 proceeds to step S3909. In step S3909, the controller 50 sets the current accelerator pedal actuation amount as the control start initial value θ1. In other words, if the accelerator pedal 61 has been operated in the release direction since the control started, the control start initial value θ1 is updated to the smallest accelerator pedal actuation amount SA. Next, the controller 50 proceeds to step S3910 and determines that the driver does not intend to pass the preceding obstacle. Similarly, if the result of step S3907 is negative, then the controller 50 proceeds to step S3910 and determines that the driver does not intend to pass.

Figure 32:
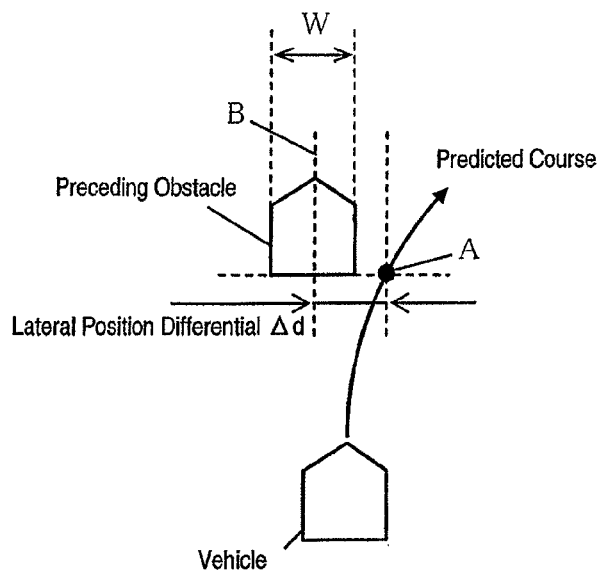
FIG. 32 is a diagram for explaining the method of calculating a predicted course of the vehicle and the overlap ratio of the vehicle with respect to a preceding obstacle.

After the controller 50 completes the determination of whether or not the driver intends to pas in step S390, the controller 50 proceeds to step S400. In step S400, the controller 50 calculates the overlap ratio La of the vehicle with respect to the preceding obstacle. The overlap ratio La is a value expressing the degree to which the predicted course of the vehicle overlaps with the preceding obstacle. The method of calculating the overlap ratio La will now be explained with reference to FIG. 32.

First, the system expresses an intersection point A between the path the vehicle is estimated to follow (arc having radius of curvature R calculated in step S360) and a lateral extension line extended from the rear end of the preceding obstacle. Then, a lateral position differential Δd between the vehicle and the preceding obstacle is then calculated as the lateral distance from the longitudinal centerline B of the preceding obstacle to the intersection point A. The overlap ratio La can then be calculated based on the lateral position differential Δd and the width W of the preceding obstacle using the Equation 9 below.

$$La = 1 - |\Delta d/W| \qquad \text{Equation 9}$$

The overlap ratio La calculated with Equation 9 is set to a value from 0 to 1. The larger the overlap ratio La is, the larger the degree of overlap is between the predicted course of the vehicle and the preceding obstacle. More specifically, if the overlap ratio La is 0, the preceding obstacle is completely disconnected from the predicted course of the vehicle. Meanwhile, if the overlap ratio La is 1, the preceding obstacle is on the predicted course of the vehicle and positioned directly in front of the vehicle. The overlap ratio La is calculated in such a fashion as to take into account the width W of the preceding obstacle; assuming the lateral position differential Δd is the same, the value of the overlap ratio La increases as the width W of the preceding obstacle increases.

Figure 33:
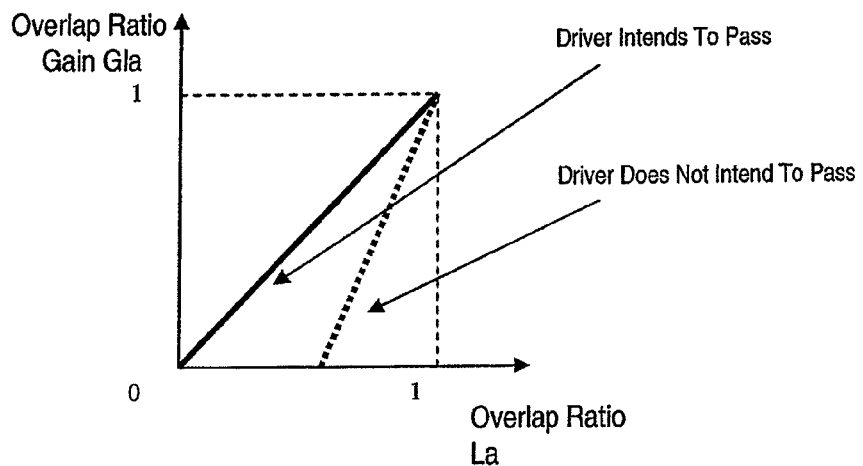
FIG. 33 is a plot of the overlap ratio gain versus the overlap ratio.

In step S410, based on the overlap ratio La calculated in step S400, the controller 50 calculates a gain (overlap ratio gain G1a) to be used when executing braking/driving force control and actuation reaction force control. FIG. 33 is a basic plot of the overlap ratio gain G1a versus the overlap ratio La. As indicated with the solid-line curve in FIG. 33, the overlap ratio gain G1a is gradually decreased from 1 as the overlap ratio decreases. When the controller 50 determines that the driver intends to pass the preceding obstacle, it increases the rate of change of the overlap ratio gain G with respect to the overlap ratio La in comparison with when it determines that the driver does not intend to pass. The broken-line curve in FIG. 33 indicates the relationship used when the driver intends to pass. Thus, when the driver is about to pass the preceding vehicle, the overlap ratio gain G1a is decreased rapidly as the overlap ratio La decreases so as to facilitate the driving operations performed by the driver in order to pass the obstacle.

In step S420, the controller calculates a control repelling force Fc to be used for calculating control amounts for the braking/driving force control and the actuation reaction force control. This control repelling force Fc is calculated by multiplying the control repelling force Fc calculated according to the flowchart shown in FIG. 16 by the overlap ratio gain G1a calculated in step S410 (new Fc=Fc×G1a). More specifically, the control repelling force Fc is a value obtained by adjusting the repelling force F_THW or F_TTC of the imaginary elastic body 200 using the overlap ratio gain G1a. Therefore, the more the preceding obstacle deviates from the predicted course of the vehicle and the overlap ratio La becomes smaller, the smaller the control repelling force Fc becomes. Also, the control repelling force Fc is reduced even further when the controller 50 determines that the driver intends to pass the preceding obstacle.

The control processing executed in steps S430 to S460 is the same as the control processing executed in steps S200 to S230 of FIG. 9. Thus, when the controller 50 determines that the driver has the intent to pass, it corrects the braking and driving force correction amounts and the actuation reaction force corresponding to the risk potential RP to smaller values based on the overlap ratio La between the vehicle and the preceding obstacle. However, when the accelerator pedal reaction force generating device 70 has failed, the controller 50 prohibits determining that the driver intends to pass and corrects the engine torque characteristic such that the engine torque will not increase even if the driver depresses the accelerator pedal 61.

The sixth embodiment just described can provide the following operational effects in addition to the effects provided by the first to fifth embodiments.

In the sixth embodiment, the vehicle driving assist system 1 is configured to detect if a driver intends to (is about to) pass an obstacle based on the operation of the accelerator pedal and correct an actuation reaction force if it determines that the driver does intend to pass. Additionally, the system 1 prohibits determining that the driver has the intent to pass when it detects that the accelerator pedal reaction force generating device 70 has failed. When it determines that the driver has the intent to pass, the system 1 calculates an overlap ratio gain G1a based on an overlap ratio La of the vehicle with respect to the preceding obstacle, the overlap ratio La being calculated using the width W of the preceding obstacle. The system 1 then calculates a control repelling force Fc based on the repelling force of an imaginary elastic body and the overlap ratio gain G1a. As a result, when the vehicle passes an obstacle, the driving force control amount ΔDa and the braking force control amount ΔDb can be adjusted in accordance with whether the width of the obstacle is small or large such that an odd feeling is not imparted to the driver. When a failure of the accelerator pedal reaction force generating device 70 is detected, control that is readily recognizable can be executed because the system 1 prohibits determining that the driver has the intent to pass.

Seventh Embodiment

A vehicle driving assist system in accordance with a seventh embodiment of the present invention will now be explained. The basic constituent features of a vehicle driving assist system in accordance with the seventh embodiment are the same as those of the first embodiment shown in FIG. 1. The seventh embodiment will be explained mainly by describing its differences with respect to the sixth embodiment.

In the seventh embodiment, similarly to the sixth embodiment, the system is configured to determine if the driver has an intent to pass a preceding obstacle based on the driver's operation of the accelerator pedal. When a failure of the accelerator pedal reaction force generating device 70 is detected, the system corrects the engine torque characteristic such that an upper limit value of the engine torque is limited and prohibits itself from determining that the driver has an intent to pass. However, if it determined that the driver had the intent to pass before the failure was detected, the system does not limit the engine torque.

Figure 34:
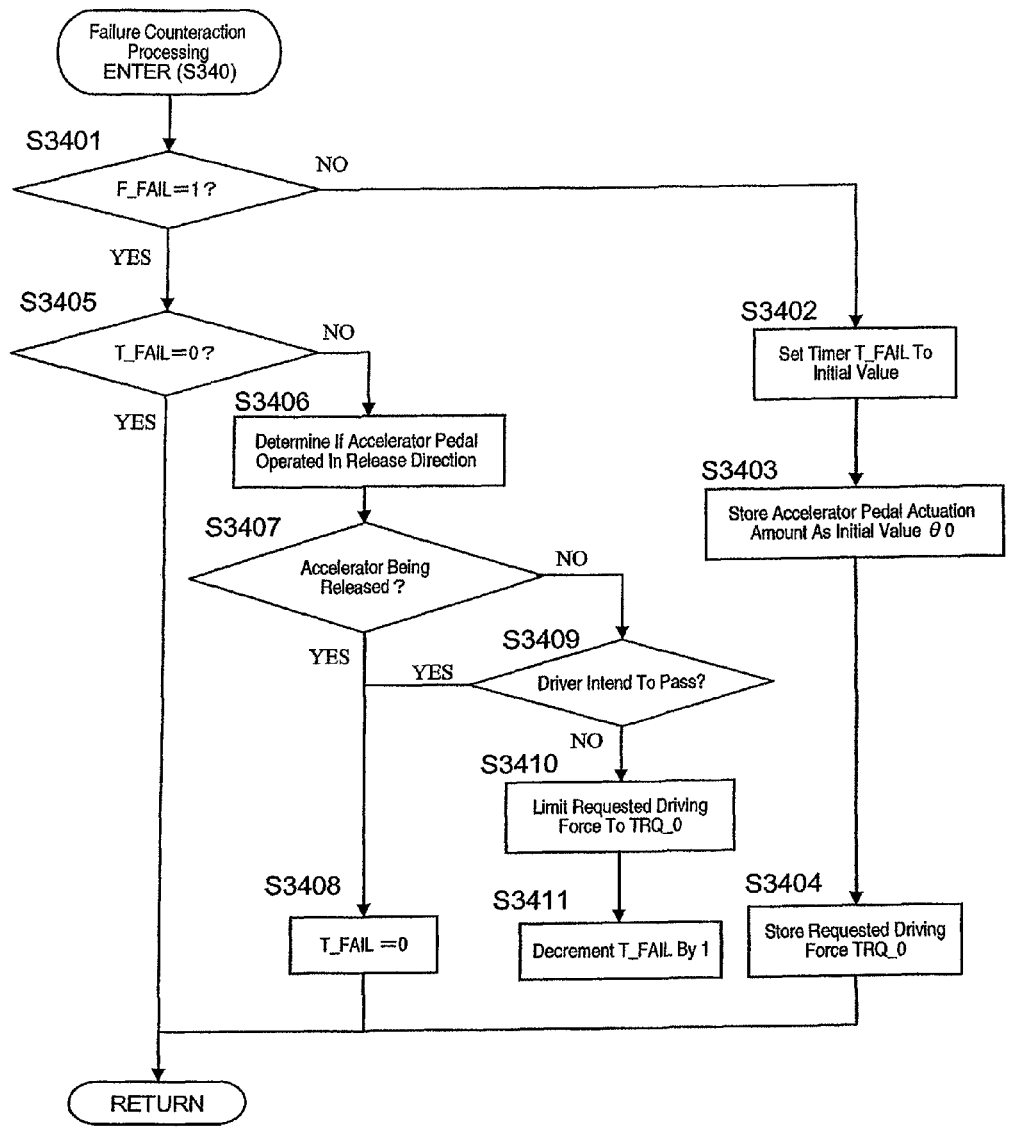
FIG. 34 is a flowchart showing the processing steps executed in a seventh embodiment in order to counteract a failure.

The failure countermeasure processing executed in the seventh embodiment will now be explained with reference to the flowchart of FIG. 34. This processing is executed at step S340 of the flowchart shown in FIG. 30.

In step S3401, the controller 50 determines if a failure has occurred by checking if the value of the failure flag F_FAIL set in step S330 is 1. If the value of the flag F_FAIL is 0, then an abnormality does not exist and the controller 50 proceeds to step S3402, where it sets a timer T_FAIL to an initial value. In step S3403, the controller 50 stores the current accelerator pedal actuation amount SA detected by the accelerator pedal stroke sensor 62 as an initial value θ0. In step S3404, the controller 50 stores a driver's requested driving force TRQ_0 corresponding to the current accelerator pedal actuation amount SA.

If it determines in step S3401 that a failure exists, i.e., that the value of F_FAIL is 1, then the controller 50 proceeds to step S3405 and determines if the value of the timer T_FAIL is 0. If the value of the timer T_FAIL is 0, the processing of step S340 ends. If the value of the timer T_FAIL is not 0, then the controller 50 proceeds to step S3406 and determines if the accelerator pedal 61 is being operated in the release direction. In step S3407, the controller 50 checks the result of the determination made in step S3406. If the accelerator pedal 61 has been operated in the return direction, then the controller 50 proceeds to step S3408 and resets the timer T_FAIL to 0.

Meanwhile, if the accelerator pedal 61 has not been operated in the return direction, then the controller 50 proceeds to step S3409 and determines if it was determined that the driver had the intent to pass in the previous control cycle. If it was determined that the driver had the intent to pass in the previous control cycle, then the controller 50 proceeds to step S3408 and resets the timer T_FAIL to 0. Meanwhile, if it was determined that the driver did not have the intent to pass in the previous control cycle, then the controller 50 proceeds to step S3410 and sets the upper limit value of the driver's requested driving force to the value TRQ_0 stored in step S3404. In step S3411, the controller 50 reduces the value of the timer T_FAIL by 1.

Thus, when a failure of the accelerator pedal reaction force generating device 70 is detected, the controller 50 does not limit the driver's requested driving force Fda if it determines that the driver had the intent to pass before the failure was detected.

The seventh embodiment just described can provide the following operational effects in addition to the effects provided by the first to sixth embodiments.

The controller 50 is configured such that when it detects a failure of the accelerator pedal reaction force generating device 70 and suppresses the amount by which the engine torque increases with respect to an increase in the accelerator pedal actuation amount SA, it reduces the amount of the suppression if it determines that the driver had the intent to pass immediately before the failure was detected. More specifically, if the driver had the intent to pass, then the controller 50 does not limit the engine torque to the upper limit value TRQ_0 and does not correct the reference characteristic. As a result, the engine torque is produced in accordance with the accelerator pedal actuation amount SA in the normal manner.

Eighth Embodiment

A vehicle driving assist system in accordance with a eighth embodiment of the present invention will now be explained. The basic constituent features of a vehicle driving assist system in accordance with the eighth embodiment are the same as those of the first embodiment shown in FIG. 1. The third embodiment will be explained mainly by describing its differences with respect to the seventh embodiment.

In the eighth embodiment, when a failure of the accelerator pedal reaction force generating device 70 is detected, the engine torque characteristic is corrected such that the engine torque does not readily increase when the accelerator pedal 61 is depressed. More specifically, the amount by which the driver's requested driving force Fda increases with respect to an increase in accelerator pedal actuation amount SA is reduced. Additionally, if it was determined that the driver had the intent to pass before the failure was detected, then the amount by which the increase in the driver's requested driving force Fda is suppressed is reduced and, thus, the amount by which the engine torque is suppressed is reduced.

Figure 35:
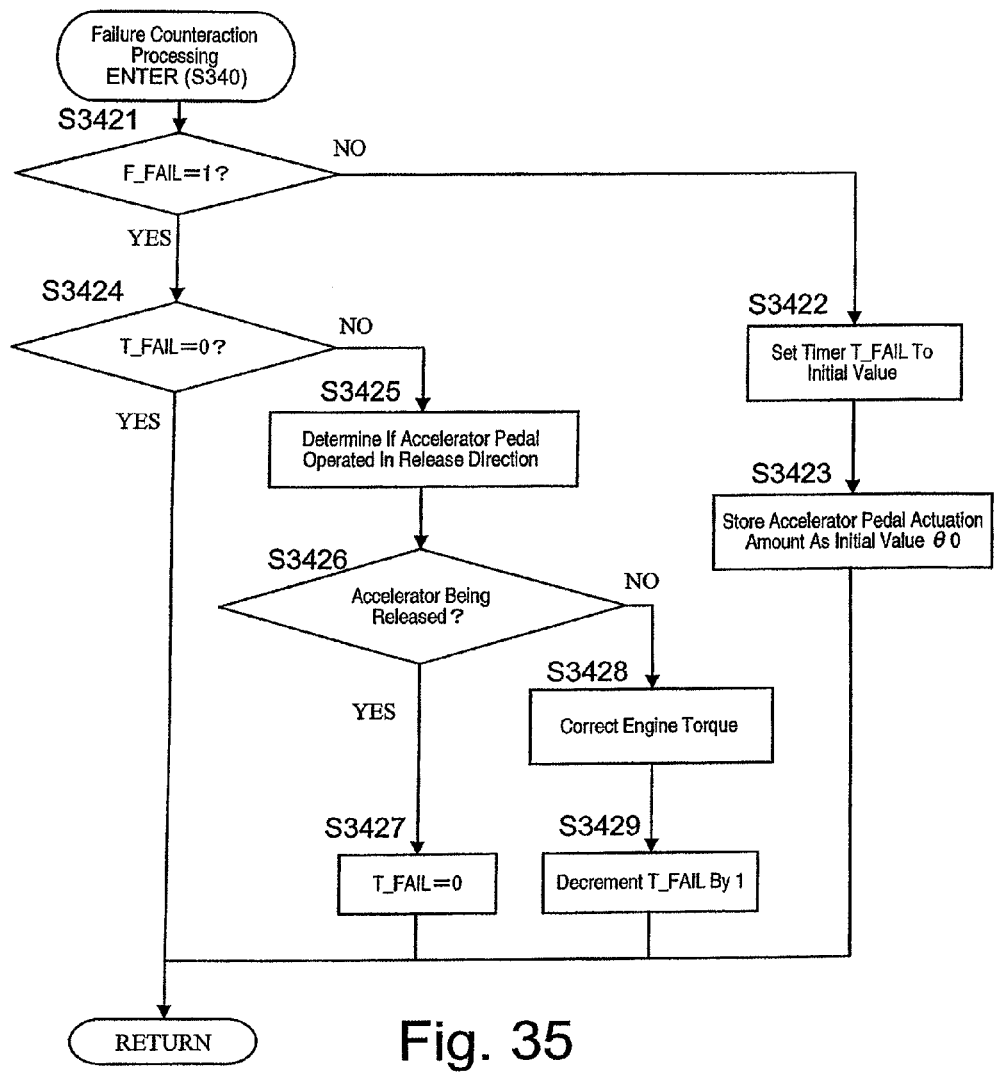
FIG. 35 is a flowchart showing the processing steps executed in an eight embodiment in order to counteract a failure.

The failure countermeasure processing executed in the eighth embodiment will now be explained with reference to the flowchart of FIG. 35. This processing is executed at step S340 of the flowchart shown in FIG. 30.

In step S1421, the controller 50 determines if a failure has occurred by checking if the value of the failure flag F_FAIL set in step S330 is 1. If the value of the flag F_FAIL is 0, then an abnormality does not exist and the controller 50 proceeds to step S3422, where it sets a timer T_FAIL to an initial value. In step S3423, the controller 50 stores the current accelerator pedal actuation amount SA detected by the accelerator pedal stroke sensor 62 as an initial value θ0.

If it determines in step S3421 that a failure exists, i.e., that the value of F_FAIL is 1, then the controller 50 proceeds to step S3424 and determines if the value of the timer T_FAIL is 0. If the value of the timer T_FAIL is 0, the processing of step S340 ends. If the value of the timer T_FAIL is not 0, then the controller 50 proceeds to step S3425 and determines if the accelerator pedal 61 is being operated in the release direction. In step S3426, the controller 50 checks the result of the determination made in step S3425. If the accelerator pedal 61 has been operated in the return direction, then the controller 50 proceeds to step S3427 and resets the timer T_FAIL to 0. Meanwhile, if the accelerator pedal 61 has not been operated in the release direction, then the controller 50 proceeds to step S3428 and executes engine torque correction processing such that an increase in engine torque will be suppressed.

Figure 36:
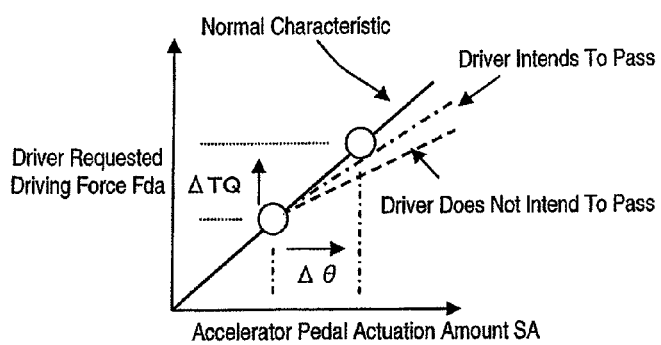
FIG. 36 is a diagram illustrating the control executed in order to suppress the requested driving force with respect to depression of the accelerator pedal.

FIG. 36 shows a plot of the driver's requested driving force Fda versus the accelerator pedal actuation amount SA. When a failure of the accelerator pedal reaction force generating device 70 is detected, the amount by which the driver's requested driving force Fda increases in response to depression of the accelerator pedal 61 is corrected such that it increases lower rate than the normal rate, which is indicated with the solid-line curve in the figure. Moreover, if it is determined that the driver has the intent to pass, then the amount by which the increase in the driver's requested driving force Fda is suppressed is reduced. In other words, the amount ΔTQ by which the driver's requested driving force Fda changes with respect to an increase Δθ in the accelerator pedal actuation amount SA resulting from depression of the accelerator pedal 61 is adjusted depending on whether or not a failure has occurred and whether or not the driver has the intent to pass.

Therefore, when the aforementioned Equation 7 is used to calculate the updated driver's requested driving force value TQ_NEW, the correction coefficient K_TQ is set in accordance with whether or not a failure has occurred and whether or not the driver has the intent to pass. If a failure of the accelerator pedal reaction force generating device 70 is detected, the correction coefficient K_TQ is set to, for example, 0.5. If it was determined that the driver had the intent to pass before the failure was detected, then the correction coefficient K_TQ is set to a larger value, e.g., 0.8 (0<K_TQ<1).

As a result, when a failure is detected, if it has been determined that the driver does not have the intent to pass, the amount ΔTQ by which the driver's requested driving force Fda changes with respect to a change Δθ in the accelerator pedal actuation amount SA is suppressed as indicated with broken-line curve in FIG. 36. Meanwhile, if it is determined that the driver had the intent to pass before the failure was detected, the change amount ΔTQ is suppressed to a lesser degree as indicated with the single-dot chain line and, thus, the correction of the amount ΔTG by which the requested driving force increases with respect to a depression of the accelerator pedal 61 is reduced. When a failure has not been detected, the increase amount ΔTQ is calculated according to the normal characteristic indicated with the solid-line curve in FIG. 36.

After the controller 50 completes step S3428, in which it calculates the updated driver's requested driving force value TQ_NEW so as to correct the engine torque characteristic in accordance with whether or not a failure has occurred and whether or not the driver has the intent to pass, the controller 50 proceeds to step S3429. In step S3429, the controller 50 reduces the value of the timer T_FAIL by 1. The updated driver's requested driving force value TQ_NEW calculated in step S3428 is used to calculate the driving force correction amount ΔDa and the braking force correction amount ΔDb in step S430.

The eighth embodiment just described can provide the following operational effects in addition to the effects provided by the seventh embodiment.

The controller 50 is configured such that when it detects a failure of the accelerator pedal reaction force generating device 70 and suppresses the amount by which the engine torque increases with respect to an increase in the accelerator pedal actuation amount SA, it reduces the amount of the suppression if it determines that the driver had an intent to pass immediately before the failure was detected. More specifically, when it determines that the driver had the intent to pass, the controller 50 sets the correction coefficient K_TG to a larger value than when it determines that the driver did not have the intent to pass, thereby reducing the correction (suppression) of the amount ΔTG by which the requested driving force increases with respect to an increase Δθ in the depression amount of the accelerator pedal 61. As a result, the engine torque is produced in accordance with an engine torque characteristic that is closer to the reference characteristic.

Ninth Embodiment

A vehicle driving assist system in accordance with a ninth embodiment will now be explained. The basic constituent features of a vehicle driving assist system in accordance with the ninth embodiment are the same as those of the first embodiment shown in FIG. 1. The ninth embodiment will be explained mainly by describing its differences with respect to the first embodiment.

In a vehicle driving assist system in accordance with the ninth embodiment, when a failure of the accelerator pedal reaction force generating device 70 is detected, the engine torque characteristic is corrected such that the engine torque does not readily increase when the accelerator pedal 61 is depressed. More specifically, the amount by which the driver's requested driving force Fda increases with respect to an increase in accelerator pedal actuation amount SA is reduced. Additionally, if it is determined that the driver has the intent to pass after a failure is detected, then the amount by which the increase in the driver's requested driving force Fda is suppressed is reduced and, thus, the amount by which the increase in engine torque is suppressed is reduced.

Figure 37:
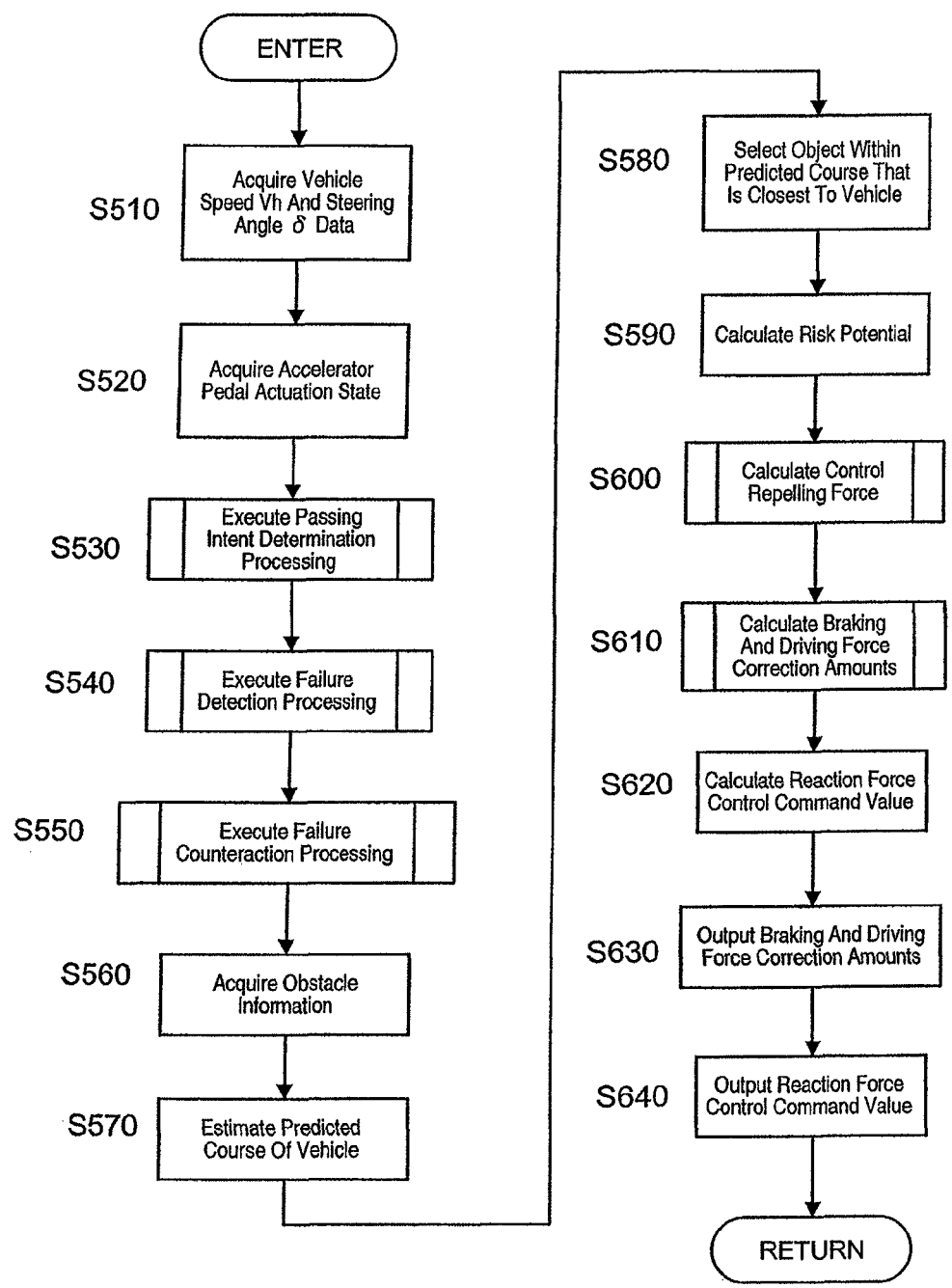
FIG. 37 is a flowchart showing the processing steps of a driving assistance control program in accordance with a ninth embodiment.

The operation of a vehicle driving assist system in accordance with the ninth embodiment will now be explained with reference to the flowchart of FIG. 37. The processing of the steps S510 and S520 is the same as in steps S110 to S120 of the flowchart shown in FIG. 9.

Figure 38:
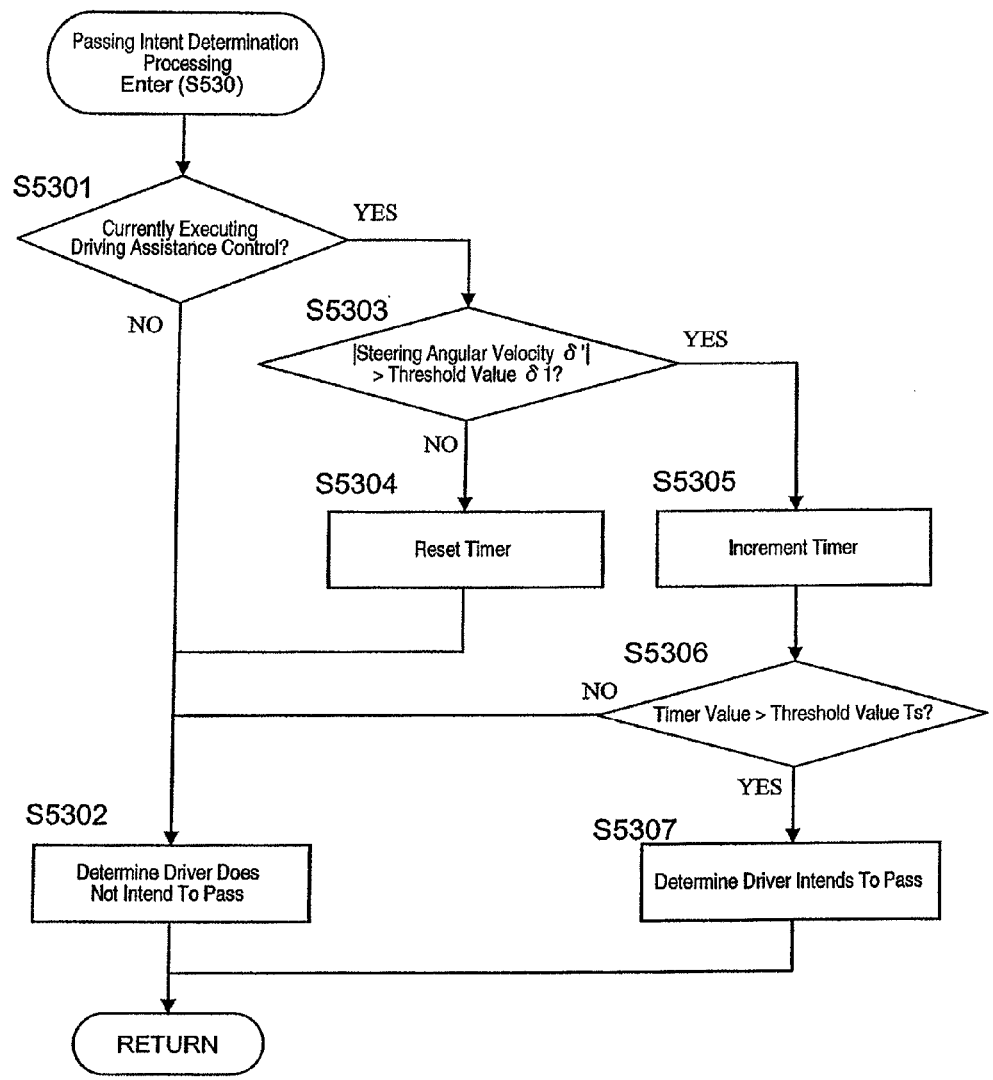
FIG. 38 is a flowchart for explaining the processing steps executed in order to determine if the driver intends to pass.

In step S530, the controller 50 determines if the driver has the intent to pass. The control processing executed in order to determine if the driver has the intent to pass will now be explained with reference to the flowchart of FIG. 38. In step S5301, the controller 50 determines if braking/driving force control and actuation reaction force control are currently being executed based on the risk potential RP. If the result of step S5301 is negative, then the controller 50 proceeds to step S5302 and determines that the driver does not intend to pass the preceding obstacle.

If the result of step S5301 is positive, i.e., if braking/driving force control and actuation reaction force control are already being executed, then the controller 50 proceeds to step S5303. In step S5303, the controller 50 calculates a steering angular velocity $\delta'$ based on the steering angle 8 detected by the steering angle sensor 30 and compares it to a preset threshold value $\delta1$. The threshold value $\delta1$ is set to a value slightly larger than a value that normally occurs when the vehicle is driven within a lane through a gentle curve. If the absolute value of the steering angular velocity $\delta'$ ($|\delta'|$) is below the threshold value $\delta1$, then the driver is steering in a gentle manner and the controller 50 proceeds to step S5304. In step S5304, the controller 50 resets a timer used for determining if the driver intends to pass and proceeds to step S5302, where it determines that the driver does not intend to pass.

If the result of step S5303 is positive, i.e., if $|\delta'|$ is larger than $\delta1$, then the driver is performing a rapid steering operation and the controller 50 proceeds to step S5305, where it increments the timer used to determine if the driver intends to pass. In step S5306, the controller 50 determines if the incremented value of the timer obtained in step S5305 is larger than a threshold value Ts. The threshold value Ts is set in advance to an appropriate value that is equivalent to the steering input time required for the vehicle to change lanes, i.e., the time required to perform the steering operation when the vehicle changes lanes. The threshold value Ts is set to, for example, 0.5 seconds (Ts=0.5 sec).

If the result of step S5306 is positive, i.e., if the driver has been steering the vehicle with a large steering angular velocity $\delta'$ for an amount of time that is longer than the threshold value Ts, then the controller 50 proceeds to step S5307 and determines that the driver intends to pass. Meanwhile, if the result of step S5306 is negative, then the controller 50 proceeds to step S5302 and determines that the driver does not intend to pass.

Thus, in this embodiment, the system can determine if the driver has the intent to pass a preceding obstacle based on the steering state, i.e., the steering angular velocity $\delta'$, as well as the accelerator pedal operation. The steering state is something that expresses the manner in which the driver is operating the steering wheel. Therefore, it is possible to use the steering angle $\delta$ instead of the steering angular velocity $\delta'$ so long as the driver's intent with respect to passing can be determined. It is also possible to determine if the driver intends to pass based on operation of a turn signal by the driver.

After determining if the driver intends to pass in step S530, the controller 50 proceeds to step S540 and executes failure detection processing to determine if a failure of the accelerator pedal reaction force generating device 70 has occurred. In step S550, the controller 50 executes failure countermeasure processing based on the result of the passing intent determination made in step S530 and the value of the failure flag F_FAIL set in step S540. The failure countermeasure processing is executed in accordance with the flowchart shown in FIG. 35, the same as in the eighth embodiment. Additionally, similarly to the seventh embodiment, it is possible to configure the system to limit the driver's requested driving force to an upper limit value TRQ_0 when a failure of the accelerator pedal reaction force generating device 70 is detected and it is determined that the driver has the intent to pass.

The control processing executed in step S560 and thereafter is the same as the control processing executed in step S150 and thereafter of FIG. 9.

The ninth embodiment just described can provide the following operational effects in addition to the effects provided by the first to eighth embodiments.

A vehicle driving assist system 1 in accordance with the ninth embodiment is configured to determine if the driver intends to pass a preceding obstacle based on the operation of a turn signal or the steering wheel. When a failure of the accelerator pedal reaction force generating device 70 is detected and the system 1 suppresses the amount by which the engine torque increases with respect to an increase in the depression amount of the accelerator pedal 61, the system 1 reduces the amount of the suppression if it determines that the driver has the intent to pass after the failure is detected. As a result, the engine torque is produced in accordance with an engine torque characteristic that is closer to the reference characteristic when it is determined that the driver intends to pass.

Tenth Embodiment

A vehicle driving assist system in accordance with a tenth embodiment will now be explained. The basic constituent features of a vehicle driving assist system in accordance with the tenth embodiment are the same as those of the first embodiment shown in FIG. 1. The tenth embodiment will be explained mainly by describing its differences with respect to the first embodiment.

In the tenth embodiment, the system 1 determines if the accelerator pedal reaction force generating device 70 has failed by estimating if the drive circuit 70b of the accelerator pedal reaction force generating device 70 is overheated based on the value of the current flowing through the drive circuit 70b and the length of time the current value has continued. Thus, the failure determination can be accomplished so long as the accelerator pedal reaction force generating device 70 is equipped with at least a current sensor 70*d* and the temperature sensor 70*c* can be omitted.

Figure 39:
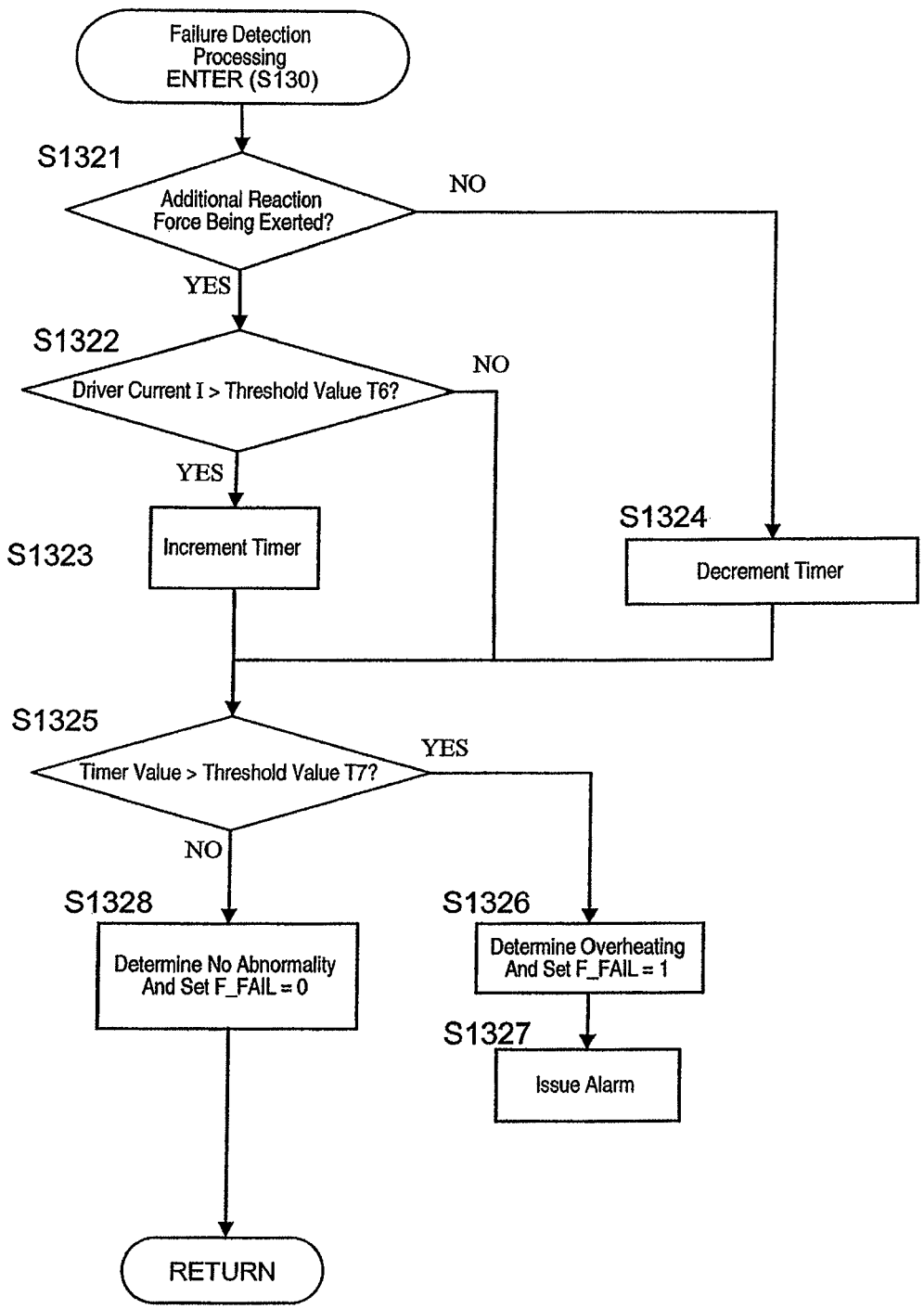
FIG. 39 is a flowchart showing the processing steps executed in a tenth embodiment in order to detect an obstacle.

The failure detection processing executed in the tenth embodiment will now be explained with reference to the flowchart of FIG. 39. This processing is executed in step S130 of the flowchart shown in FIG. 9.

In step S1321, the controller 50 determines if a reaction force is being added to the accelerator pedal 61 in accordance with the risk potential RP. More specifically, the controller 50 determines if the accelerator pedal reaction force control command value FA calculated in the previous control cycle is larger than 0. If an actuation reaction force is being added, then the controller 50 proceeds to step S1322 and compares the current value detected by the current sensor 70*d* to a threshold value T6. The threshold value T6 is set in advance to an appropriate value equivalent to a maximum allowable current determined in view of the circuit design. If the current value I is larger than the threshold value T6, then the controller 50 proceeds to step S1323 and increments a timer used for determining if the accelerator pedal reaction force generating device 70 has failed. If it determines in step S1321 that an actuation reaction force is not being added, then the controller 50 proceeds to step S1324 and decrements the timer.

In step S1325, the controller 50 compares the timer value calculated in step S1323 or step S1324 to a threshold value T7. The threshold value T7 is set in advance to an appropriate time value for determining if the drive circuit 70*b* is overheating. More specifically, the threshold value T7 corresponds to the amount of time that needs to elapse after the current value I exceeds the maximum allowable value T6 in order to determine that the drive circuit 70*b* is overheating. If the amount of time that has elapsed since the current value I became larger than the maximum allowable value T6 is longer than the threshold value T7, then the controller 50 proceeds to step S1326, where it determines that the drive circuit 70*b* is overheating and sets the value of the failure flag F_FAIL to 1. In step S1327, the controller 50 instructs the alarm device 100 to emit the alarm sound and illuminate the alarm lamp. Meanwhile, if the timer value is equal to or smaller than the threshold value T7, then the controller 50 proceeds to step S1328. In step S1328, the controller 50 determines that an abnormality does not exist and sets the failure flag F_FAIL to 0.

The tenth embodiment just described can provide the following operational effects in addition to the effects provided by the first to ninth embodiments.

The controller 50 is configured to detect overheating of the actuator 70*a* or the drive circuit 70*b* by estimating a temperature rise based on a command current inputted to the accelerator reaction force generating device 70 and the amount of time of the command current has been inputted. As a result, the controller 50 can detect overheating without the need for a temperature sensor 70*c*.

Eleventh Embodiment

A vehicle driving assist system in accordance with a eleventh embodiment will now be explained. The basic constituent features of a vehicle driving assist system in accordance with the eleventh embodiment are the same as those of the first embodiment shown in FIG. 1. The eleventh embodiment will be explained mainly by describing its differences with respect to the first embodiment.

In the first to tenth embodiments, the controller 50 is configured such that when a failure of the accelerator pedal reaction force generating device 70 is detected, the controller 50 executes engine torque correction processing and sends a command for correcting the engine torque to the driving force control device 60. Conversely, in the eleventh embodiment, the controller 50 sends failure information regarding the accelerator pedal reaction force generating device 70 to the driving force control device 60 and the driving force control device 60 executes the engine torque correction processing internally.

Figure 40:
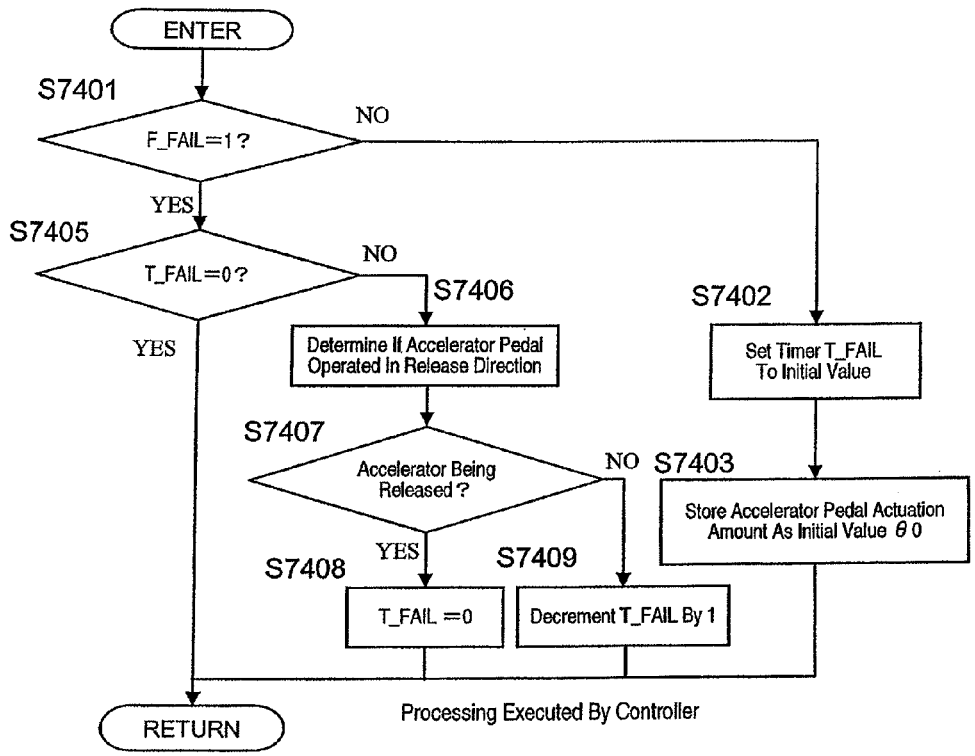
FIGS. 40 (a) and 40 (b) are flowcharts showing the processing steps executed by the controller and the engine controller of an eleventh embodiment in order to counteract a failure.
Figure 40:
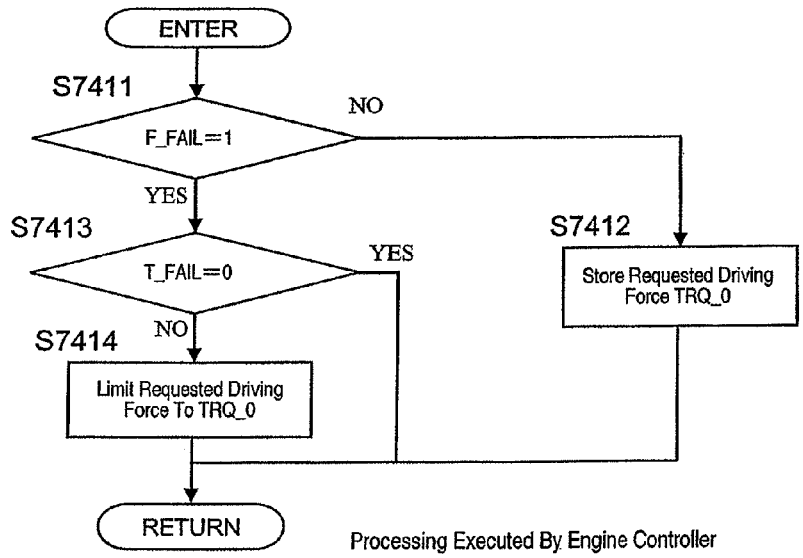

The failure countermeasure processing executed in the eleventh embodiment will now be explained with reference to the flowcharts of FIGS. 40 (*a*) and (*b*). FIG. 40 (*a*) shows the processing executed by the controller 50 and FIG. 40 (*b*) shows the processing executed engine controller 60*c* of the driving force control device 60. The processing shown in these two flowcharts is executed in step S140 of the flowchart shown in FIG. 9.

In step S7401, the controller 50 determines if a failure has occurred by checking if the value of the failure flag F_FAIL set in step S130 is 1. If the value of the flag F_FAIL is 0, then an abnormality does not exist and the controller 50 proceeds to step S7402, where it sets a timer T_FAIL to an initial value. In step S7403, the controller 50 stores the current accelerator pedal actuation amount SA detected by the accelerator pedal stroke sensor 62 as an initial value θ0.

If it determines in step S7401 that a failure exists, i.e., that the value of F_FAIL is 1, then the controller 50 proceeds to step S7404 and determines if the value of the timer T_FAIL is 0. If the value of the timer T_FAIL is 0, the processing of step S140 ends. If the value of the timer T_FAIL is not 0, then the controller 50 proceeds to step S7406 and determines if the accelerator pedal 61 is being operated in the release direction. In step S7407, the controller 50 checks the result of the determination made in step S7506. If the accelerator pedal 61 has been operated in the return direction, then the controller 50 proceeds to step S7508 and resets the timer T_FAIL to 0. Meanwhile, if it determines that the accelerator pedal 61 has not been operated in the release direction, then the controller 50 proceeds to step S7409 and decrements the timer T_FAIL by 1.

In step S7411, the engine controller 60*c* acquires the failure flag F_FAIL from the controller 50 and determines if the failure of F_FAIL is 1. If the value of F_FAIL is 0, i.e., if an abnormality does not exist, then the controller 50 proceeds to step S7412, where it uses the map shown in FIG. 5 to determine the driver's requested driving force TRQ_0 corresponding to the current accelerator pedal actuation amount SA and stores the determined value TRQ_0. Meanwhile, the engine controller 60*c* proceeds to step S7413 if the value F_FAIL is 1, i.e., if a failure exists.

In step S7413, the engine controller 60*c* acquires the value of the timer T_FAIL from the controller 50 and determines if the value of the timer T_FAIL equals 0. If the value of the timer T_FAIL equals 0, the engine controller 60*c* ends the control loop without correcting the engine torque characteristic. Meanwhile, if the value of the timer T_FAIL is not 0, the engine controller 60*c* proceeds to step S7414 and sets the upper limit value of the driver's requested driving force to the value TRQ_0 stored in step S7412.

In this way, the same effects as are obtained in the first to tenth embodiments can also be obtained when the system is configured such that the controller 50 and the engine controller 60*c* work together to correct the engine to characteristic when the reaction force generating device 70 fails.

In the first to eleventh embodiments, the accelerator pedal 61 serves as the driver-operated driving device and the reaction force of the accelerator pedal is controlled in accordance with the risk potential RP. However, the present invention is not limited to accelerator pedal reaction force control. It is also possible to include brake pedal reaction force control It is also possible to configure the system to control the accelerator pedal reaction force alone and not to control the braking and driving forces in accordance with the risk potential RP.

In the first to eleventh embodiments, the time to head way THW and the time to collision of the vehicle with respect to an obstacle are calculated as a risk potential indicating the degree of convergence of the vehicle with respect to the obstacle. However, the present invention is not limited to using both the time to head way THW and the time to collision TTC as the risk potential RP. It is also acceptable to calculate only one or the other of the time to head way THW and the time to collision TTC as the risk potential RP or to use the following distance D as the risk potential RP.

In the first to eleventh embodiments, the controller 50 serves to detects a failure of the accelerator pedal reaction force generating device 70, but the system can also be configured such that the accelerator pedal reaction force generating device 70 executes a self diagnosis in order to detect a failure. In such a case, the controller 50 would acquire a failure self diagnosis result from the accelerator pedal reaction force generating device 70 and correct the engine torque characteristic accordingly.

In the sixth to ninth embodiments, the driver's intent regarding passing is determined based on the operation of the accelerator pedal 61, the turn signal, or the steering wheel. However, it is perfectly feasible to estimate the driver's intent regarding passing using still another method. It is also possible to configure the vehicle driving assist system such that when it is determined that the driver intends to pass, the control repelling force Fc is corrected to a lower value in a uniform manner without taking into account the overlap ratio La of the vehicle with respect to the obstacle.

In the first to eleventh embodiments, the radar device 10 and vehicle speed sensor 20 can function as the traveling situation detecting section. The controller 50 can function as the risk potential calculating section, the actuation reaction force calculating section, the failure detecting section, the engine torque correcting section, the passing intent determining section, the actuation reaction force correcting section, the passing intent determination prohibiting section, and the braking/driving force correcting section. The accelerator pedal reaction force generating device 70 can function as the actuation reaction force generating section. The accelerator pedal stroke sensor 62 and the controller 50 can function as the actuation state detecting section. The driving force control device 60 and the braking force control device 90 can function as the braking/driving force control section. However, the present invention is not limited to these particular devices and controllers. For example, a milliwave radar can be used instead of a laser radar as the radar device 10 that serves as part of the traveling situation detecting section or the camera device 35 can be used as the traveling situation detecting section. It is also possible to use the driving force control device 60 alone as the braking/driving force control section. The explanations presented above are merely examples. When interpreting the present invention, the invention should not be limited or restrained in any way by the corresponding relationships between the embodiments and the claims.

Twelfth Embodiment

Figure 41:
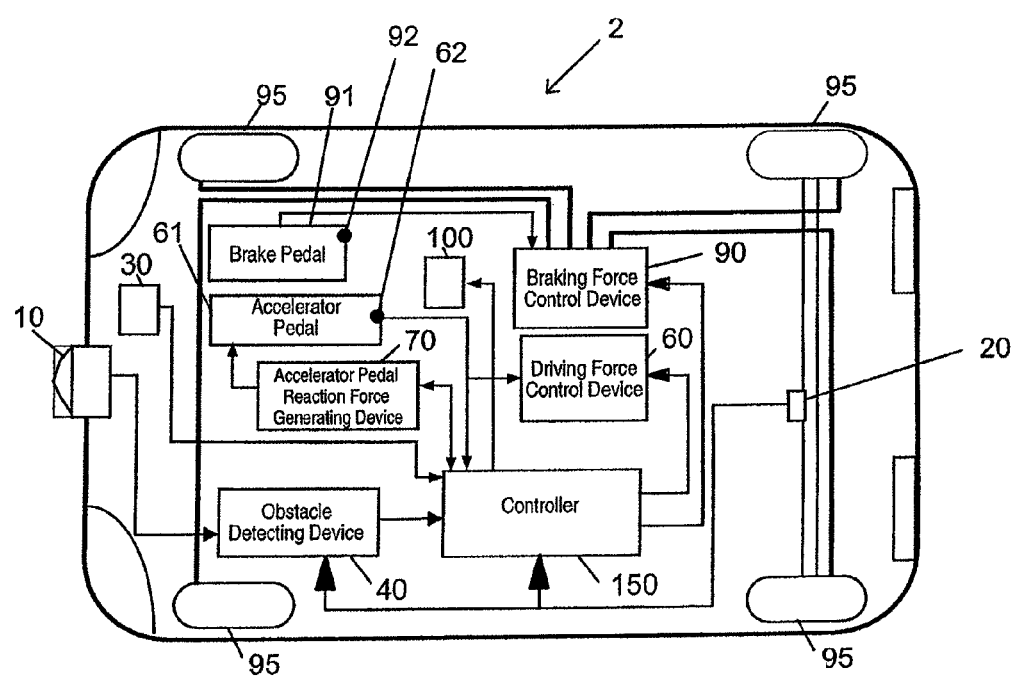
FIG. 41 is a system diagram of a vehicle driving assist system in accordance with a twelfth embodiment of the present invention.

A vehicle driving assist system in accordance with a twelfth embodiment of the present invention will now be explained with reference to the drawings. FIG. 41 is a system diagram showing the constituent features of a vehicle driving assist system 2 in accordance with the twelfth embodiment. In FIG. 41, parts having the same functions as the parts of the first embodiment shown in FIG. 1 are indicated with the same reference numerals. The twelfth embodiment will be explained mainly by describing its differences with respect to the first to eleventh embodiments.

The vehicle driving assist system 2 is equipped with a radar device 10, a vehicle speed sensor 20, a steering angle sensor 30, an obstacle detecting device 40, a controller 150, a drive force control device 60, an accelerator pedal reaction force generating device 70, a braking force control device 90, and an alarm device 100. In the twelfth embodiment, failure diagnoses are executed with respect to the obstacle detecting device 40, the driving force control device 60, the braking force control device 90, and the controller 150 in addition to the accelerator pedal reaction force generating device 70.

Based on the risk potential RP of the vehicle with respect to an obstacle existing in the vicinity of the vehicle, the vehicle driving assist system 2 controls an actuation reaction force exerted against the accelerator pedal 61 and the braking and driving forces exerted against the vehicle. If a failure occurs in the system while actuation reaction force control and braking/driving force control are being executed based on the risk potential RP, these controls will stop and the actuation reaction force of the accelerator pedal and the deceleration and/or drive torque of the vehicle will change. Thus, when a failure occurs in the system, there is the possibility that the vehicle behavior will be different from what the driver was expecting and driver will experience a feeling that something is odd about the vehicle.

Therefore, in the twelfth embodiment, failure diagnoses are executed with respect to the obstacle detecting device 40, the driving force control device 60, the accelerator pedal reaction force generating device 70, the braking force control device 90, and the controller 150. Then, by executing failure countermeasure processing in accordance with the device(s) in which a failure is detected, sudden changes in the acceleration or deceleration of the vehicle are suppressed and the odd feeling experienced by the driver is alleviated.

Figure 42:
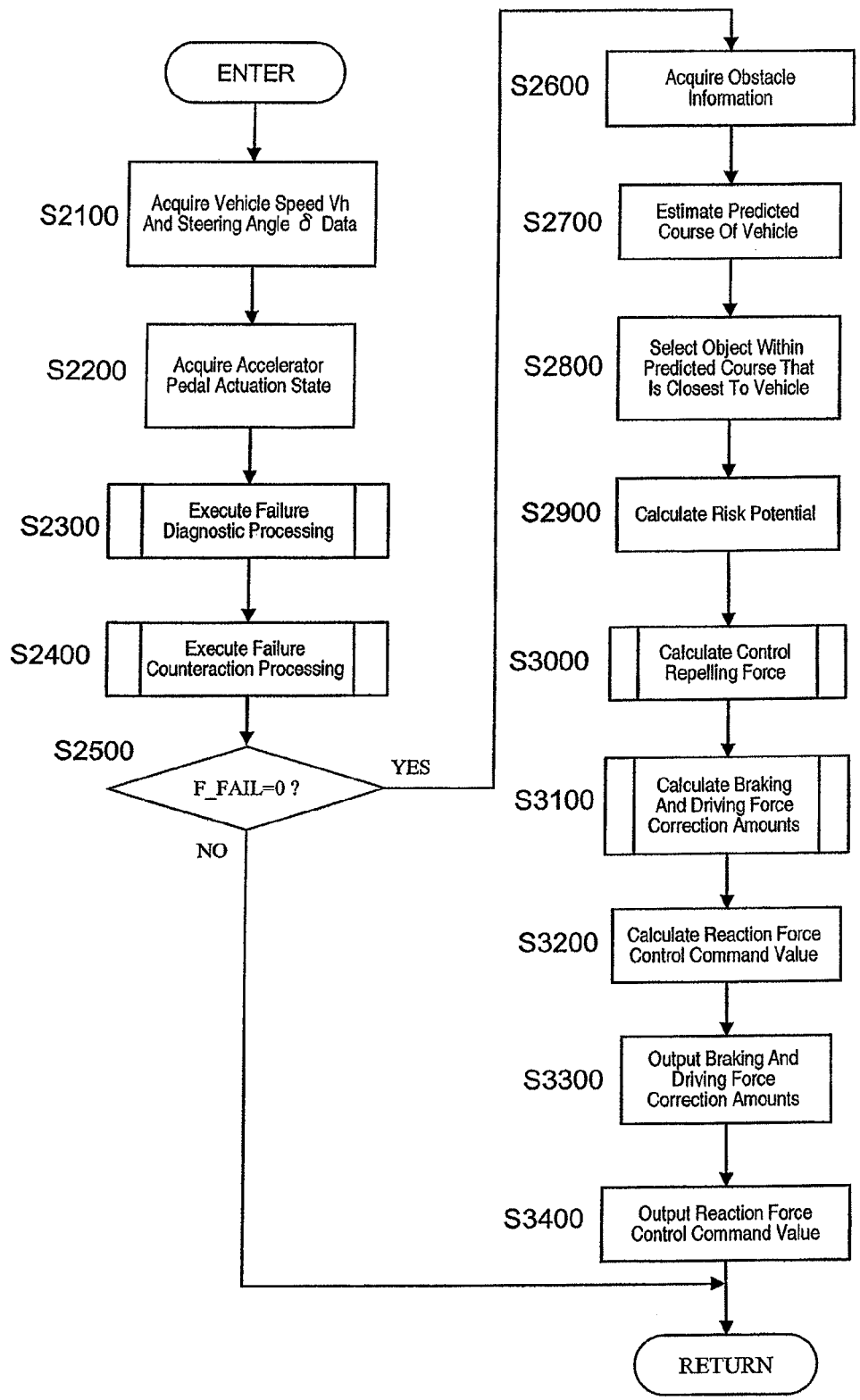
FIG. 42 is a flowchart showing the processing steps of a driving assistance control program in accordance with the twelfth embodiment.

The operation of a vehicle driving assist system 2 in accordance with the twelfth embodiment will now be explained in detail with reference to FIG. 42. FIG. 42 is a flowchart showing the processing steps of the driving assistance control executed by the controller 150 in the twelfth embodiment. This control loop is executed continuously once per prescribed time period, e.g., every 50 msec.

In step S2100, the controller 150 reads in the vehicle speed Vh detected by the vehicle speed sensor 20 and the steering angle δ of the vehicle detected by the steering angle sensor 30. In step S2200, the controller 150 also reads in the accelerator pedal actuation amount SA detected by the accelerator pedal stroke sensor 62.

Figure 43:
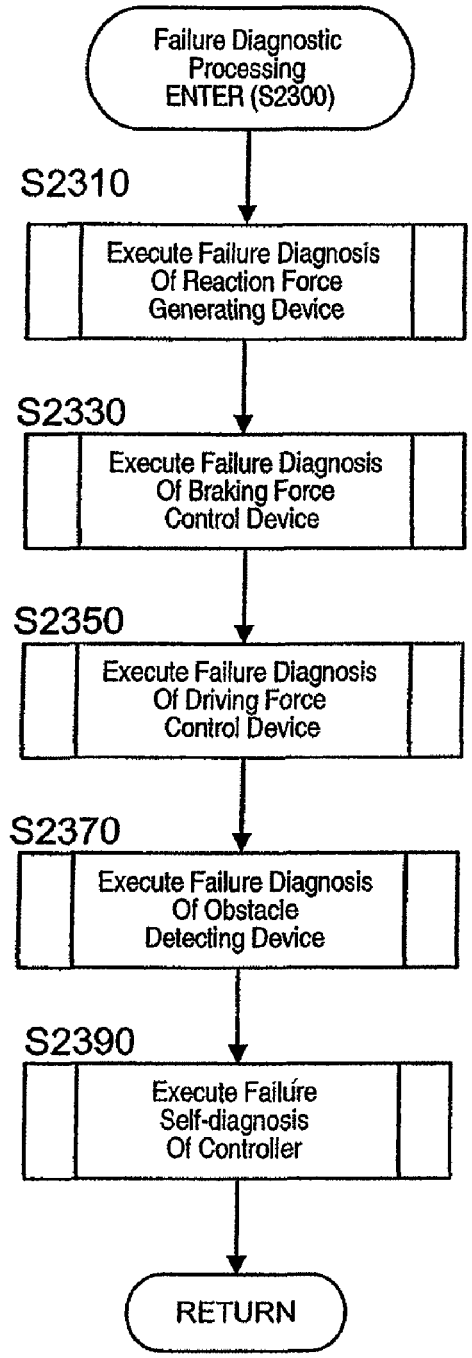
FIG. 43 is a flowchart showing the processing steps executed in order to diagnose a failure.

In step S2300, the controller 150 executes failure diagnostic processing with respect to the devices that make up the vehicle driving assist system 2, i.e., the obstacle detecting device 40, the driving force control device 60, the accelerator pedal reaction force generating device 70, the braking force control device 90, and the controller 150. The failure diagnostic processing will now be explained with reference to the flowchart of FIG. 43. In step S2310, the controller 150 diagnoses the accelerator pedal reaction force generating device 70 by checking if a severed connection, over-current, or overheating failure has occurred in the accelerator pedal reaction force generating device 70. The control processing executed in order to diagnose the accelerator pedal reaction force generating device 70 will now be explained with reference to the flowcharts of FIGS. 44 to 46.

Figure 44:
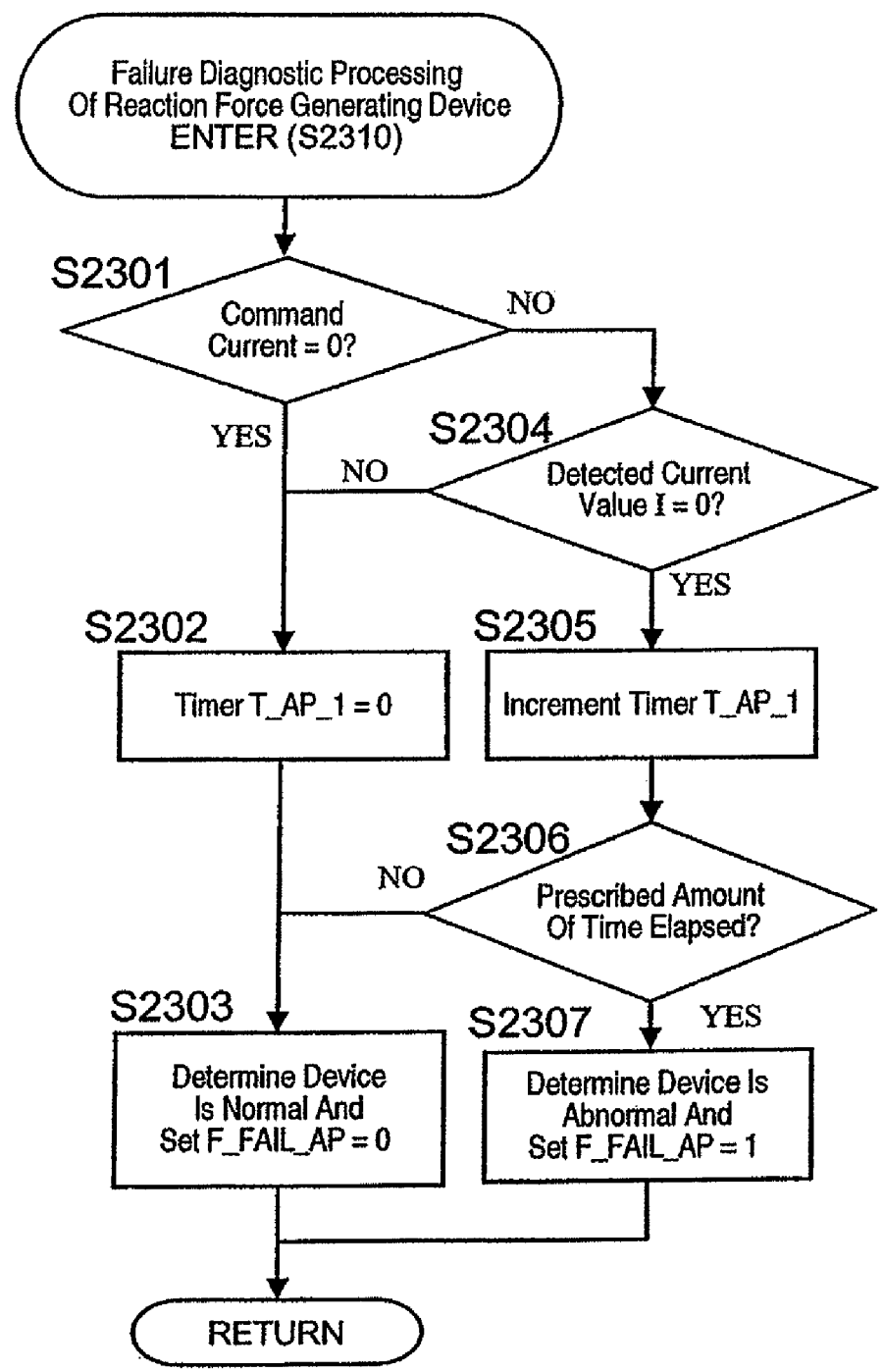
FIG. 44 is a flowchart showing the processing steps executed in order to accomplish a failure diagnosis with respect to the accelerator pedal reaction force generating device.

First, the severed connection diagnosis of the accelerator pedal reaction force generating device 70 will be explained using the flowchart of FIG. 44. In step S2301, the controller 150 determines if the command current value corresponding to the reaction force command value FA sent from the controller 150 to the accelerator pedal reaction force generating device 70 in the previous control cycle is 0. If the command current value equals 0, then a command current corresponding to the reaction force command value FA is not being delivered from the controller 150 and the controller 150 proceeds to step S2302. In step S2302, the controller 150 resets a timer T_AP_1 for determining if a severed connection exists in the accelerator pedal reaction force generating device 70 to 0. In step S2303, the controller 150 determines that an abnormality does not exist and sets a flag F_FAIL_AP for indicating whether or not a failure exists in the accelerator pedal reaction force generating device 70 to 0.

If it is found in step S2301 that the command current value is not 0, the controller 150 proceeds to step S2304 and determines if the detected current value I acquired from the current sensor 70d is 0. If the detected current value I equals 0, the controller 150 proceeds to step S2305. If the detected current value I does not equal 0, the controller 150 proceeds to step S2302. In step S2305, the controller 150 increments the timer T_AP_1 and proceeds to step S2306, where it compares the value of the timer T_AP_1 obtained in step S2305 to a prescribed value. The prescribed value is set to an amount of time that is sufficiently longer than the response time of the drive circuit 70b of the accelerator pedal reaction force generating device 70.

The controller 150 proceeds to step S2307 if the value of the timer T_AP_1 is larger than the prescribed value, i.e., if an appropriate current value I has not been detected after a prescribed amount of time has elapsed even though a current command corresponding to the reaction force command value FA is being sent from the controller 150. In step S2307, the controller 150 determines that a severed connection exists in the servomotor 70a or the drive circuit 70b and sets the flag F_FAIL_AP to 1. If the result of step S2306 is negative, the controller 150 proceeds to step S2303 and sets the flag F_FAIL_AP to 0.

Figure 45:
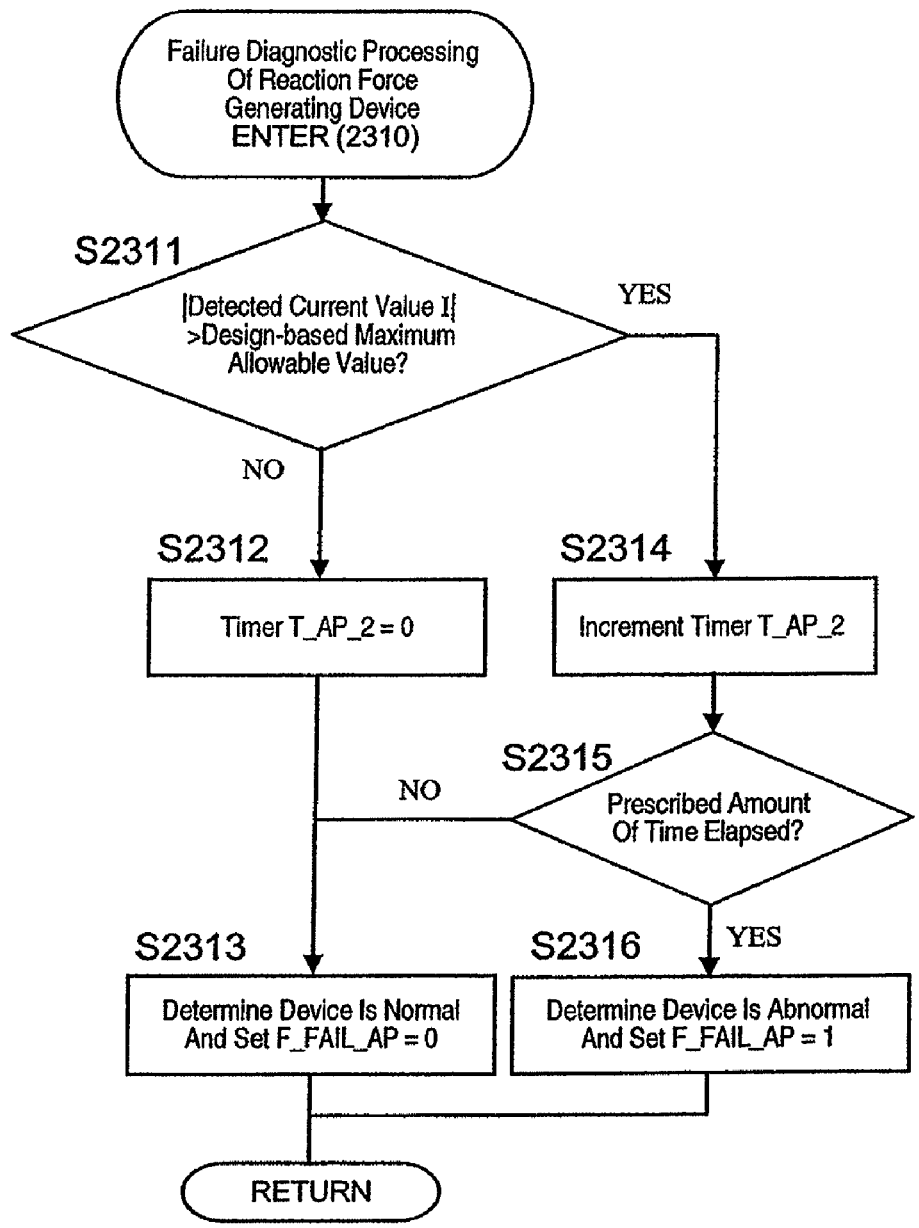
FIG. 45 is a flowchart showing the processing steps executed in order to accomplish another failure diagnosis with respect to the accelerator pedal reaction force generating device.

Next, the over-current diagnosis of the accelerator pedal reaction force generating device 70 will be explained using the flowchart of FIG. 45. In step S2311, the controller 150 determines if the absolute value of the detected current value I acquired from the current sensor 70d is larger than a maximum allowable value set in view of the circuit design (design maximum allowable value). If the absolute value of the detected current value I is equal to or below the design maximum allowable value, the controller 150 proceeds to step S2312 and resets the value of a timer T_AP_2 for determining if an over-current failure exists in the accelerator pedal reaction force generating device 70 to 0. Then, in step S2313, the controller 150 determines that an abnormality does not exist and sets the flag F_FAIL_AP for indicating whether or not a failure exists in the accelerator pedal reaction force generating device 70 to 0.

If it is determined in step S2311 that the absolute value of the detected current value I is larger than the design maximum allowable value, the controller 150 proceeds to step S2314 and increments the timer T_AP_2. Then, in step S2315, the controller compares the value of the timer T_AP_2 obtained in step S2314 to a prescribed value. If the value of the timer T_AP_2 is larger than the prescribed value, i.e., if the detected current value I has exceeded the design maximum allowable value continuously for a prescribed amount of time, then the controller 150 proceeds to step S2316. In step S2316, the controller 150 determines that an over-current (short circuit) failure exists and sets the flag F_FAIL_AP to 1. If the result of step S2315 is negative, the controller 150 proceeds to step S2313 and sets the flag F_FAIL_AP to 0.

Figure 46:
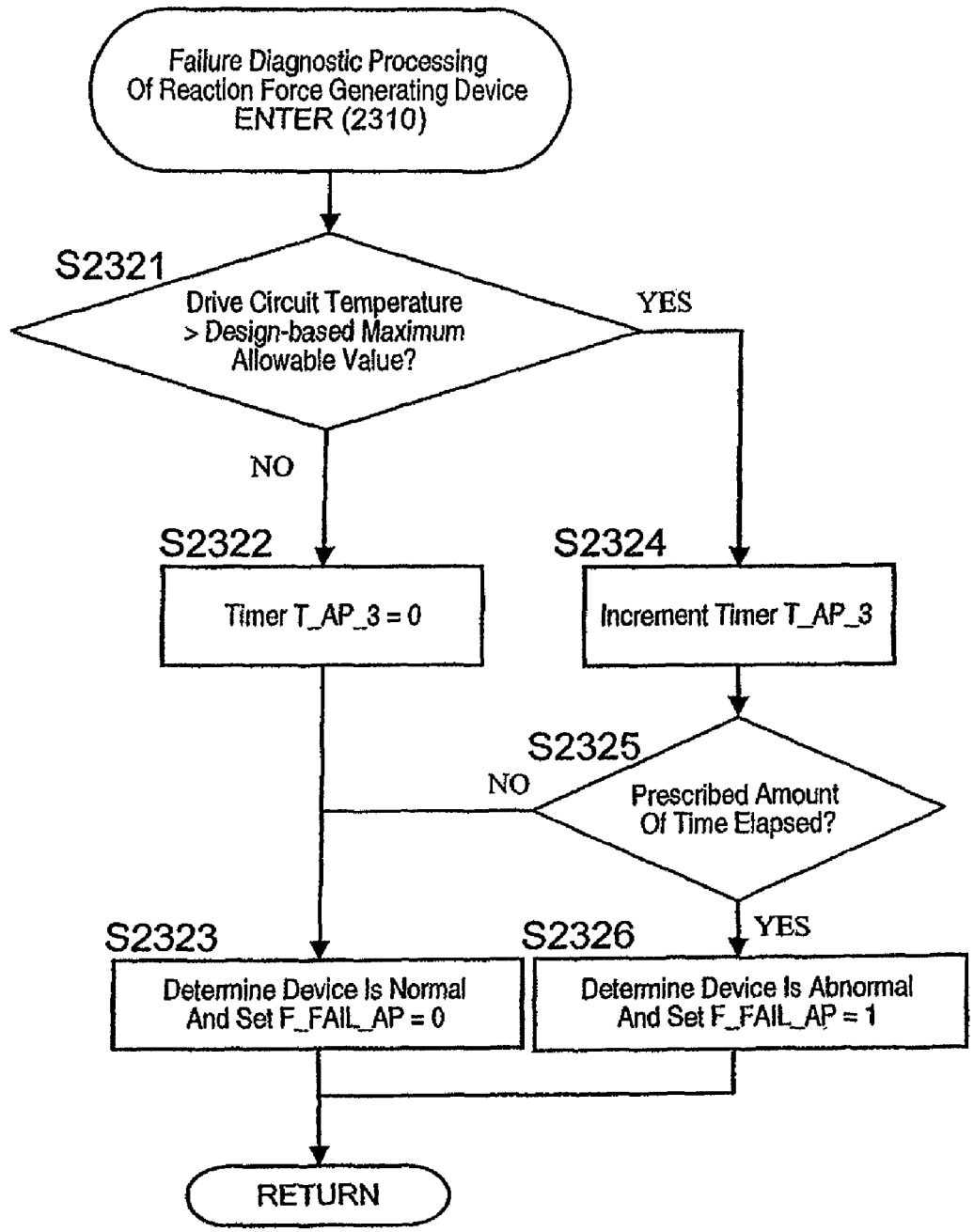
FIG. 46 is a flowchart showing the processing steps executed in order to accomplish another failure diagnosis with respect to the accelerator pedal reaction force generating device.

Next, the overheating diagnosis of the accelerator pedal reaction force generating device 70 will be explained using the flowchart of FIG. 46. In step S2321, the controller 150 determines if the temperature C of the drive circuit 70b acquired from the temperature sensor 70c is larger than a maximum allowable value set in view of the circuit design (design maximum allowable value). If the temperature C is equal to or below the design maximum allowable value, the controller 150 proceeds to step S2322 and resets the value of a timer T_AP_3 for determining if an overheating failure exists in the accelerator pedal reaction force generating device 70 to 0. In step S2323, the controller 150 determines that an abnormality does not exist and sets the flag F_FAIL_AP for indicating whether or not a failure exists in the accelerator pedal reaction force generating device 70 to 0.

If it is determined in step S2321 that the temperature C is larger than the design maximum allowable value, the controller 150 proceeds to step S2324 and increments the timer T_AP_3. Then, in step S2325, the controller compares the value of the timer T_AP_3 obtained in step S2324 to a prescribed value. If the value of the timer T_AP_3 is larger than the prescribed value, i.e., if the detected temperature C has exceeded the design maximum allowed value continuously for a prescribed amount of time, then the controller 150 proceeds to step S2326. In step S2326, the controller 150 determines that an overheating failure exists and sets the flag F_FAIL_AP to 1. If the result of step S2325 is negative, the controller 150 proceeds to step S2323 and sets the flag F_FAIL_AP to 0.

After the controller 150 executes failure diagnostic processing with respect to the accelerator pedal reaction force generating device 70 in step S2310, the controller 150 proceeds to step S2330.

In step S2330, the controller 150 executes failure diagnostic processing with respect to the braking force control device 90. The failure diagnosis of the braking force control device 90 comprises, for example, determining if a severed connection failure or an over-current failure has occurred in the braking force control device 90. The diagnostic processing will now be explained with reference to the flowcharts of FIGS. 47 and 48.

Figure 47:
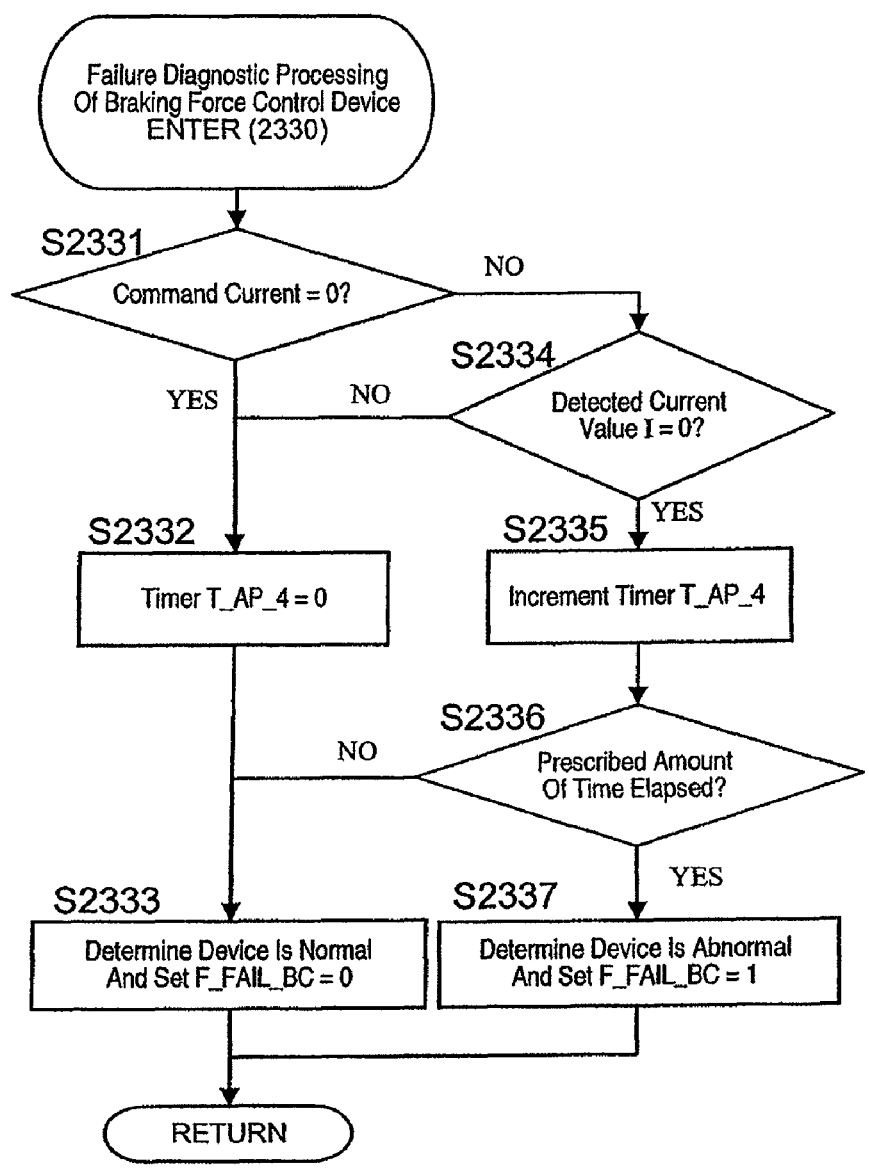
FIG. 47 is a flowchart showing the processing steps executed in order to accomplish a failure diagnosis with respect to the braking force control device.

First, the severed connection diagnosis of the braking force control device 90 will be explained using the flowchart of FIG. 47. In step S2331, the controller 150 determines if the command current value corresponding to the braking force correction amount ΔDb sent from the controller 150 to the braking force control device 90 in the previous control cycle is 0. If the command current value equals 0, then a command current corresponding to the braking force correction amount ΔDb from the controller 150 is not being delivered and the controller 150 proceeds to step S2332. In step S2332, the controller 150 resets a timer T_AP_4 for determining if a severed connection exists in the braking force control device 90 to 0. In step S2333, the controller 150 determines that an abnormality does not exist and sets a flag F_FAIL_BC for indicating whether or not a failure exists in the braking force control device 90 to 0.

If it is found in step S2331 that the command current value is not 0, the controller 150 proceeds to step S2334 and determines if a current detected in the braking force control device 90 with a current sensor (not shown) is 0. If the detected current value equals 0, the controller 150 proceeds to step S2335. If the detected current value does not equal 0, the controller 150 proceeds to step S2332. In step S2335, the controller 150 increments the timer T_AP_4 and proceeds to step S2336, where it compares the value of the timer T_AP_4 obtained in step S2335 to a prescribed value. The prescribed value is set to an amount of time that is sufficiently longer than the response time of the drive circuit of the braking force control device 90.

The controller 150 proceeds to step S2337 if the value of the timer T_AP_4 is larger than the prescribed value, i.e., if an appropriate current value has not been detected after a prescribed amount of time has elapsed even though a current command is being sent from the controller 150 a pump drive motor or a valve solenoid of the braking force control device 90. In step S2337, the controller 150 determines that a severed connection failure exists in the motor or drive circuit and sets the flag F_FAIL_BC to 1. If the result of step S2336 is negative, the controller 150 proceeds to step S2333 and sets the flag F_FAIL_BC to 0.

Figure 48:
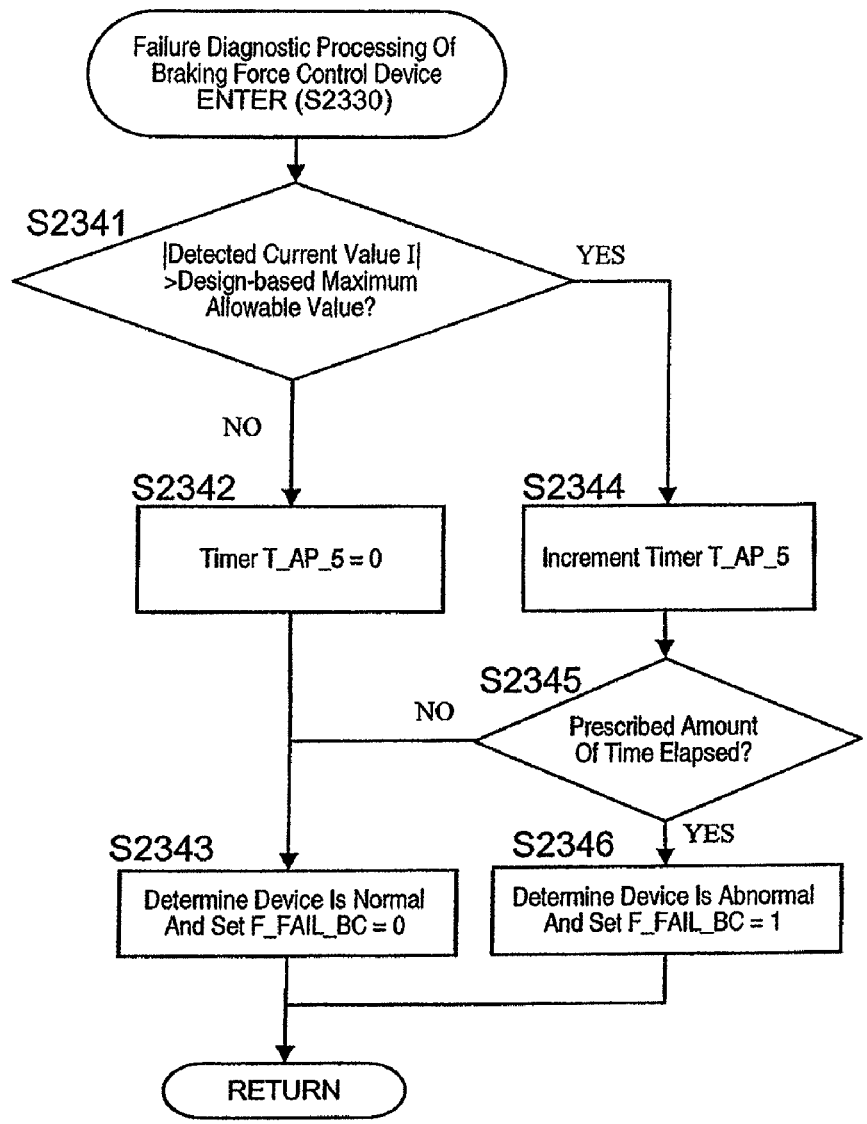
FIG. 48 is a flowchart showing the processing steps executed in order to accomplish another failure diagnosis with respect to the braking force control device.

Next, the over-current diagnosis of the braking force control device 90 will be explained using the flowchart of FIG. 48. In step S2341, the controller 150 determines if the absolute value of the current value detected in the braking force control device 90 with the current sensor is larger than a maximum allowable value set in view of the circuit design (design maximum allowable value). If the absolute value of the detected current value is equal to or below the design maximum allowable value, the controller 150 proceeds to step S2342 and resets the value of a timer T_AP_5 for determining if an over-current failure exists in the braking force control device 90 to 0. In step S2343, the controller 150 determines that an abnormality does not exist and sets the flag F_FAIL_BC for indicating if a failure exists in the braking force control device 90 to 0.

If it is determined in step S2341 that the absolute value of the detected current value is larger than the design maximum allowable value, the controller 150 proceeds to step S2344 and increments the timer T_AP_5. Then, in step S2345, the controller compares the value of the timer T_AP_5 obtained in step S2344 to a prescribed value. If the value of the timer T_AP_5 is larger than the prescribed value, i.e., of the detected current value has exceeded the design maximum allowable value continuously for a prescribed amount of time, then the controller 150 proceeds to step S2346. In step S2346, the controller 150 determines that an over-current (short circuit) failure exists and sets the flag F_FAIL_BC to 1. If the result of step S2345 is negative, the controller 150 proceeds to step S2343 and sets the flag F_FAIL_BC to 0.

After the controller 150 executes failure diagnostic processing with respect to the braking force control device 90 in step S2330, the controller 150 proceeds to step S2350.

Figure 49:
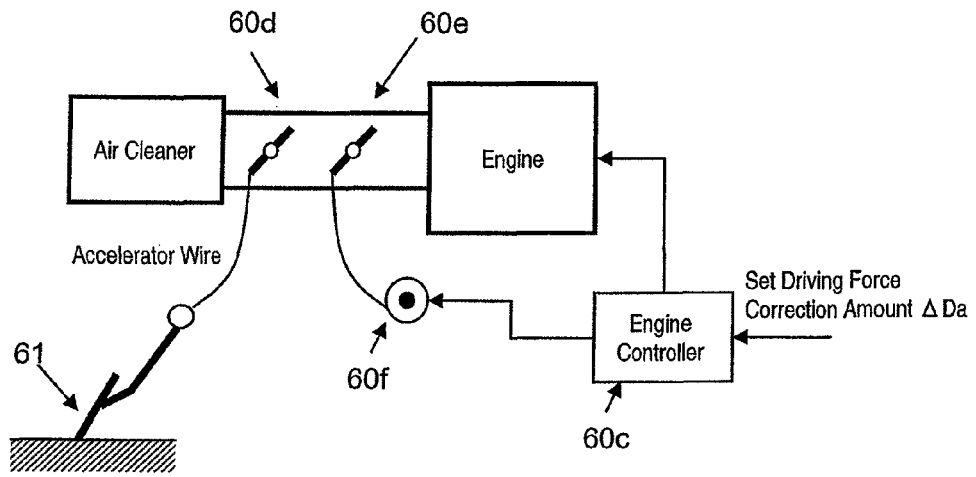
FIG. 49 is a system diagram showing the constituent features of the driving force control device and other components peripheral thereto.

In step S2350, the controller 150 executes failure diagnostic processing with respect to the driving force control device 60. Here, a diagnosis checking for a severed connection failure in the driving force control device 60 will be explained as an example. As shown in FIG. 49, a first throttle valve 60d and a second throttle valve 60e are provided in an intake pipe connecting an air cleaner to the engine. The first throttle valve 60d is connected to the accelerator pedal 61 by an accelerator wire and opens and closes in response to operation (depression and release) of the accelerator pedal 61 by the driver. The second throttle valve 60e is driven by an actuator (motor) 60f that is controlled by the engine controller 60c in accordance with the driving force correction amount ΔDa outputted from the controller 150. The second throttle valve 60e is kept fully open when driving force control based on the risk potential RP is not being executed and is closed in accordance with the driving force correction amount ΔDa by the actuator 60f when driving force control is being executed. Thus, the driving force control acts to reduce the driving force exerted against the vehicle.

When a severed connection failure occurs in the actuator 60f or the drive circuit of the driving force control device 60, the second throttle valve 60e remains in or returns to a fully open state and the driving force exerted against the vehicle corresponds to the operation of the accelerator pedal 61 by the driver.

Figure 50:
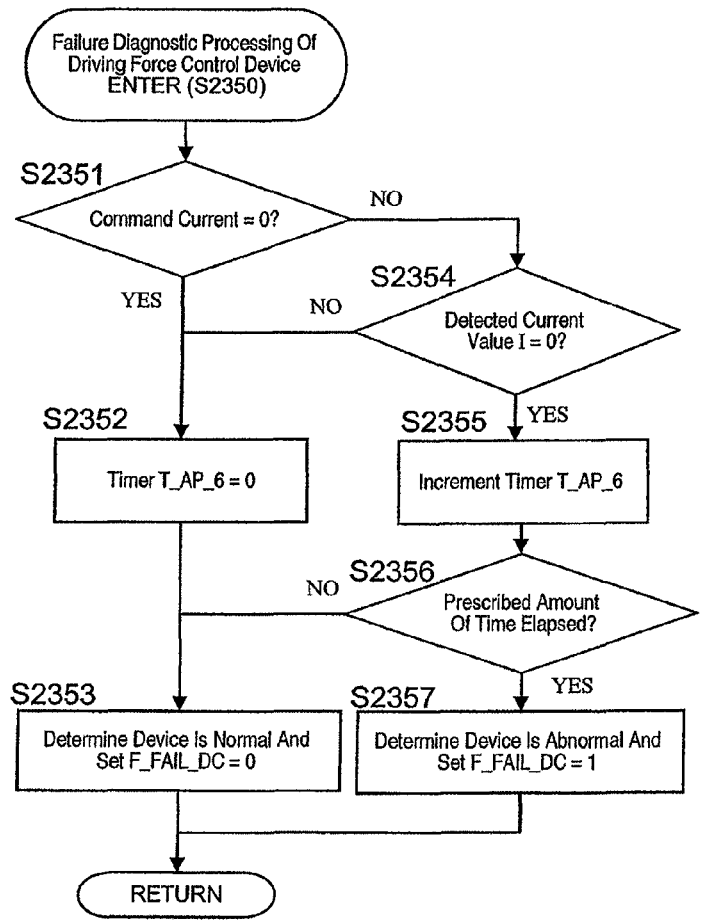
FIG. 50 is a flowchart showing the processing steps executed in order to accomplish a failure diagnosis with respect to the driving force control device.

The failure diagnostic processing executed with respect to the driving force control device 60 will now be explained using the flowchart of FIG. 50. In step S2351, the controller 150 determines if the command current value corresponding to the driving force correction amount ΔDa sent from the controller 150 to the driving force control device 60 in the previous control cycle is 0. If the command current value equals 0, then a command current corresponding to the driving force correction amount ΔDa is not being delivered from the controller 150 and the controller 150 proceeds to step S2352. In step S2352, the controller 150 resets a timer T_AP_6 for determining if a severed connection exists in the driving force control device 60 to 0. In step S2353, the controller 150 determines that an abnormality does not exist and sets the flag F_FAIL_DC for indicating if a failure exists in the driving force control device 60 to 0.

If it is found in step S2351 that the command current value is not 0, the controller 150 proceeds to step S2354 and determines if a current detected in the driving force control device 60 with a current sensor (not shown) is 0. If the detected current value equals 0, the controller 150 proceeds to step S2355. If the detected current value does not equal 0, the controller 150 proceeds to step S2352. In step S2355, the controller 150 increments the timer T_AP_6 and proceeds to step S2356, where it compares the value of the timer T_AP_6 obtained in step S2355 to a prescribed value. The prescribed value is set to an amount of time that is sufficiently longer than the response time of the drive circuit of the driving force control device 60.

The controller 150 proceeds to step S2357 if the value of the timer T_AP_6 is larger than the prescribed value, i.e., if an appropriate current value has not been detected after a prescribed amount of time has elapsed even though a current command is being sent to the actuator 60f from the controller 150. In step S2357, the controller 150 determines that a severed connection failure exists in the actuator 60f or the drive circuit and sets the flag F_FAIL_DC to 1. If the result of step S2356 is negative, the controller 150 proceeds to step S2353 and sets the flag F_FAIL_DC to 0.

Figure 51:
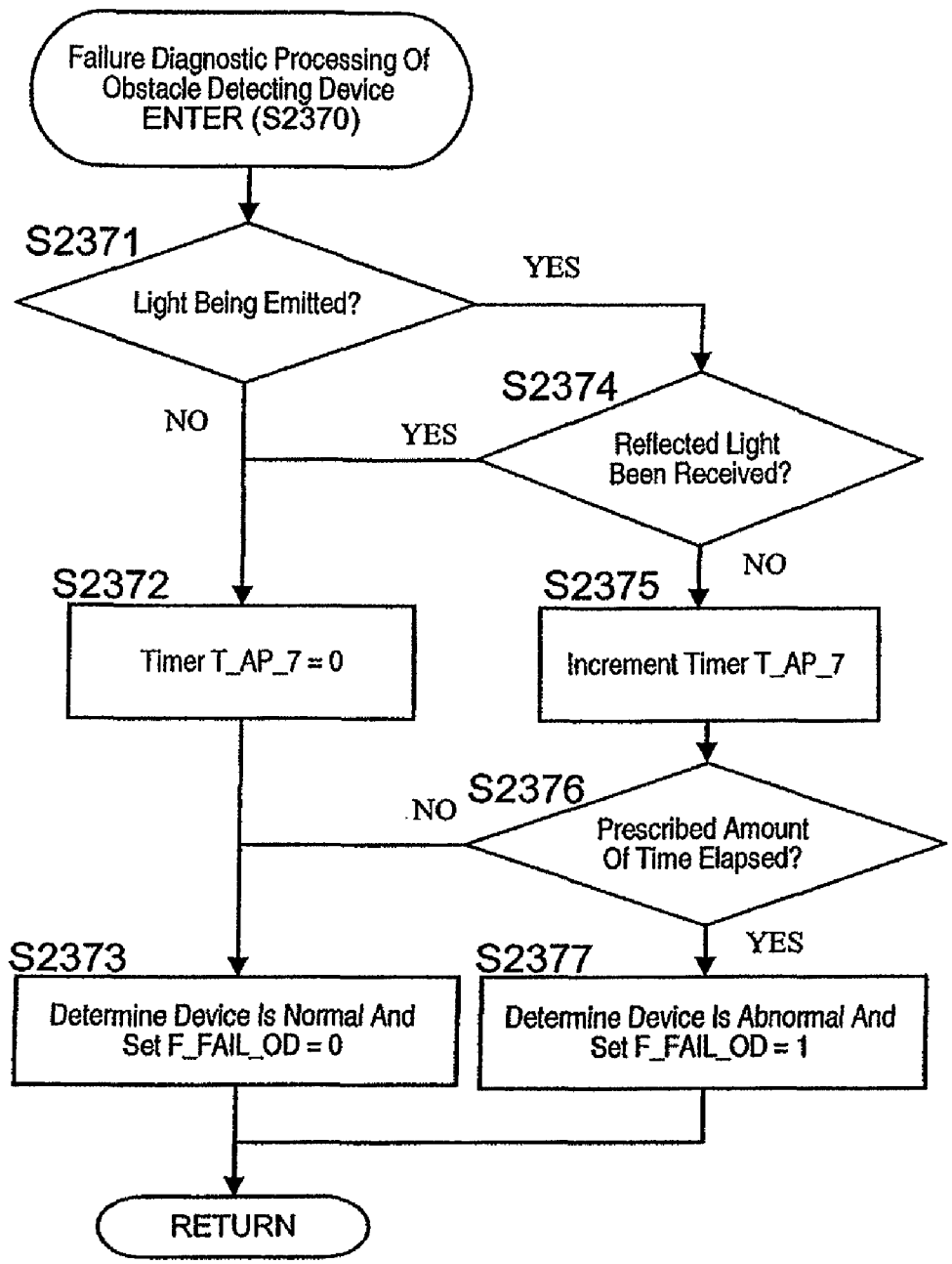
FIG. 51 is a flowchart showing the processing steps executed in order to accomplish a failure diagnosis with respect to the radar device.

After the controller 150 executes failure diagnostic processing with respect to the driving force control device 60 in step S2350, the controller 150 proceeds to step S2370. In step S2370, the controller 150 executes failure diagnostic processing with respect to the obstacle detecting device 40, i.e., more specifically, the radar device 10 that serves to detect obstacles in front of the vehicle. The failure diagnostic processing executed with respect to the obstacle detecting device 40 will now be explained with reference to the flowchart of FIG. 51.

In step S2371, the controller 150 determines if the light emitting part 10a (see FIG. 2) of the radar device 10 is emitting light. If the light emitting part 10a is not shining laser light in front of the vehicle, the controller 150 proceeds to step S2372. In step S2372, the controller 150 resets a timer T_AP_7 for determining if the radar device 10 has failed to 0. In step S2373, the controller 150 determines that an abnormality does not exist and sets a flag F_FAIL_OD for indicating whether or not a failure exists in the radar device 10 to 0.

If it determines in step S2371 that the light emitting part 10a is emitting light, the controller 150 proceeds to step S2374. In step S2374, the controller 150 determines if light emitted from the light emitting part 10a and reflected from an obstacle in front of the vehicle has been received by the light receiving part 10b. If the reflected light has been received normally, the controller 150 proceeds to step S2372. If the reflected light has not been received even though the laser light has been emitted, the controller 150 proceeds to step S2375. In step S2375, the controller 150 increments the timer T_AP_7 and proceeds to step S2376, where it compares the value of the timer T_AP_7 obtained in step S2375 to a prescribed value.

If the value of the timer T_AP_7 is larger than the prescribed value, i.e., if a prescribed amount of time has elapsed without reflected light being received while laser light is being emitted, the controller 150 proceeds to step S2377. In step S2377, the controller 150 determines that a failure exists in the radar device 10 and sets the flag F_FAIL_OD to 1. If the result of step S2376 is negative, the controller 150 proceeds to step S2373 and sets the flag F_FAIL_OD to 0.

Figure 52:
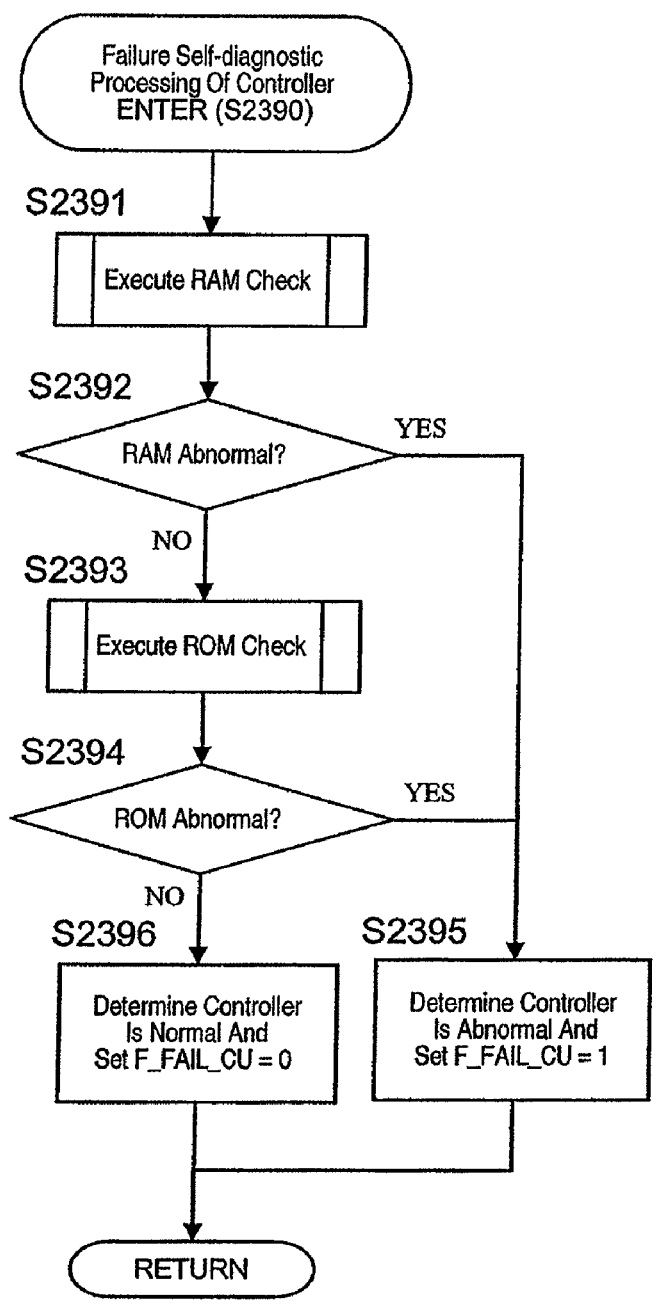
FIG. 52 is a flowchart showing the processing steps executed in order to accomplish a failure self-diagnosis with respect to the controller.

After the controller 150 executes failure diagnostic processing with respect to the obstacle detecting device 40 in step S2370, the controller 150 proceeds to step S2390. In step S2390, the controller 150 executes self diagnostic processing to check if a failure exists in the controller 150 itself. The controller 150 includes a RAM and a ROM. The self diagnostic processing involves checking ability of the controller 150 to write to and read from the RAM and checking written values of the ROM. If an abnormality is detected, the controller 150 determines that a failure exists. The failure self-diagnostic processing executed with respect to the controller 150 will now be explained with reference to the flowchart of FIG. 52.

Figure 53:
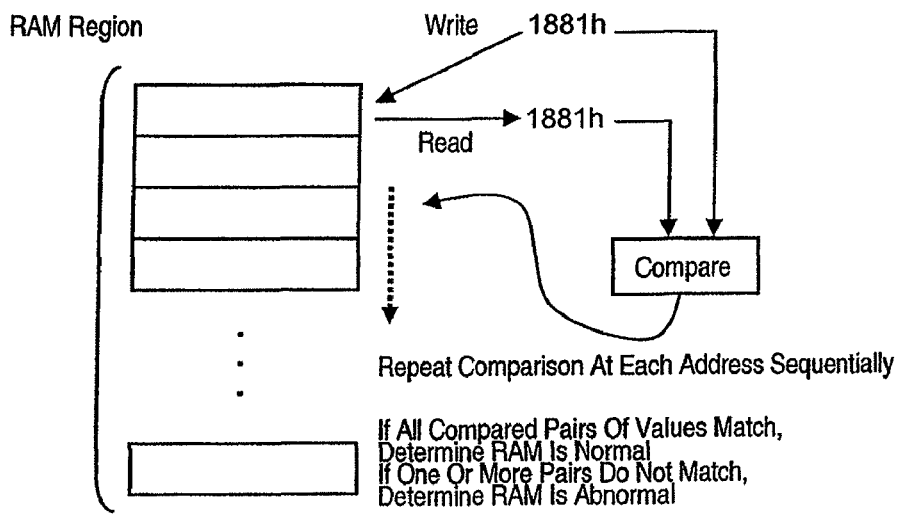
FIG. 53 is a diagram for explaining the how the RAM is checked.

In step S2391, the controller 150 checks the RAM. More specifically, as shown in FIG. 53, the controller 150 compares a written value to a read value at each RAM address. For example, if the written value is 1881h (where "h" indicates that the value is a base-16 number), the read value should also be 1881h. If so, the controller 150 determines that the values match. The controller 150 sequentially compares a written value and a read value at each address of the entire address region of the RAM.

In step S2392, the controller 150 determines if an abnormality exists in the RAM based on the comparison results for the entire address region of the RAM. If the written value and the read value match at every address, the controller 150 determines that the RAM is normal and proceeds to step S2393. Conversely, if the written and read values at even one address do not match, the controller 150 determines that the RAM is abnormal and proceeds to step S2395.

Figure 54:
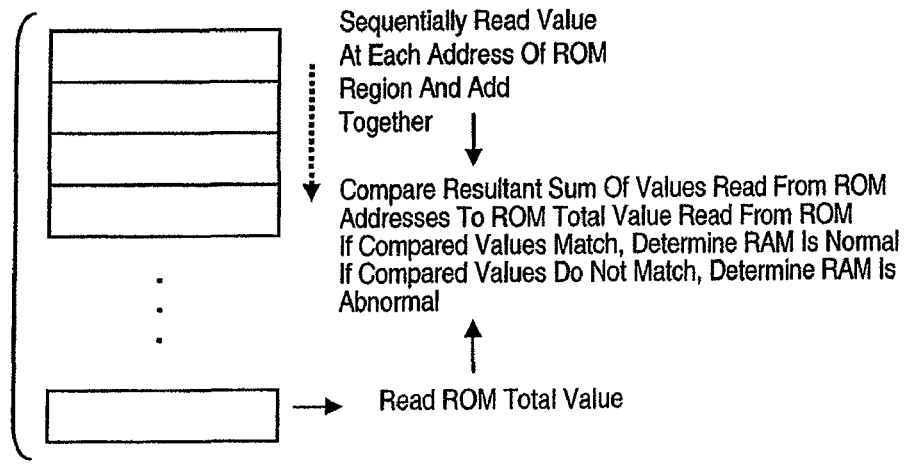
FIG. 54 is a diagram for explaining the how the ROM is checked.

In step S2393, the controller 150 checks the ROM. More specifically, as shown in FIG. 54, the controller 150 reads a value from each address of the ROM and adds the values together. The controller 150 also reads a ROM total value. In step S2394, the controller 150 determines if the ROM is abnormal or not based on the resultant sum value obtained by adding up the individual values of the ROM addresses and the ROM total value read from the ROM. If the resultant sum value of the individual ROM addresses equals the ROM total value, the controller 150 determines that the ROM is normal and proceeds to step S2396. Conversely, if the resultant sum value and the ROM total value do not match, the controller 150 determines that the ROM is abnormal and proceeds to step S2395.

In step S2395, the controller 150 determines that the controller 150 has failed and sets a flag F_FAIL_CU for indicating whether or not a failure exists in the controller 150 to 1. In step S2396, the controller 150 determines that an abnormality does not exist and sets the flag F_FAIL_CU to 0.

After the controller 150 completes the failure self-diagnostic processing of step S2390, it ends the failure diagnostic processing of step S2300. The controller 150 then proceeds to step S2400 and executes failure countermeasure processing. The failure countermeasure processing will now be explained with reference to the flowchart of FIG. 55.

In step S2410, the controller 150 checks the results of the failure diagnostic processing executed in step S2300 to determine whether or not a failure was detected each device. The controller 150 proceeds to step S2420 if the value of any one or more of the flags F_FAIL_AP, F_FAIL_BC, F_FAIL_DC, F_FAIL_OD, and F_FAIL_CU is 1, i.e., if there is a failure in one or more of the accelerator pedal reaction force generating device 70, the braking force control device 90, the driving force control device 60, the obstacle detecting device 40, and the controller 150. If the result of step S2410 is negative, the controller 150 ends the processing of step S2400.

In step S2420, the controller 150 determines if the value of a flag F_FAIL_END is 0. The flag F_FAIL_END indicates whether or not a failsafe transition processing (described later) has ended. If the value of the flag F_FAIL_END is 0, i.e., if the failsafe transition processing has not ended yet, the controller 150 proceeds to step S2430. If the value of the flag F_FAIL_END is 1, the controller 150 ends the processing of step S2400. The default value of the flag F_FAIL_END is 0.

In step S2430, the controller 150 determines that a failure exists in the vehicle driving assist system 2 and sets the flag F_FAIL to 1. The default value of the flag F_FAIL, too, is 0. In step S2440, the controller 150 instructs the alarm device 100 to emit the alarm sound and illuminate the alarm lamp. In step S2450, the controller 150 determines if braking/driving force control and actuation reaction force control are currently being executed based on the risk potential RP. More specifically, the controller 150 determines if a control repelling force Fc calculated based on the time to head way THW or the time to collision TTC of the previous control cycle has a value larger than 0. If the result of step S2450 is positive, the controller 150 proceeds to step S2460. If the result of step S2450 is negative, the controller 150 ends the processing of step S2400.

Figure 56:
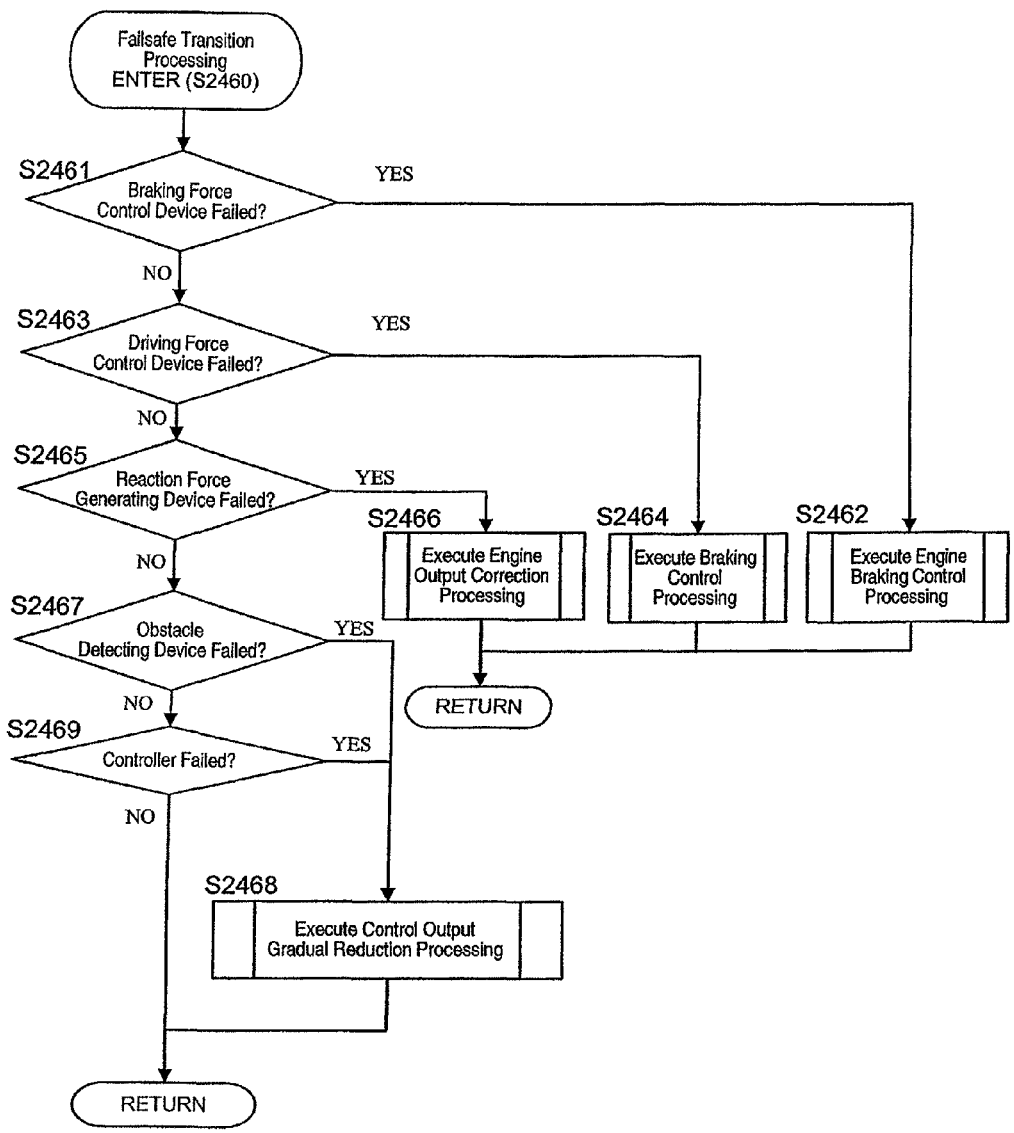
FIG. 56 is a flowchart for explaining the processing steps executed in order to accomplish the failsafe transition processing.

In step S2460, the controller 150 executes a transitional processing (failsafe transition processing) that serves as a transition between when the failure is detected and when the braking/driving force control and actuation reaction force control are ended. The failsafe transition processing serves to prevent a sudden change in the acceleration or deceleration of the vehicle from occurring when the braking/driving force control and actuation reaction force control are stopped due to the failure of the system. The failsafe transition processing will now be explained with reference to the flowchart of FIG. 56.

In step S2461, the controller 150 determines if the braking force control device 90 has failed. If the braking force control device 90 has failed (F_FAIL_BC=1), the controller 150 proceeds to step S2462 and executes an engine braking control that is described later. If the braking force control device 90 has not failed, the controller 150 proceeds to step S2463 and determines if the driving force control device 60 has failed. If the driving force control device 60 has failed (F_FAIL_DC=1), the controller 150 proceeds to step S2464 and executes a brake control that is described later. If the driving force control device 60 has not failed, the controller 150 proceeds to step S2465 and determines if the accelerator pedal reaction force generating device 70 has failed. If the accelerator pedal reaction force generating device 70 has failed (F_FAIL_AP=1), the controller 150 proceeds to step S2466 and executes an engine output correction control that is described later.

If the accelerator pedal reaction force generating device 70 has not failed, the controller 150 proceeds to step S2467 and determines if the obstacle detecting sensor (more particularly, the radar device 10) has failed. If the radar device 10 has failed (F_FAIL_OD=1), the controller 150 proceeds to step S2468 and executes a control output gradual reduction control that is described later. If the radar device 10 has not failed, the controller 150 proceeds to step S2469 and determines if the controller 150 has failed. If the controller 150 has failed, the controller 150 proceeds to step S2468. If the controller 150 has not failed, the controller 150 ends the processing of step S2400.

Figure 57:
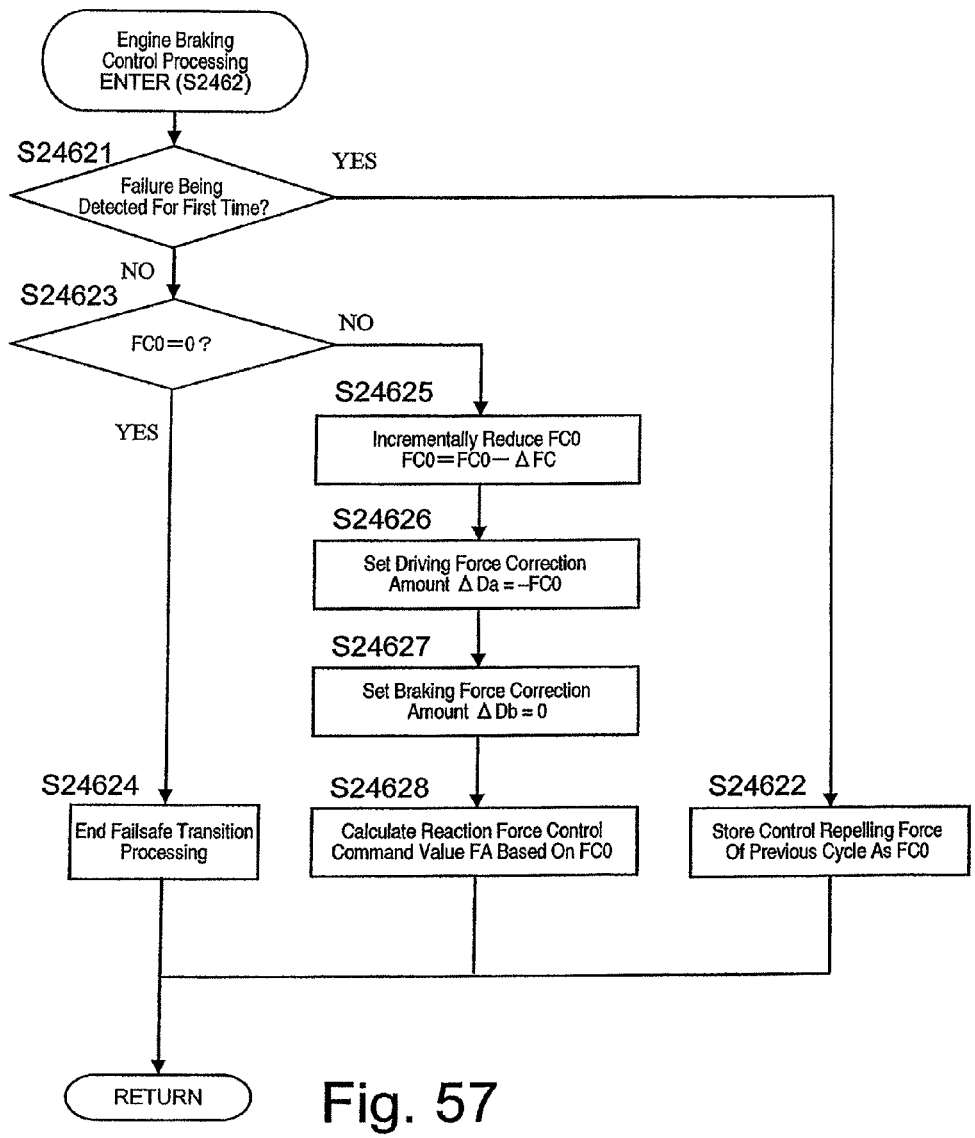
FIG. 57 is a flowchart for explaining the processing steps executed in order to accomplish engine braking control.

The engine braking control executed in step S2462 will now be explained with reference to the flowchart of FIG. 57. In step S24621, the controller 150 determines if the failure of the braking force control device 90 is being detected for the first time. More specifically, if value of the flag F_FAIL_BC (which indicates whether or not the braking force control device 90 has failed) changed from 0 to 1 in the current control cycle, the controller 150 determines that the failure has been detected for the first time and proceeds to step S24622. In step S24622, the controller 150 stores the repelling force Fc calculated in the previous control cycle, i.e., calculated immediately before the failure was detected, as a repelling force FC0 to be used for the failsafe transition processing.

If the result of step S24621 is negative, the controller 150 proceeds to step S24623 and determines if the repelling force FC0 equals 0. If the repelling force FC0 equals 0, the controller 150 proceeds to step S24624 where it determines that the failsafe transition processing is finished and ends the processing of step S2462. If the repelling force FC0 does not equal 0, the controller 150 proceeds to step S24625 and incrementally decreases the repelling force FC0. More specifically, the controller 150 subtracts a prescribed value ΔFC from the repelling force FC0 set in the previous control cycle and sets the result (FC0−ΔFC) as a new repelling force FC0. The prescribed value ΔFC is set in advance to an appropriate amount of change such that the change in the repelling force does not cause the driver to feel that there is something odd about the vehicle performance. The prescribed value is set to such an amount of change that the control repelling force Fc set immediately before the failure was detected (=FC0) is decreased to 0 in, for example, 1 second.

Figure 58:
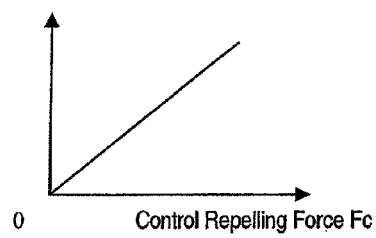
FIG. 58 is a plot of the accelerator pedal reaction force control command value versus the control repelling force.

In step S24626, the controller 150 sets the repelling force FC0 calculated in step S24625 as the value of the driving force correction amount ΔDa (ΔDa=−FC0) and sends the driving force correction amount ΔDa to the driving force control device 60. In step S24627, the controller sets the braking force correction amount ΔDb to 0 (ΔDb=0). In step S24628, the controller 150 calculates an accelerator pedal reaction force control command value FA based on the repelling force FC0 calculated in step S24625 and sends the value FA to the accelerator pedal reaction force generating device 70. More specifically, the controller 150 calculates the reaction force control command value FA based on the repelling force FC0 using a map like that shown in FIG. 58 of the accelerator pedal reaction force control command value FA versus the control repelling force Fc. The map shown in FIG. 58 is the same as the map (see FIG. 18) for calculating the accelerator pedal reaction force control command value FA during actuation reaction force control based on the risk potential RP.

As a result, if the braking force control device 90 is detected to have a failure, the driving force is corrected downward (reduced) by an amount equal to the control repelling force Fc (=FC0) corresponding to the risk potential RP calculated immediately before the failure, thereby inducing engine braking. As the repelling force FC0 is incrementally decreased, the amount by which the driving force is reduced also gradually decreases and the vehicle gradually shifts to a state in which the driving force produced corresponds to the operation of the accelerator pedal by the driver. At the same time, the actuation reaction force exerted against the accelerator pedal 61 also gradually decreases in accordance with the repelling force FC0. Meanwhile, braking force control is not executed because the braking force control device 90 has failed.

Figure 59:
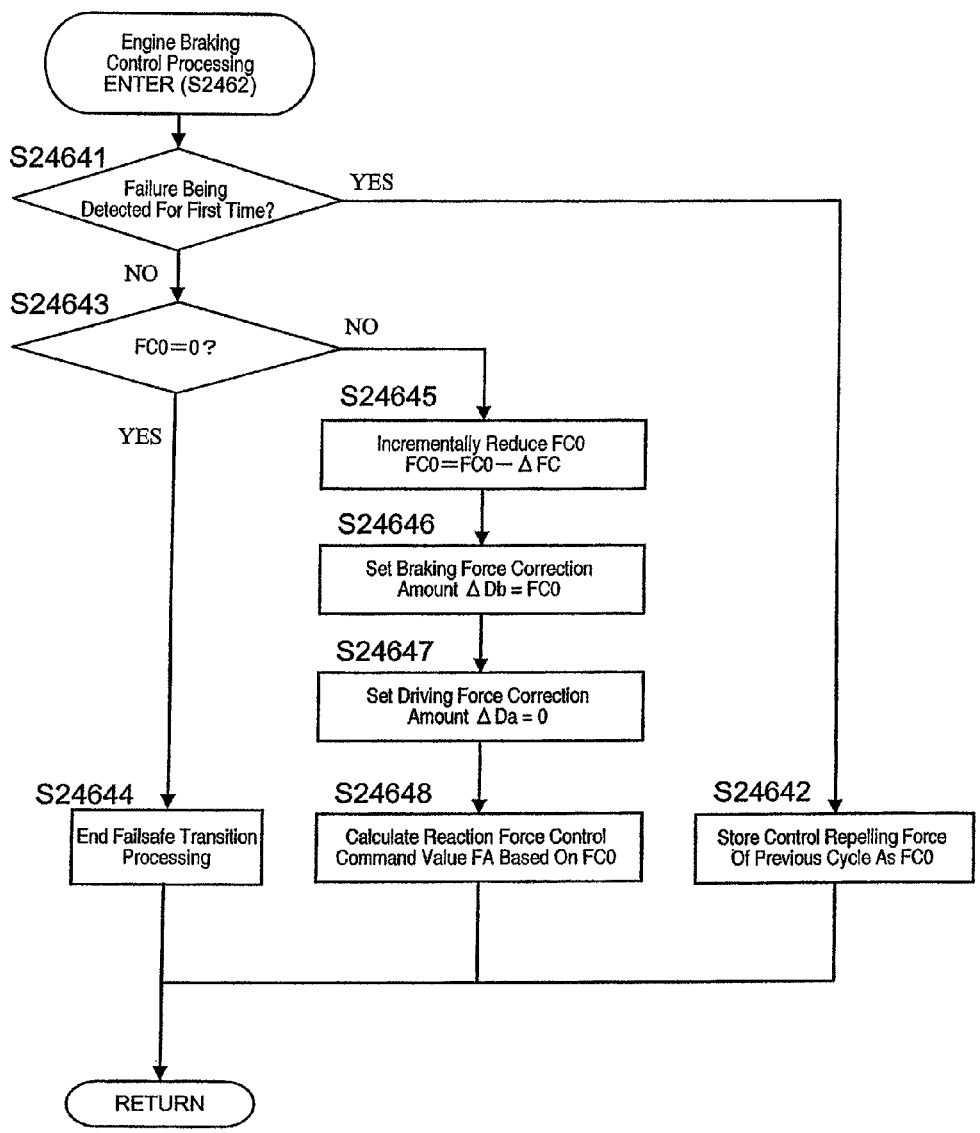
FIG. 59 is a flowchart for explaining the processing steps executed in order to accomplish brake control.

The brake control executed in step S2464 will now be explained with reference to the flowchart of FIG. 59. In step S24641, the controller 150 determines if the failure of the driving force control device 60 is being detected for the first time. More specifically, if value of the flag F_FAIL_DC (which indicates whether or not the driving force control device 60 has failed) changed from 0 to 1 in the current control cycle, the controller 150 determines that the failure is being detected for the first time and proceeds to step S24642. In step S24642, the controller 150 stores the repelling force Fc calculated in the previous control cycle, i.e., calculated immediately before the failure was detected, as a repelling force FC0 to be used for the failsafe transition processing.

If the result of step S24641 is negative, the controller 150 proceeds to step S24643 and determines if the repelling force FC0 equals 0. If the repelling force FC0 equals 0, the controller 150 proceeds to step S24644 where it determines that the failsafe transition processing is finished and ends the processing of step S2464. If the repelling force FC0 does not equal 0, the controller 150 proceeds to step S24645 and incrementally decreases the repelling force FC0. More specifically, the controller 150 subtracts a prescribed value ΔFC from the repelling force FC0 set in the previous control cycle and sets the result (FC0−ΔFC) as a new repelling force FC0. The prescribed value ΔFC is set in advance to an appropriate amount of change such that the change in the repelling force does not cause the driver to feel that there is something odd about the vehicle performance. The prescribed value is set to such an amount of change that the control repelling force Fc set immediately before the failure was detected (=FC0) is decreased to 0, for example, in 1 second.

In step S24646, the controller 150 sets the repelling force FC0 calculated in step S24645 as the value of the braking force correction amount ΔDb (ΔDb=FC0) and sends the braking force correction amount ΔDb to the braking force control device 90. In step S24647, the controller sets the driving force correction amount ΔDa to 0 (ΔDa=0). In step S24648, the controller 150 calculates an accelerator pedal reaction force control command value FA based on the repelling force FC0 calculated in step S24645 using the map shown in FIG. 58 and sends the value FA to the accelerator pedal reaction force generating device 70.

As a result, if the driving force control device 60 is detected to have a failure, the braking force is corrected upward (increased) by an amount equal to the control repelling force Fc (=FC0) corresponding to the risk potential RP calculated immediately before the failure occurred. As the repelling force FC0 is incrementally decreased, the amount by which the braking force is increased also gradually decreases and the vehicle gradually shifts to a state in which the driving force exerted corresponds to the operation of the accelerator pedal by the driver. At the same time, the actuation reaction force exerted against the accelerator pedal 61 also gradually decreases in accordance with the repelling force FC0. Meanwhile, driving force control is not executed because the driving force control device 60 has failed.

Figure 60:
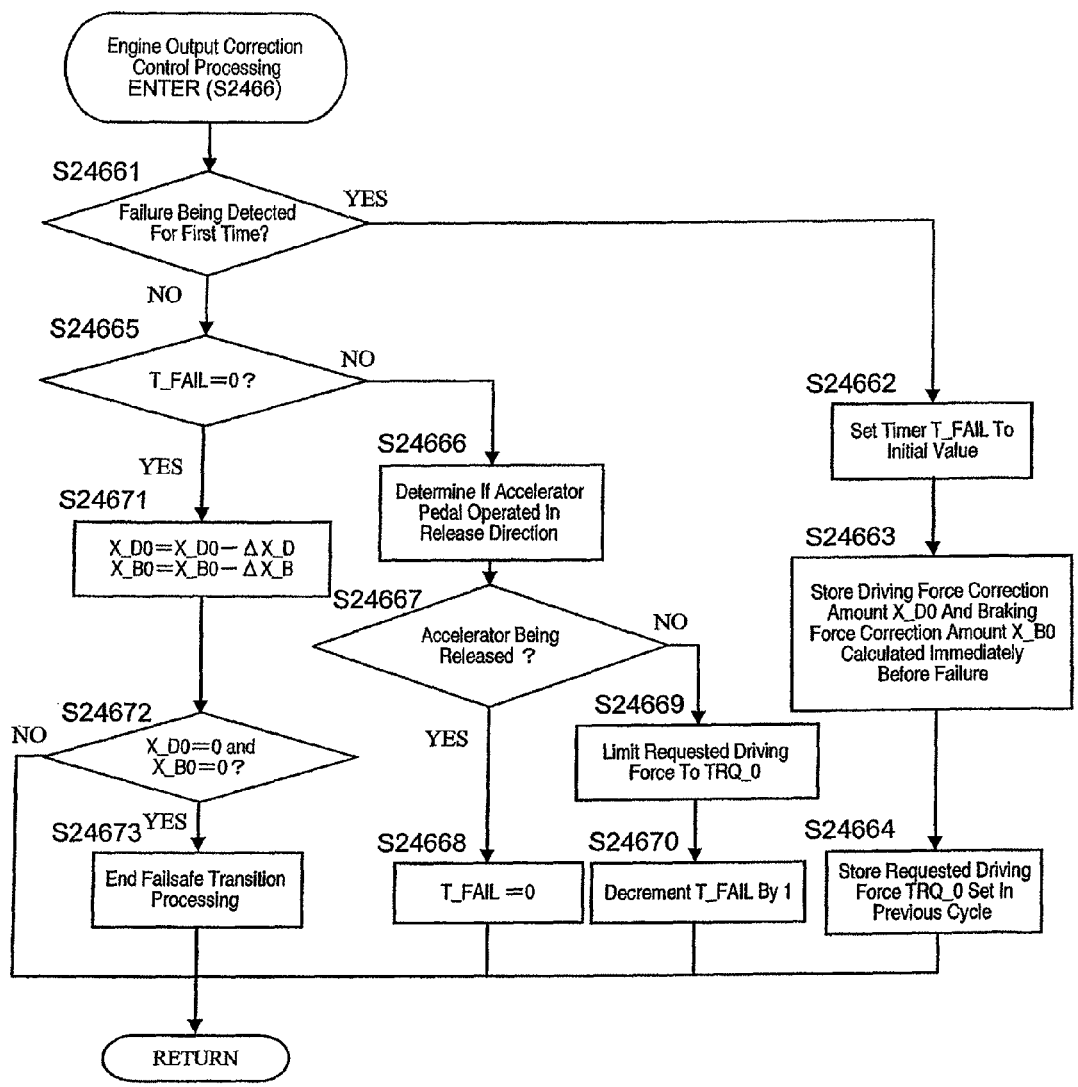
FIG. 60 is a flowchart for explaining the processing steps executed in order to correct the engine output.

The engine output correction control executed in step S2466 will now be explained with reference to the flowchart of FIG. 60. In step S24661, the controller 150 determines if the failure of the accelerator pedal reaction force generating device 70 is being detected for the first time. More specifically, if value of the flag F_FAIL_AP (which indicates whether or not the accelerator pedal reaction force generating device 60 has failed) changed from 0 to 1 in the current control cycle, the controller 150 determines that the failure is being detected for the first time and proceeds to step S24662.

In step S24662, the controller 150 sets the timer T_FAIL to an initial value. The initial value is set to a maximum amount of time, e.g., 1 second, until the driver exhibits a reflexive response in his or her operation of the accelerator pedal after a failure occurs in the accelerator pedal reaction force generating device 70. In step S24663, the controller 150 stores the driving force correction amount ΔDa and braking force correction amount ΔDb calculated in the previous control cycle, i.e., calculated immediately before the failure was detected, as correction amounts X_D0 and X_B0, respectively, to be used for the failsafe transition processing.

In step S24664, the controller 150 stores the driver's requested driving force TRQ_0 calculated based on the accelerator pedal actuation amount SA in the previous control cycle, i.e., immediately before the failure was detected. The controller 150 is provided with a map like the map shown in FIG. 5.

Figure 61:
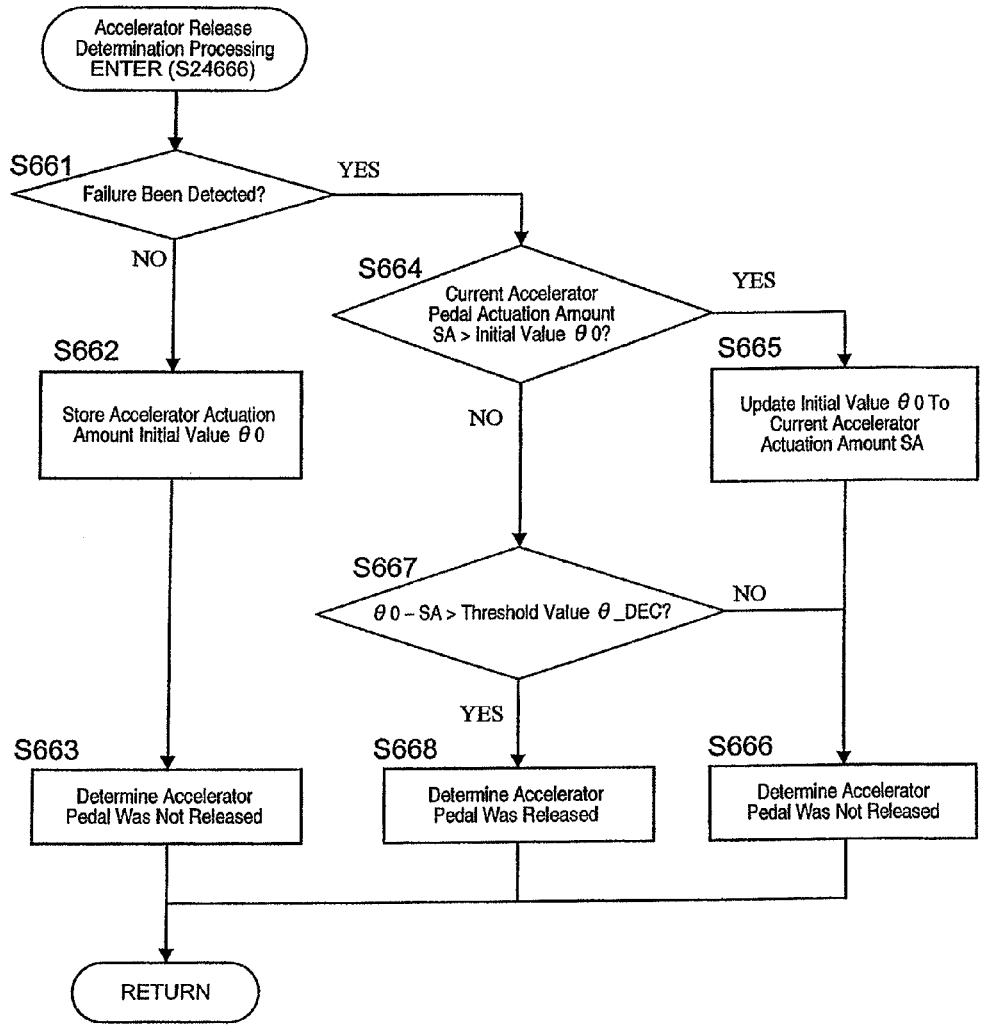
FIG. 61 is a flowchart for explaining the processing steps executed in order to determine if the accelerator pedal is being operated in the release direction.

If the result of step S24661 is negative, the controller 150 proceeds to step S24665 and determines if the value of the timer T_FAIL is 0. If the value of the timer T_FAIL is not 0, the controller 150 proceeds to step S24666 and determines if the accelerator pedal 61 is being operated in the release direction. The control processing executed in order to determine if the accelerator pedal 61 is being operated in the release direction will now be explained with reference to the flowchart of FIG. 61.

In step S661, the controller 150 determines if a failure of the accelerator pedal reaction force generating device 70 has been detected. If the accelerator pedal reaction force generating device 70 is normal (F_FAIL_AP=0), the controller 150 proceeds to step S662. In step S662, the controller 150 stores the current accelerator pedal actuation amount SA detected by the accelerator pedal stroke sensor 62 as an initial value θ0. In step S663, the controller determines that the accelerator pedal 61 is not being operated in the release direction.

If it determines in step S661 that an abnormality exists in the accelerator pedal reaction force control device 70 (F_FAIL_AP=1), the controller 150 proceeds to step S664. In step S664, the controller 150 determines if the current accelerator pedal actuation amount SA detected by the accelerator pedal stroke sensor 62 is larger than the initial value θ0. If the actuation amount SA is larger than θ0, the controller 150 proceeds to step S665 and sets the current accelerator pedal actuation amount SA as the initial value θ0. In step S666, the controller determines that the accelerator pedal 61 is not being operated in the release direction.

If it determines in step S664 that the actuation amount SA is equal to or smaller than θ0, the controller 150 proceeds to step S667 and determines if the difference between the initial value θ0 and the actuation amount SA (θ0 −SA) is larger than a threshold value θ_DEC. The threshold value θ_DEC is set to an appropriate value for determining if the accelerator pedal 61 has been operated in the release direction. If the difference (θ0−SA) is larger than θ_DEC, the controller 150 proceeds to step S668 and determines that the accelerator pedal 61 has been operated in the release direction. If the difference (θ0−SA) is equal to or smaller than θ_DEC, the controller 150 proceeds to step S666 and determines that the accelerator pedal 61 has not been operated in the release direction.

After the controller 150 determines if the accelerator pedal 61 has been operated in the release direction in step S24666, the controller 150 proceeds to step S24667. In step S24667, the controller 150 checks the result of the determination made in step S24666. If the accelerator pedal 61 has been operated in the return direction, the controller 150 proceeds to step S24668 and resets the timer T_FAIL to 0.

Meanwhile, if the accelerator pedal 61 has not been operated in the return direction, the controller 150 proceeds to step S24669 and sets the upper limit value of the driver's requested driving force to the value TRQ_0 stored in step S24664. The controller 150 limits the driver's requested driving force Fda calculated based on the accelerator pedal actuation amount SA to the requested driving force upper limit value TRQ_0. Therefore, when a failure of the accelerator pedal reaction force generating device 70 is detected, the amount by which the driving force exerted against the vehicle increases when the driver depresses the accelerator pedal 61 is limited. In step S24670, the controller 150 reduces (decrements) the value of the timer T_FAIL by 1.

If it determines in step S24665 that the value of the timer T_FAIL is 0, the controller 150 proceeds to step S24671. In step S24671, the controller 150 reduces the driving force correction amount X_D0 stored in step S24663 by a prescribed change amount ΔX_D and sets the resulting value as a new driving force correction amount X_D0. Additionally, the controller 150 reduces the braking force correction amount X_B0 stored in step S24663 by a prescribed change amount ΔX_B and sets the resulting value as a new braking force correction amount X_B0. The prescribed values ΔX_D and ΔX_B are set in advance to appropriate amounts of change such that the resulting changes in the driving force and braking force do not cause the driver to feel that there is something odd about the vehicle performance. The change amounts ΔX_D and ΔX_B are set to such values that the driving force correction amount X_D0 and braking force correction amount X_B0 set immediately before the failure was detected are decreased to 0 in, for example, 1 second.

In step S24672, the controller 150 determines if the driving force correction amount X_D0 and the braking force correction amount X_B0 calculated in step S24671 are both 0. If the correction amount X_D0 equals 0 and the correction amount X_B0 equals 0, the controller 150 proceeds to step S24673 where it determines that the failsafe transition processing is finished and ends the processing of step S2466. Meanwhile, if the result of step S24672 is negative, the controller 150 skips step S24673 and ends the processing of step S2466.

Figure 62:
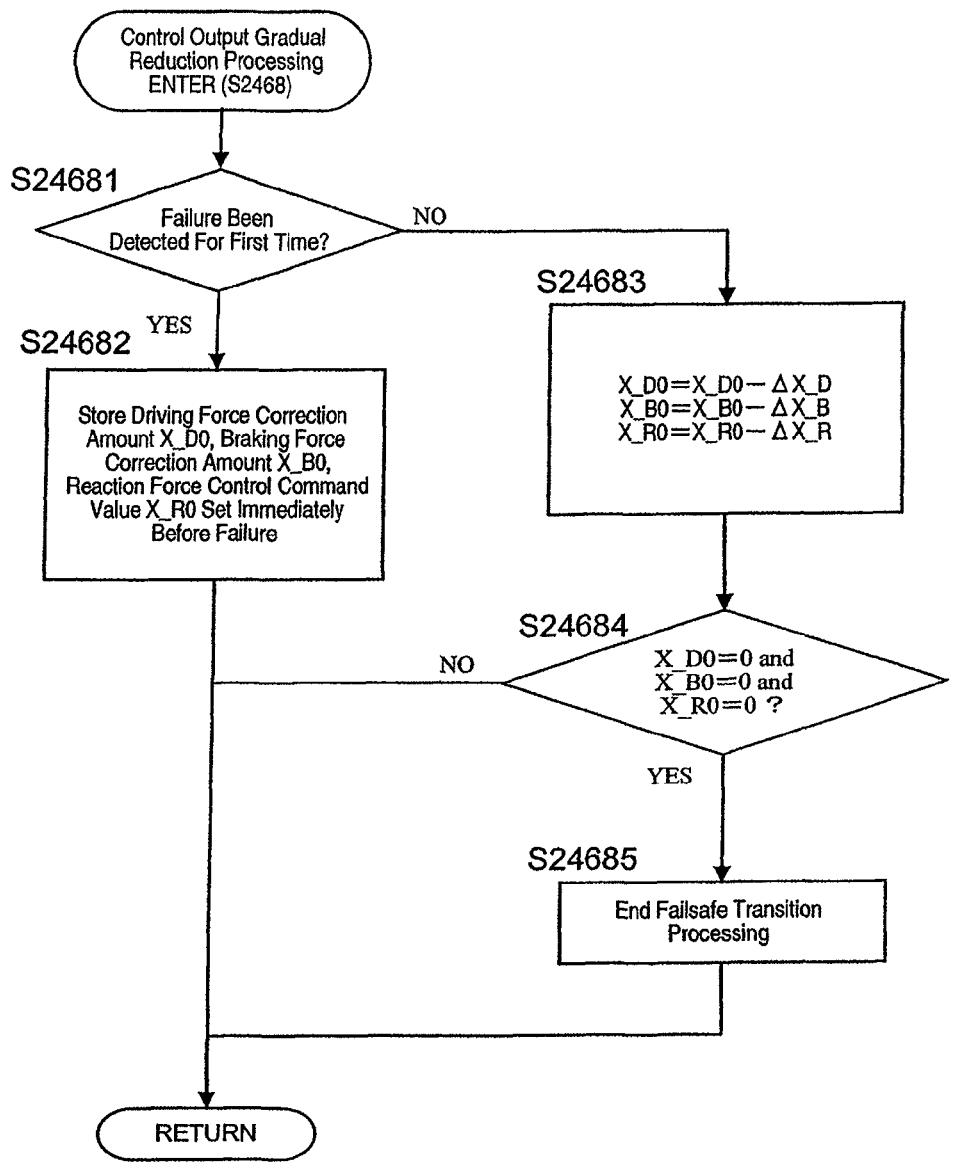
FIG. 62 is a flowchart for explaining the processing steps executed in order to accomplish the control output gradual reduction control.
Figure 63:
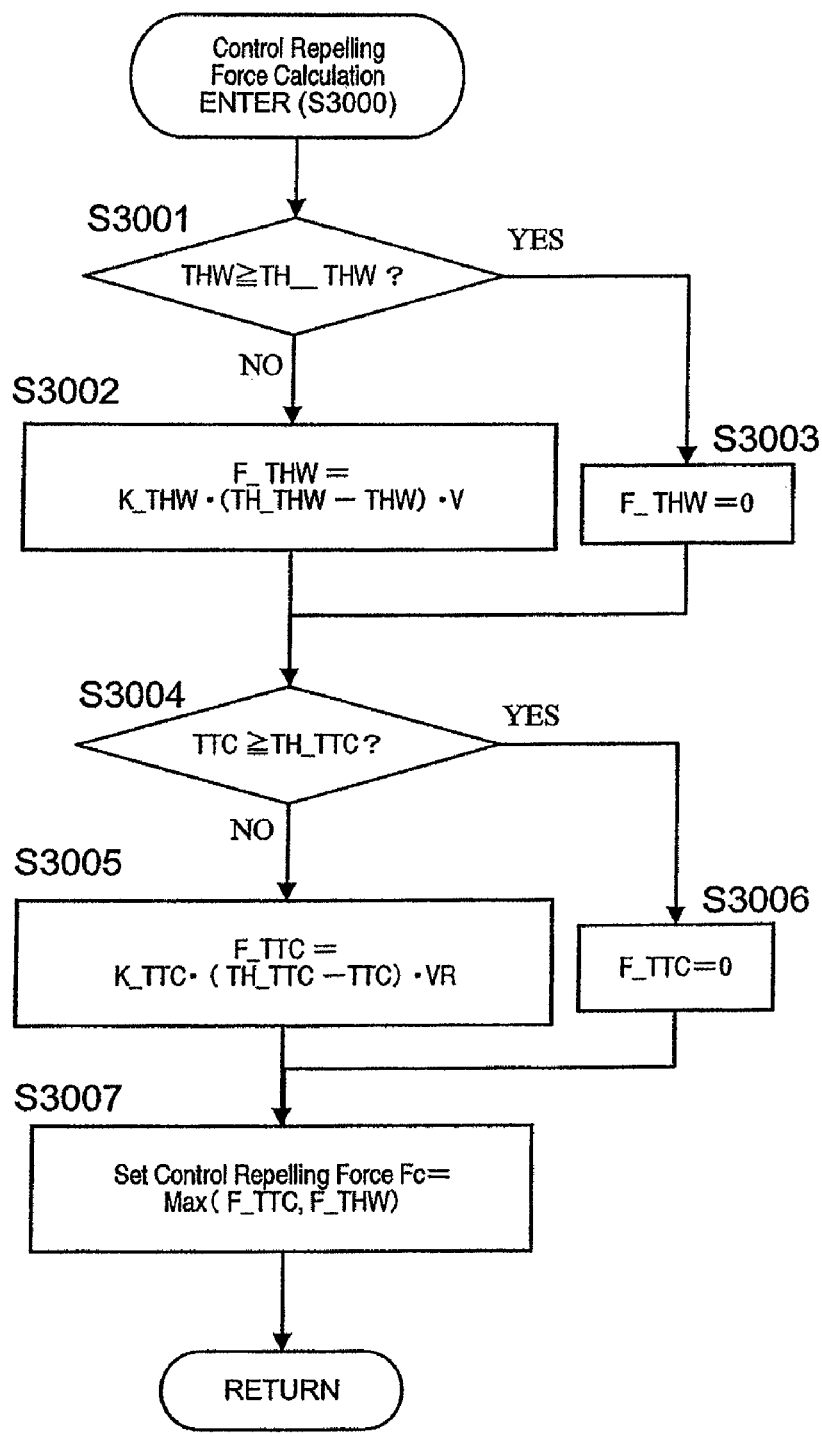
FIG. 63 is a flowchart for explaining the processing steps executed in order to calculate the control repelling force.

The control output gradual reduction control executed in step S2468 will now be explained with reference to the flowchart of FIG. 62. In step S24681, the controller 150 determines if the failure of the obstacle detecting device 40 or the controller 150 is being detected for the first time. More specifically, if value of the flag F_FAIL_OD (which indicates whether or not the radar device 10 has failed) changed from 0 to 1 in the current control cycle if or the value of the flag F_FAIL_CU (which indicates whether or not the controller 150 has failed) changed from 0 to 1 in the current control cycle, the controller 150 determines that the failure has been detected for the first time and proceeds to step S24682.

In step S24682, the controller 150 stores the driving force correction amount ΔDa, the braking force correction amount ΔDb, and the accelerator pedal reaction force control command value FA calculated in the previous control cycle, i.e., calculated immediately before the failure was detected, as the correction amounts X_D0, X_B0, and X_R0, respectively, to be used for the failsafe transition processing.

If the result of step S24681 is negative, the controller 150 proceeds to step S24683. In step S24683, the controller 150 reduces the driving force correction amount X_D0 stored in step S24682 by a prescribed change amount ΔX_D and sets the resulting value as a new driving force correction amount X_D0. Additionally, the controller 150 reduces the braking force correction amount X_B0 stored in step S24682 by a prescribed change amount ΔX_B and sets the resulting value as a new braking force correction amount X_B0. Similarly, the controller 150 reduces the accelerator pedal reaction force control command value X_R0 stored in step S24682 by a prescribed change amount ΔX_R and sets the resulting value as a new accelerator pedal reaction force control command value X_R0.

The prescribed values ΔX_D and ΔX_B are set in advance to appropriate amounts of change such that the resulting changes in the driving force and braking force do not cause the driver to feel that there is something odd about the vehicle performance. The change amounts ΔX_D and ΔX_B are set to such values that the driving force correction amount X_D0 and braking force correction amount X_B0 set immediately before the failure was detected are decreased to 0 in, for example, 1 second. Similarly, the prescribed value ΔX_R is set in advance to an appropriate amount of change such that the resulting change in the accelerator pedal reaction force does not cause the driver to feel that there is something odd about the vehicle performance. The change amount ΔX_R is set to such a value that the accelerator pedal reaction force control command value X_R0 set immediately before the failure was detected is decreased to 0 in, for example, 1 second.

In step S24684, the controller 150 determines if the driving force correction amount X_D0, the braking force correction amount X_B0, and the accelerator pedal reaction force control command value X_R0 calculated in step S24683 are all equal to 0. If the correction amount X_D0 equals 0, the correction amount X_B0 equals 0, and the command value X_R0 equals 0, the controller 150 proceeds to step S24685 where it determines that the failsafe transition processing is finished and ends the processing of step S2468. Meanwhile, if the result of step S24684 is negative, the controller 150 skips step S24685 and ends the processing of step S2468.

Figure 55:
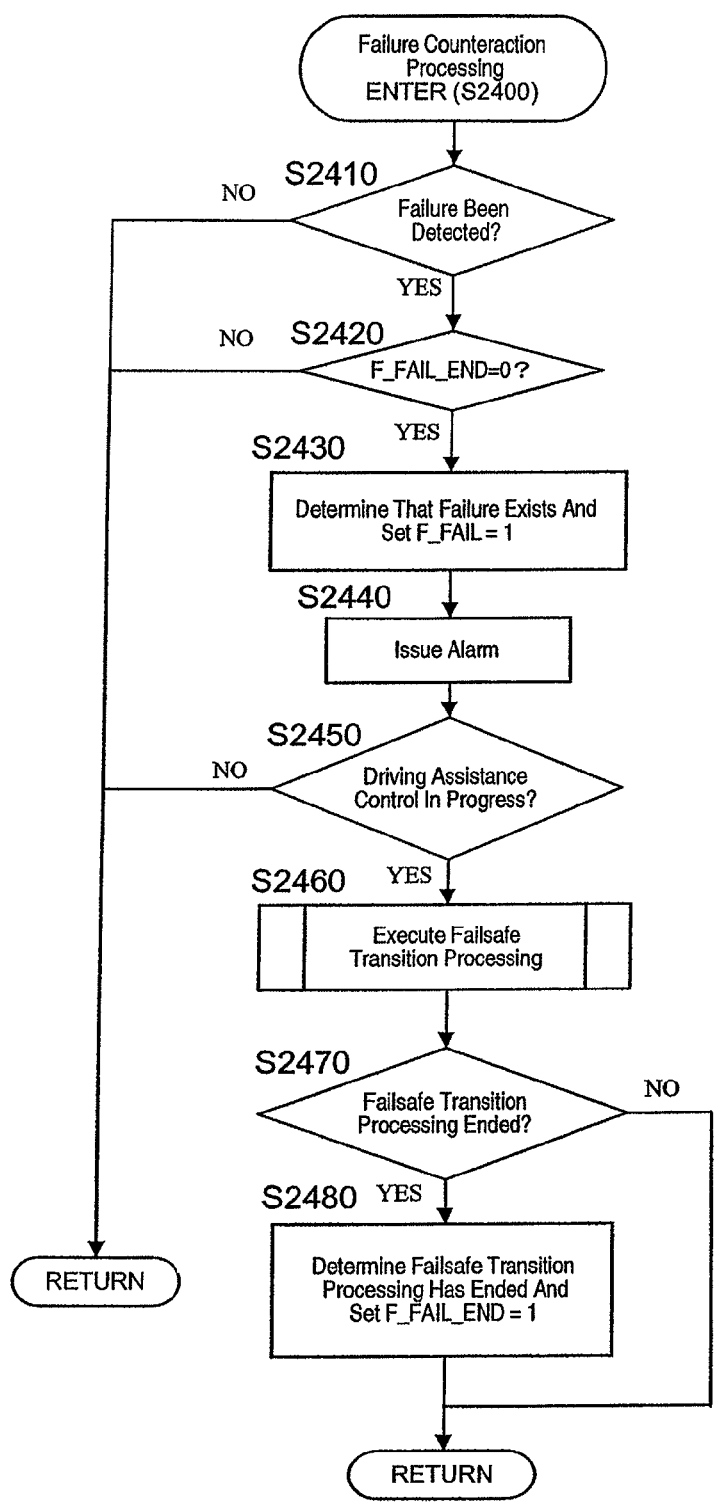
FIG. 55 is a flowchart for explaining the processing steps executed in order to counteract a failure.

After the failsafe transition processing is completed in step S2460, the controller 150 proceeds to step S2470 of the flowchart shown in FIG. 55. In step S2470, the controller 150 determines if the failsafe transition processing has ended. From step S2470, the controller 150 proceeds to step S2480 if it determined that the failsafe transition processing was finished in step S2462 of the engine braking control, step S2464 of the brake control, step S2466 of the engine output correction control, or step S2468 of the control output gradual reduction control. In step S2480, the controller 150 sets the value of the flag F_FAIL_END (which indicates whether or not a failsafe transition processing has ended) to 1. Meanwhile, if the result of step S2470 is negative, the controller 150 skips step S2480 and ends the processing of step S2400.

After the failure countermeasure processing is completed in step S2400, the controller 150 proceeds to step S2500 of the flowchart shown in FIG. 42. In step S2500, the controller 150 determines if the value of the flag F_FAIL (which indicates whether or not a failure exists in the vehicle driving assist system 2) is 0. If the value of F_FAIL is 1, i.e., if a failure exists in the system 2, the controller 150 ends the control loop of FIG. 42. If the value of F_FAIL is 0, i.e., if the system is normal, the controller 150 proceeds to step S2600 and executes actuation reaction force control and braking/driving force control based on the risk potential RP. The processing of the steps S2600 to S2900 is the same as in steps S150 to S180 executed in the first embodiment (see flowchart shown in FIG. 9) and explanations of these steps are omitted here for the sake of brevity.

In step S3000, the controller 50 calculates a control repelling force Fc that will serve as a reference for calculating the accelerator pedal actuation reaction force and the braking and driving force correction amounts. The control processing executed in order to calculate the control repelling force Fc will now be explained with reference to the flowchart of FIG. 61.

First, in step S3001, the controller 150 compares the time to head way THW calculated in step S2900 to a threshold value TH_THW. The threshold value TH_THW is set to an appropriate time to head way value (e.g., 1 second) for determining that it is time for reaction force control and braking/driving force control to be started. If the time to head way THW is smaller than the threshold value TH_THW (THW<TH_THW), the controller 150 proceeds to step S3002. In step S3002, the controller 150 calculates the repelling force F_THW based on the time to head way THW by using the vehicle speed Vh and the time to head way THW in the Equation 10 shown below.

$$F\_THW = K\_THW \times (TH\_THW - THW) \times Vh \quad \text{(Equation 10)}$$

In Equation 10, the term K_THW is a spring constant of the imaginary elastic body correlated to the time to head way THW and the value of TH_TWH×Vh corresponds to the length of the imaginary elastic body.

If time to head way THW is found to be equal to or larger than the threshold value TH_THW in step S3001, then the controller 50 proceeds to step S3003 and sets the value of the repelling force F_THW to 0.

In step S3004, the controller 150 compares the time to collision TTC calculated in step S2900 to the threshold value TH_TCC. The threshold value TH_TTC is set to an appropriate time-to-contact value (e.g., 10 seconds) for determining that it is time for reaction force control and braking/driving force control to be started. If the time to collision TTC is smaller than the threshold value TH_TTC (TTC<TH_TTC), the controller 150 proceeds to step S3005. In step S3005, the controller 150 calculates the repelling force F_TTC based on the time to collision TTC by using the relative velocity Vr and the time to collision TTC in the Equation 11 shown below.

$$F\_TTC = K\_TTC \times (TH\_TTC - TTC) \times Vr \quad \text{(Equation 11)}$$

In Equation 11, the term K_TTC is the spring constant of the imaginary elastic body correlated to the time to collision TTC and the value of TH_TTC×Vr corresponds to the length of the imaginary elastic body.

If time to collision TTC is found to be equal to or larger than the threshold value TH_TTC in step S3004, the controller 150 proceeds to step S3006 and sets the repelling force F_TTC to 0.

In step S3007, the controller 150 compares the repelling force F_THW based on the time to head way THW calculated in step S3002 or S3003 to the repelling force F_TTC based on the time to collision TTC calculated in step S3005 or S3006 and selects the larger value as the repelling force Fc to be used for actuation reaction force control and braking/driving force control.

Figure 64:
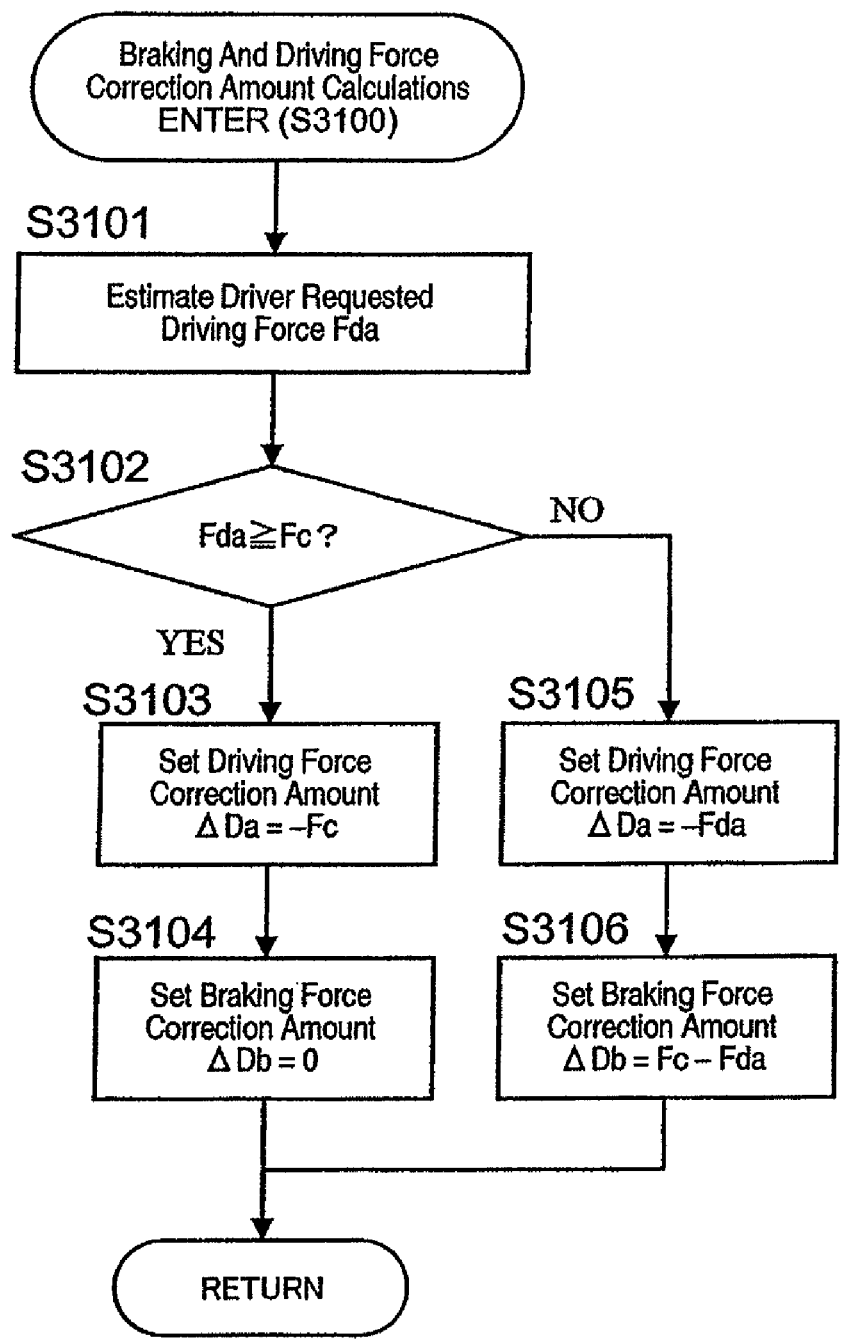
FIG. 64 is a flowchart for explaining the processing steps executed in order to calculate the braking and driving force correction amounts.

After the controller 150 calculates the control repelling force Fc in step S3000, the controller 150 proceeds to step S3100. In step S3100, the controller 150 uses the control repelling force Fc calculated in step S3000 to calculate the driving force correction amount ΔDa and braking force correction amount ΔDb to be used for braking/driving force control. The control processing executed in order calculate the braking and driving force correction amounts will now be explained with reference to the flowchart of FIG. 64.

In step S3101, the controller 150 estimates the driver's requested driving force Fda. The controller 150 contains a driver's requested driving force calculation map identical to that stored inside the driving force control device 60 (see FIG. 5) and estimates the driver's requested driving force Fda based on the accelerator pedal actuation amount SA.

In step S3102, the controller 150 compares the driver's requested driving force Fda estimated in step S3101 to the control repelling force Fc. If the driver's requested driving force Fda is equal to or larger than control repelling force Fc (Fda>Fc), the controller 150 proceeds to step S3103. In step S3103, the controller 150 sets the driving force correction amount ΔDa to the value −Fc. The controller 150 then sets the braking force correction amount ΔDb to 0 in step S3104.

Meanwhile, if the result of step S3102 is negative, i.e., if the driver's requested driving force Fda is smaller than the control repelling force Fc (Fda<Fe), the targeted correction amount cannot be obtained with a correction amount output from the driving force control device 60 alone. Therefore, the controller 150 proceeds to step S3105 and sets the driving force correction amount ΔDa to −Fda. Then, in step S2006, the controller 150 sets the braking force correction amount ΔDb to the amount by which the correction amount ΔDa is insufficient (Fc−Fda). The driver perceives this control as deceleration behavior of the vehicle.

After the controller 150 calculates the driving force correction amount ΔDa and the braking force correction amount ΔDb in step S3100, the controller 150 proceeds to step S3200. In step S3200, the controller 150 calculates an accelerator pedal reaction force control command value FA based on the control repelling force Fc calculated in step S3000 using the map of FIG. 58.

In step S3300, the controller 150 sends the driving force correction amount ΔDa and braking force correction amount ΔDb calculated in step S3100 to the driving force control device 60 and the braking force control device 90, respectively. The driving force control device 60 calculates a target driving force based on the driving force correction amount ΔDa and the requested driving force Fda and sends a command to the engine controller 60c instructing it to generate the calculated target driving force. The braking force control device 90 calculates a target braking force based on the braking force correction amount ΔDb and the requested braking force Fdb and sends a command to the brake fluid pressure controller 90c instructing it to generate the target braking force.

In step S3400, the controller 150 sends the accelerator pedal reaction force control command value FA calculated in step S3200 to the accelerator pedal reaction force control device 70. The accelerator pedal reaction force generating device 70 controls the accelerator pedal reaction force such that a reaction force corresponding to the command value from the controller 150 is added to the normal reaction force corresponding to the accelerator pedal actuation amount SA. After the command value is sent, the current cycle of the control loop ends.

Although the controller 150 monitors itself for abnormalities of the RAM and ROM by executing the previously described failure self-diagnostic processing (step S2390), there is also the possibility that the controller 150 as a whole will completely stop working. In such a case, the controller 150 will be unable to execute the failure diagnostic processing and the failure countermeasure processing (steps S2300 and S2400). Therefore, the braking force control device 90, the driving force control device 60, and the accelerator pedal reaction force generating device 70 are provided with the ability to monitor the respective updated control commands from the controller 150 and determine if the controller 150 is operating normally or not.

Figure 65:
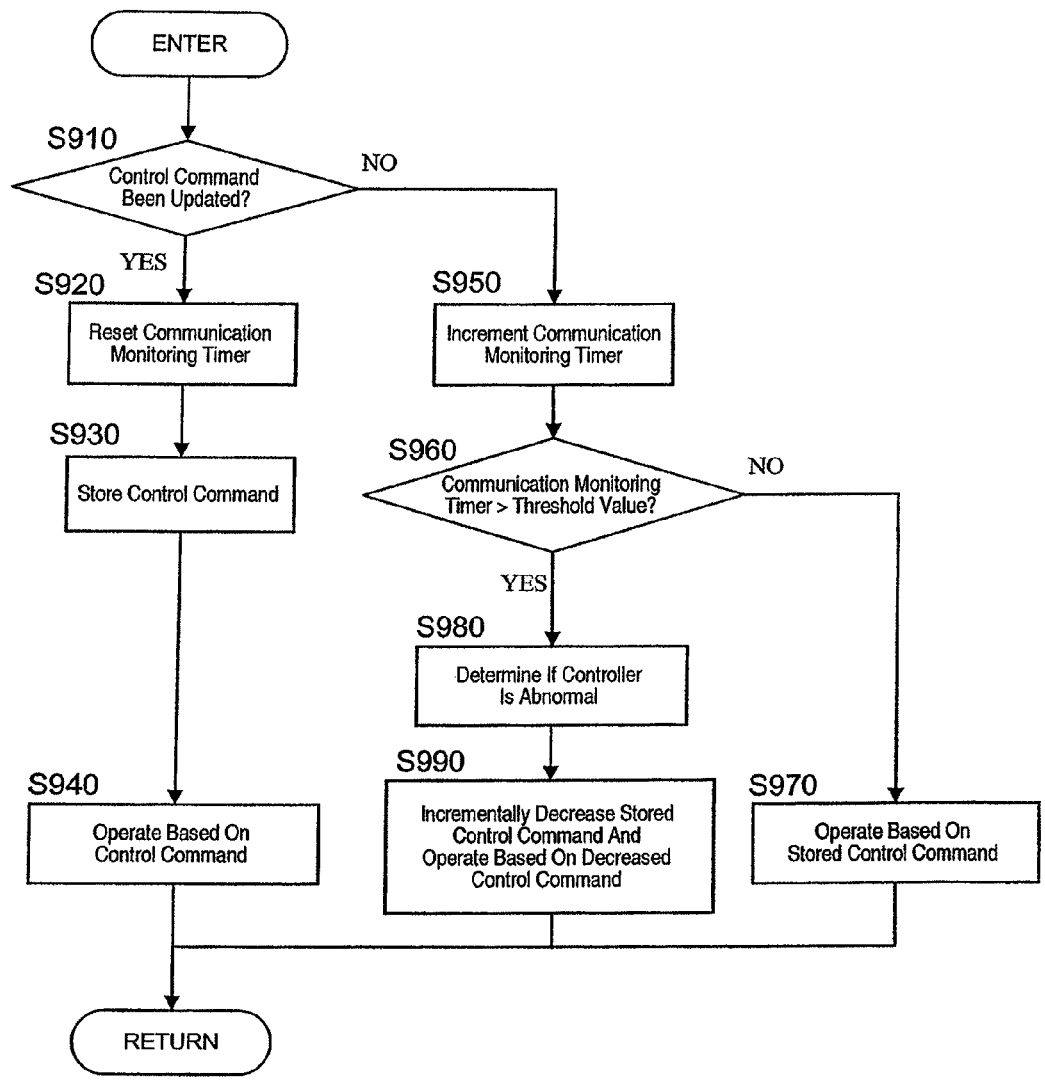
FIG. 65 is a flowchart for explaining the processing steps executed by the braking force control device in order to determine if the controller is abnormal.

The control processing executed by the braking force control device 90 in order to determine if the controller 150 is abnormal will now be explained with reference to the flowchart of FIG. 65. In step S910, the braking force control device 90 determines if a control command from the controller 150 has been updated. If a control command, i.e., the braking force correction amount ΔDb, is being sent from the controller 150 to the braking control device 90, the braking force control device 90 proceeds to step S920.

In the step S920, the braking force control device 90 resets a communication monitoring timer to 0. The communication monitoring timer is for monitoring updating of the control command from the controller 150. In step S930, the braking force control device 90 stores the control command (braking force correction amount ΔDb) from the controller 150. In step S940, the braking force control device 90 adjusts the braking force exerted against the vehicle by executing control based on the control command.

If the result of step S910 is positive, braking force control device 90 proceeds to step S950 and increments the communication monitoring timer. In step S960, the controller compares the value of the communication monitoring timer obtained in step S950 to a threshold value. The threshold value is set in advance to an appropriate value that is sufficiently larger than the communication interval of the controller 150 when the controller 150 is operating normally. The threshold value is used to determine if there is a communication abnormality in the controller 150. If the value of the communication monitoring timer value is equal to or smaller than the threshold value, the braking force control device 90 proceeds to step S970. In step S970, the braking force control device 90 executes braking force control based on the command value stored in step S930. More specifically, the braking force control device 90 adjusts the braking force based on the braking force correction amount ΔDb stored in step S930.

Meanwhile, if it determines in step S960 that the communication monitoring timer is larger than the threshold value, the braking force control device 90 proceeds to step S980 and determines that an abnormality exists in the controller 150. In step S980, the braking force control device 90 gradually ends the braking force control based on the command value stored in step S930. More specifically, the braking force control device 90 incrementally reduces the braking force correction amount ΔDb stored in step S930 and adjusts the braking force using the incrementally reduced braking force correction amount ΔDb until the braking force correction amount ΔDb decreases to 0.

In short, the braking force control device 90 determines that the controller 150 is abnormal when the control command from the controller 150 has been stopped continuously for a prescribed amount of time. If the controller 150 is found to be abnormal, the braking force control device 90 holds the control command issued immediately before the abnormality was detected for a prescribed amount of time and then gradually decreases the control command in an incremental manner before ending the braking control.

Here, a case in which the braking force control device 90 determines if the controller 150 is abnormal is explained as an example. Similar processing is executed when the driving force control device 60 or the accelerator pedal reaction force generating device 70 determines if the controller 150 is abnormal.

Figure 66:
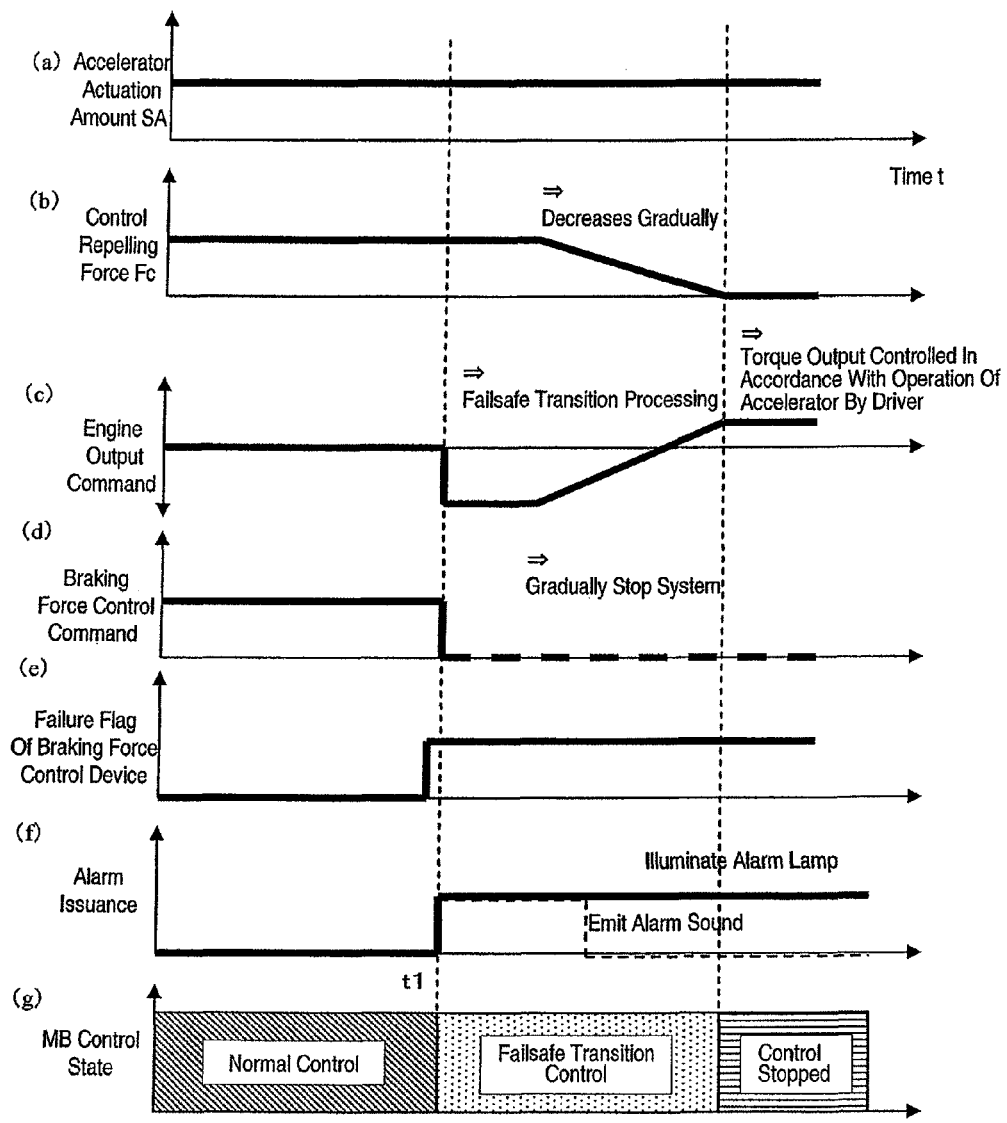
FIGS. 66 (a) to 66 (g) show examples of how the accelerator pedal actuation amount, the control repelling force, the engine output command, the braking force control command, the braking force control device failure flag, the alarm issuance, and the control state of the system change with time when there is an abnormality (failure) in the braking force control device.

The operational action achieved with a vehicle driving assist system 2 in accordance with the twelfth embodiment of the present invention will now be explained. Particular attention is given to the operational action achieved when the braking force control device 90 has failed. FIGS. 66 (*a*) to (*g*) exemplify how the accelerator pedal actuation amount SA, the control repelling force Fc, the engine output command, the braking force control command, the braking force control device failure flag F_FAIL_BC, the alarm issuance, and the control state of the vehicle driving assist system 2 change with time. In FIG. 66, it is assumed that the accelerator pedal 61 is depressed at a fixed (constant) actuation amount SA and the control repelling force Fc corresponding to the risk potential RP is also constant. The engine output is controlled to 0 in accordance with the control repelling force Fc and a braking force is acting on the vehicle.

When it is determined that the braking force control device 9 has failed (F_FAIL_BC=1), the vehicle driving assistance device 2 changes from its normal control state. The braking force control executed based on the risk potential RP stops and the deceleration of the vehicle that was induced by the braking force control decreases. At a time t1, failsafe transition processing is started with respect to the failure of the braking force control device 90.

More specifically, the engine output is reduced in accordance with the value of the control repelling force Fc calculated before the failure, thereby inducing engine braking. In this embodiment, the control repelling force Fc is held constant for a prescribed amount of time and then gradually decreased. However, it is also possible to configure the system such that the control repelling force Fc begins gradually decreasing immediately after the failure of the braking force control device 90 is detected. The alarm lamp is illuminated and the alarm sound is emitted at the same time. The alarm lamp is illuminated continuously for the entire duration that the failure of the braking force control device 90 is detected; the alarm sound is terminated after a prescribed amount of time has elapsed.

The control repelling force Fc gradually decreases to 0. In response, the engine output gradually increases and finally reaches a point where engine torque produced corresponds to the operation of the accelerator pedal by the driver.

The twelfth embodiment described heretofore can thus provide the following operational effects.

The vehicle driving assist system 2 detects at least the host vehicle speed Vh of the vehicle in which the system is installed and the following distance D of the vehicle with respect to an obstacle existing in front of the vehicle, and, based on these detected quantities, the system 2 calculates a risk potential RP indicating the degree of convergence of the vehicle with respect to the obstacle. Additionally, based on the calculated risk potential RP, the system 2 controls an actuation reaction force exerted by a driver-operated driving device and/or a braking/driving force exerted against the vehicle. The vehicle driving assist system 2 is also configured to detect if a failure has occurred there-within and to activate a failsafe control section when a failure is detected. When a failure is detected, the vehicle driving assist system 2 controls the failsafe control section in such a manner as to suppress changes in the vehicle behavior caused by the failure. If a failure occurs in the vehicle driving assist system 2 while the vehicle driving assist system 2 is executing actuation reaction force control and braking/driving force control based on the risk potential RP, the vehicle driving assist system 2 stops controlling the actuation reaction force and the braking/driving force in accordance with the risk potential RP. If the acceleration or deceleration of the vehicle fluctuates due to the cessation of these controls, the driver will experience a feeling that something is odd about the vehicle behavior. By operating a failsafe control section so as to suppress the fluctuation of the vehicle behavior resulting from the failure, the odd feeling experienced by the driver can be alleviated. The failsafe control section is configured stop the controls executed by the vehicle driving assist system 2 in a smooth manner when a failure occurs in the vehicle driving assist system 2 and, thereby, suppress the fluctuation of the vehicle behavior—particularly fluctuation of the acceleration or deceleration of the vehicle—that results from the failure. The accelerator pedal reaction force generating device 70, the braking force control device 90, or the driving force control device 60, for example, can be used as the failsafe control section.

The controller 150 of the vehicle driving assist system 2 is configured to estimate the behavior the vehicle would have exhibited if a failure had not been detected and to issue commands (instructions) to the failsafe control section that take into account the difference between the estimated vehicle behavior and the actual behavior the vehicle exhibits when a failure occurs. As a result, even if the vehicle behavior does fluctuate due to the failure, the odd feeling experienced by the driver can be alleviated.

The controller 150 is configured such that when a failure is detected, the controller 150 operates the failsafe control section in such a manner that the actual host vehicle behavior is matched to the estimated vehicle behavior and, thereafter, gradually stops the failsafe control operation of the failsafe control section. As a result, even if the vehicle behavior does fluctuate due to the failure, the controls executed by the vehicle driving assist system 2 can be brought to a stop in a smooth manner while suppressing the fluctuation of the vehicle behavior. More specifically, the control amounts of the vehicle driving assist system 2 that were stored immediately before the failure occurred are used to gradually decrease the control amounts to 0. As a result, even if a failure occurs, the control amounts of the vehicle driving assist system 2 can be gradually lowered to 0 without undergoing any sudden changes, thereby alleviating any odd feeling that might otherwise be experienced by the driver.

The vehicle driving assist system 2 is configured to issue an alarm immediately before the failsafe control section is operated when a failure is detected. As a result, the driver can be informed in a reliable manner of the occurrence of the failure.

When a failure of the driving force control device 60 is detected, the braking force control device 90 acts as a failsafe control section serving to suppress the change in acceleration or deceleration that results from the failure of the driving force control device 60. The controller 150 controls the braking force control device 90 such that the actual host vehicle behavior is matched to the estimated vehicle behavior. More specifically, after the failure is detected, the braking force correction amount ΔDb is set using the control repelling force FC0 calculated immediately before the failure was detected and braking force control is executed accordingly. Afterwards, the braking force correction amount ΔDb is gradually decreased. As a result, the deceleration or acceleration of the vehicle can be prevented from undergoing a sudden change.

When a failure of the braking force control device 90 is detected, the driving force control device 60 acts as a failsafe control section serving to suppress the change in acceleration or deceleration that results from the failure of the braking force control device 90. The controller 150 controls the driving force control device 60 such that the actual host vehicle behavior is matched to the estimated vehicle behavior. More specifically, after the failure is detected, the driving force correction amount ΔDa is set using the control repelling force FC0 calculated immediately before the failure was detected and driving force control is executed accordingly so as to induce engine braking. Afterwards, the driving force correction amount ΔDa is gradually decreased. As a result, the deceleration or acceleration of the vehicle can be prevented from undergoing a sudden change.

When a failure of the obstacle detecting device 40 or the controller 150 is detected, the driving force control device 60, braking force control device 90, and accelerator pedal reaction force control device 70 act as failsafe control section serving to suppress the change in acceleration or deceleration that results from the failure. The controller 150 controls the driving force control device 60, the braking force control device 90, and the accelerator pedal reaction force control device 70 such that the actual host vehicle behavior is matched to the estimated vehicle behavior. More specifically, the controller 150 stores the driving force correction amount ΔDa, the braking force correction amount ΔDb, and the accelerator pedal reaction force control command value FA that were set immediately before the failure and, after the failure occurs, the controller 150 executes actuation reaction force control and braking/driving force control using the stored control amounts. Afterwards, the control amounts are gradually decreased. As a result, the deceleration or acceleration of the vehicle can be prevented from undergoing a sudden change.

In the control output gradual reduction control executed in the previously described step S2468, the change amounts ΔX_D, ΔX_B, and ΔX_R of the driving force correction amount X_D0, the braking force correction amount X_B0, and the accelerator pedal reaction force control command value X_R0 are each set to appropriate values such that the driving force correction amount X_D0, the braking force correction amount X_B0, and the accelerator pedal reaction force control command value X_R0 are each decreased to 0 in approximately 1 second. However, the present invention is not limited to such a control amount reduction scheme. It is also possible to set the change amounts ΔX_D, ΔX_B, and ΔX_R such that the driving force correction amount X_D0, the braking force correction amount X_B0, and the accelerator pedal reaction force control command value X_R0 reach 0 at different times.

For example, in view of the operating characteristics of the accelerator pedal 61 and the need to suppress fluctuation of the acceleration or deceleration of the vehicle, the change amounts ΔX_D, ΔX_B, and ΔX_R might be set such that the accelerator pedal reaction force control command value X_R0 reaches 0 at the earliest time, the driving force correction amount X_D0 reaches 0 next, and the braking force correction amount X_B0 reaches 0 last. It is also possible to set the change amounts ΔX_D, ΔX_B, and ΔX_R such that they vary in response to the risk potential RP or such that the driving force correction amount X_D0, the braking force correction amount X_B0, and the accelerator pedal reaction force control command value X_R0 change at rates that vary over time.

Variation on Twelfth Embodiment

Figure 67:
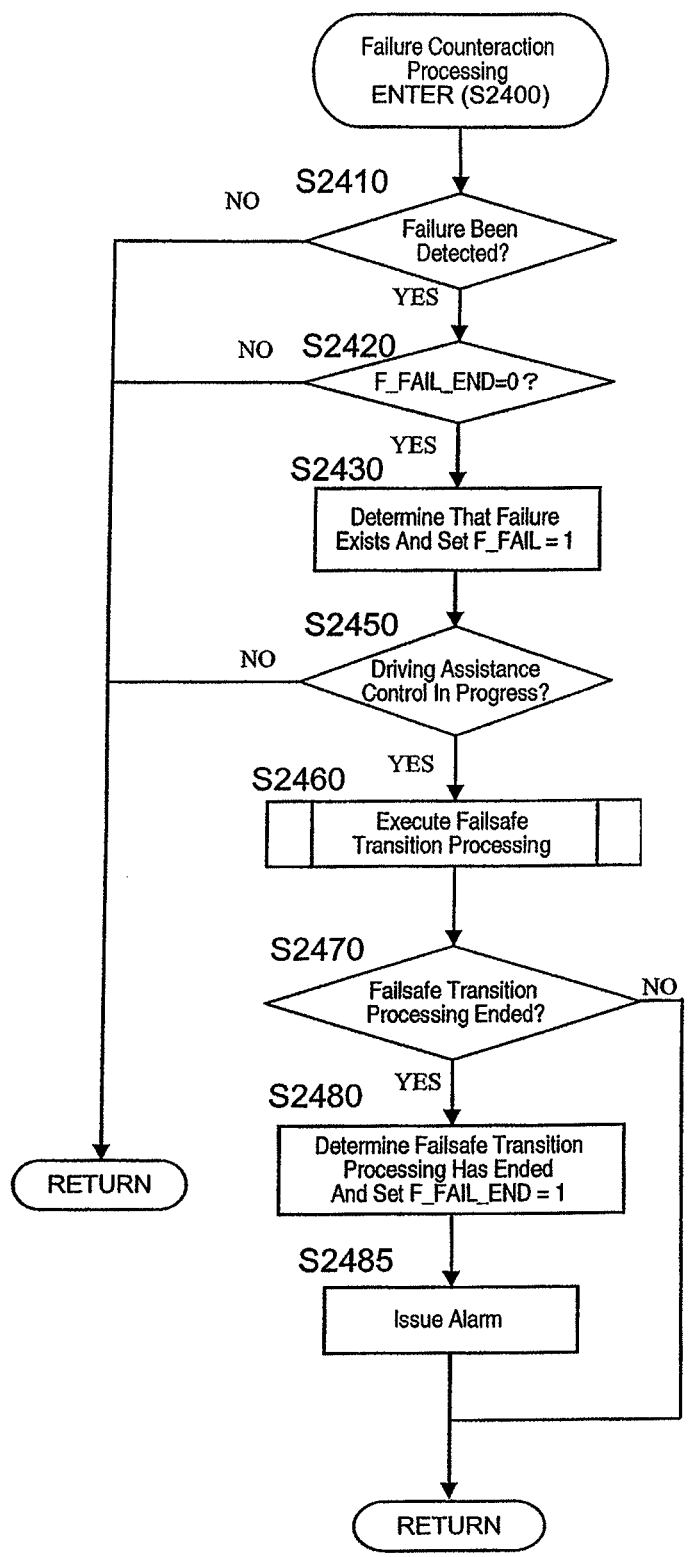
FIG. 67 is a flowchart showing the processing steps executed in the variation of the twelfth embodiment in order to counteract a failure.

In the twelfth embodiment described previously, the alarm device 100 issues the alarm at a point in time occurring after the failure is detected in the system and before the failsafe transition processing is started. In this variation, the alarm is issued after the failsafe transition processing is finished. The failure countermeasure processing executed in this variation will now be explained with reference to the flowchart of FIG. 67. This failure countermeasure processing is executed in step S2400 of the flowchart shown in FIG. 42.

The control processing executed in steps S2410 to S2430 is the same as the control processing executed in the flowchart of FIG. 55. In step S2430, the controller 150 determines that a failure exists in the vehicle driving assist system 2 and sets the flag F_FAIL to 1. The controller 150 then proceeds to step S2450. In step S2450, the controller 150 determines if braking/driving force control and actuation reaction force control are currently being executed based on the risk potential RP.

If the result of step S2450 is positive, the controller 150 proceeds to step S2460 and executes failsafe transition processing. If the result of step S2450 is negative, the controller 150 ends the processing of step S2400. After executing the failsafe transition processing in step S2460, the controller 150 proceeds to step S2470 and determines if the failsafe transition processing has ended. If it determines that the failsafe transition processing has ended, the controller 150 proceeds to step S2480 and sets the flag F_FAIL_END (which indicates whether or not the failsafe transition processing is finished) to 1. Then, the controller 150 proceeds to step S2485 and instructs the alarm device 100 to emit the alarm sound and illuminate the alarm lamp. Meanwhile, if the result of step S2470 is negative, the controller 150 skips steps S2480 and S2485 and ends the processing of step S2400.

By issuing the alarm after the failsafe transition processing has ended, the vehicle can be put into a normal state by the time the alarm is issued to inform the driver of the failure, "normal state" meaning a condition in which actuation reaction force control and braking/driving force control are not executed by the vehicle driving assist system 2. More specifically, a driving force corresponding to the depression amount of the accelerator pedal 61 is generated. As a result, the odd feeling the driver experiences with respect to the vehicle performance after the alarm is issued can be alleviated.

In the previously described twelfth embodiment, the accelerator pedal 61 was used as an example of a driver-operated device used by the driver to drive the vehicle. However, the present invention is not limited to controlling the actuation reaction force of an accelerator pedal. For example, it is also possible to use the brake pedal 91 or the steering wheel as the driver-operated device.

In the twelfth embodiment, the radar device 10 and the vehicle speed sensor 20 can function as the traveling situation detecting section; the controller 150 can function as the risk potential calculating section, the failure detecting section, the failsafe control section, the vehicle behavior estimating section, and the command output section; the driving force control device 60, the braking force control device 90, and the accelerator pedal reaction force generating device 70 can function as the control section and the failsafe control section; and the alarm device 100 can function as an alarm issuing section. Also, the driving force control device 60 can also function as the driving force control section and the braking force control device 90 can also function as the braking force control section. However, the invention is not limited to this arrangement. For example, it is also feasible to use only the driving force control device 60 or the braking force control device 90 as the control section and the failsafe control section. The explanations presented above are merely examples. When interpreting the present invention, the invention should not be limited or restrained in any way by the corresponding relationships between the embodiments and the claims.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle driving assist system comprising:
    a traveling situation detecting section configured to output a traveling situation detection result based on at least a following distance between a host vehicle and a preceding obstacle and a host vehicle speed of the host vehicle;
    a controller having a processor including a risk potential calculating section configured to calculate a risk potential indicative of a degree of convergence between the host vehicle and the preceding obstacle based on the traveling situation detection result of the traveling situation detecting section;
    a driving assist control section configured to control, based on the risk potential calculated by the risk potential calculating section, at least one of
    an actuation reaction force of a driver-operated driving device of the host vehicle that counteracts an operation force to operate the driver-operated driving device and
    a braking/driving force exerted against the host vehicle;
    a failure detecting section configured to detect a failure of an operating condition of at least part of the vehicle driving assist system; and
    a failsafe control section configured to perform a failsafe control operation that changes control by the driving assist control section to suppress changes in acceleration or deceleration caused by the failure of the operating condition when the failure of the operating condition has been detected in the vehicle driving assist system.

2. The vehicle driving assist system recited in claim 1, wherein
    the failsafe control section comprises a vehicle behavior estimating section configured to estimate a potential host vehicle behavior that would potentially occur if the failure had not been detected, and a command output section configured to issue a command in accordance with a difference between the potential host potential host vehicle behavior estimated by the vehicle behavior estimating section and an actual host vehicle behavior.

3. The vehicle driving assist system recited in claim 2, wherein
    the command output section is configured to perform the failsafe control operation such that the actual host vehicle behavior initially matches the potential host vehicle behavior estimated by the vehicle behavior estimating section and then gradually stops the failsafe control operation, when the failure of the operating condition at least part of the vehicle driving assist system has been detected by the failure detecting section.

4. The vehicle driving assist system recited in claim 1, further comprising
    an alarm issuing section configured to issue an alarm immediately before the failsafe control operation, when the failure of the operating condition at least part of the vehicle driving assist system has been detected by the failure detecting section.

5. The vehicle driving assist system recited in claim 1, further comprising
    an alarm issuing section configured to issue an alarm after the failsafe control operation has finished, when the failure of the operating condition at least part of the vehicle driving assist system has been detected by the failure detecting section.

6. The vehicle driving assist system recited in claim 3, wherein
    the driving assist control section comprises a driving force control section configured to decrease a driving force exerted against the host vehicle in accordance with the risk potential, and a braking force control section configured to increase a braking force exerted against the host vehicle in accordance with the risk potential, and
    the failsafe control section is configured to operate the braking force control section such that the actual host vehicle behavior matches the potential host vehicle behavior estimated by the vehicle behavior estimating section, when the failure of the operating condition at least part of the vehicle driving assist system has been detected by the failure detecting section.

7. The vehicle driving assist system recited in claim 3, wherein
    the driving assist control section comprises a driving force control section configured to decrease a driving force exerted against the host vehicle in accordance with the risk potential, and a braking force control section configured to increase a braking force exerted against the host vehicle in accordance with the risk potential, and
    the failsafe control section is configured to operate the driving force control section and the braking force control section such that the actual host vehicle behavior matches the potential host vehicle behavior estimated by the vehicle behavior estimating section, when the failure of the operating condition at least part of the vehicle driving assist system has been detected by the failure detecting section.

8. The vehicle driving assist system recited in claim 3, wherein
    the driving assist control section comprises an actuation reaction force control section configured to control the actuation reaction force exerted by the driver-operated driving device in accordance with the risk potential, a driving force control section configured to decrease a driving force exerted against the host vehicle in accordance with the risk potential, and a braking force control section configured to increase a braking force exerted against the host vehicle in accordance with the risk potential, and the failsafe control section is configured to operate the actuation reaction force control section, the driving force control section and the braking force control section such that the actual host vehicle behavior matches the potential host vehicle behavior estimated by the vehicle behavior estimating section, and then, sequentially stops control of the actuation reaction force by the reaction force control section, control of the driving force by the driving force control section, and control of the braking force by the braking force control section in order as listed, when the failure of the operating condition at least part of the vehicle driving assist system has been detected by the failure detecting section.

9. The vehicle driving assist system recited in claim 1, wherein the failure detecting section and the failsafe control section are at least partially a part of the controller.

10. The vehicle driving assist system recited in claim 1, wherein the failsafe control section includes at least one of an accelerator pedal reaction force generating device, a braking force control device and a driving force control device.

* * * * *